United States Patent [19]

Stich et al.

[11] Patent Number: 5,315,533
[45] Date of Patent: May 24, 1994

[54] BACK-UP UNINTERRUPTIBLE POWER SYSTEM

[75] Inventors: Frederick A. Stich, Wisconsin Rapids; Donald K. Zahrte, Sr., Necedah; Richard V. Baxter, Jr., Appleton; Douglas C. Folts, Mauston; Thomas G. Hubert, Necedah; Juan M. Medina; William J. Hazen, both of Wisconsin Rapids; Edward G. Beistle, Appleton, all of Wis.

[73] Assignee: Best Power Technology, Inc., Necedah, Wis.

[21] Appl. No.: 702,733
[22] Filed: May 17, 1991
[51] Int. Cl.⁵ .............................. G06F 15/20
[52] U.S. Cl. ........................ 364/480; 307/66; 364/481; 364/483
[58] Field of Search ............ 307/66; 364/480, 481, 364/483

[56] References Cited

U.S. PATENT DOCUMENTS

| | | | |
|---|---|---|---|
| 4,031,463 | 6/1977 | Norberg | 361/86 X |
| 4,096,394 | 6/1978 | Ullmann et al. | 307/46 |
| 4,277,692 | 7/1981 | Small | 307/66 |
| 4,366,389 | 12/1982 | Hussey | 307/66 |
| 4,370,723 | 1/1983 | Huffman et al. | 464/483 |
| 4,388,534 | 6/1983 | Love et al. | 307/66 |
| 4,400,624 | 8/1983 | Ebert, Jr. | 307/43 |
| 4,400,625 | 8/1983 | Hussey | 307/66 |
| 4,473,756 | 9/1984 | Brigden et al. | 307/66 |
| 4,488,058 | 12/1984 | Cheffer | 307/66 |
| 4,510,571 | 4/1985 | Dagostino, et al. | 364/487 |
| 4,516,035 | 5/1985 | Rhoads et al. | 307/66 |
| 4,604,530 | 8/1986 | Shibuya | 307/66 |
| 4,677,309 | 6/1987 | Ogawa | 307/46 |
| 4,694,402 | 9/1987 | McEachern et al. | 364/487 |
| 4,713,553 | 12/1987 | Townsend et al. | 307/64 |
| 4,748,341 | 5/1988 | Gupta | 307/64 |
| 4,763,013 | 8/1988 | Gvoth, Jr. et al. | 307/66 |
| 4,763,014 | 8/1988 | Model et al. | 307/66 |
| 4,782,241 | 11/1988 | Baker et al. | 307/66 |
| 4,797,936 | 1/1989 | Nakatsugawa et al. | 382/1 |
| 4,814,934 | 3/1989 | Jones et al. | 361/88 |
| 4,860,149 | 8/1989 | Johnston | 361/79 |
| 4,860,185 | 8/1989 | Brewer et al. | 307/66 X |
| 4,868,832 | 9/1989 | Marrington et al. | 371/66 |
| 4,890,005 | 12/1989 | Schornack | 307/87 |
| 4,916,329 | 4/1990 | Dang et al. | 307/66 |
| 4,920,475 | 4/1990 | Rippel | 363/132 |
| 4,956,563 | 9/1990 | Schornack | 307/66 |
| 5,070,251 | 12/1991 | Rhodes et al. | 307/46 |
| 5,184,025 | 2/1993 | McCurry et al. | 307/66 |
| 5,210,685 | 5/1993 | Rosa | 307/66 X |
| 5,229,650 | 7/1993 | Kita et al. | 307/66 |
| 5,229,651 | 7/1993 | Baxter, Jr. et al. | 307/66 |

FOREIGN PATENT DOCUMENTS

| | | |
|---|---|---|
| 410716 | 1/1991 | European Pat. Off. . |
| 416569 | 3/1991 | European Pat. Off. . |
| 7803 | 5/1991 | PCT Int'l Appl. . |
| 15048 | 10/1991 | PCT Int'l Appl. . |

*Primary Examiner*—Edward R. Cosimano
*Attorney, Agent, or Firm*—Foley & Lardner

[57] ABSTRACT

A back-up uninterruptible power system has a power supply path from input terminals connected to AC power system lines to normally supply power to a load. Upon the occurrence of a line fault, a static switch in the power supply path interrupts the connection between the AC power lines and the load and an inverter is turned on to provide power derived from an auxiliary battery through a transformer to the power supply path to supply AC power to the load. By using the static switch, switching from line connection to backup power can be done quickly, within a half cycle, so that substantially no interruption of the output waveform is observed. The inverter can be operated to provide a commutation pulse to the SCRs in the static switch to commutate an SCR which might otherwise continue conducting after the triggering signals to the gates are cut off and before the inverter supplies the AC power to the load. A relay connected between the input terminals and the static switch is controlled to open relay contacts after the static switch has interrupted the current flow to the load, thereby providing positive electrical isolation of the AC power system from the uninterruptible power system while allowing the mechanical relay contacts to switch only during times of no current. Line fault detection is carried out by creating a digital waveform composed of an average of prior cycles of the AC input waveform, converting the stored waveform to an analog signal, and comparing it with the present input signal in phase lock therewith to detect deviation of the input signal from the reference waveform.

48 Claims, 30 Drawing Sheets

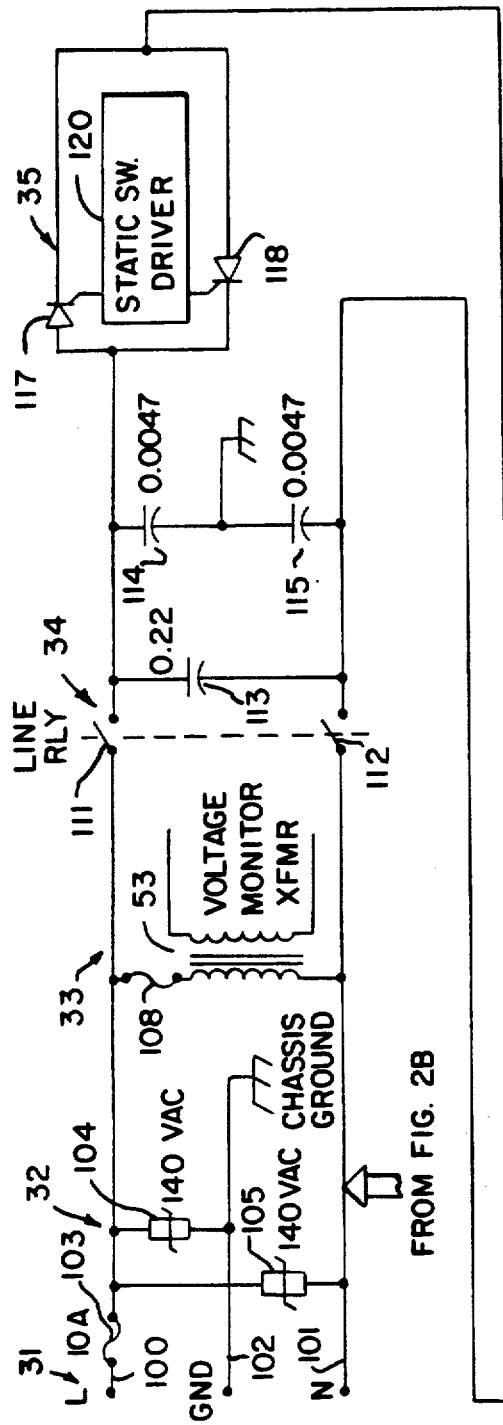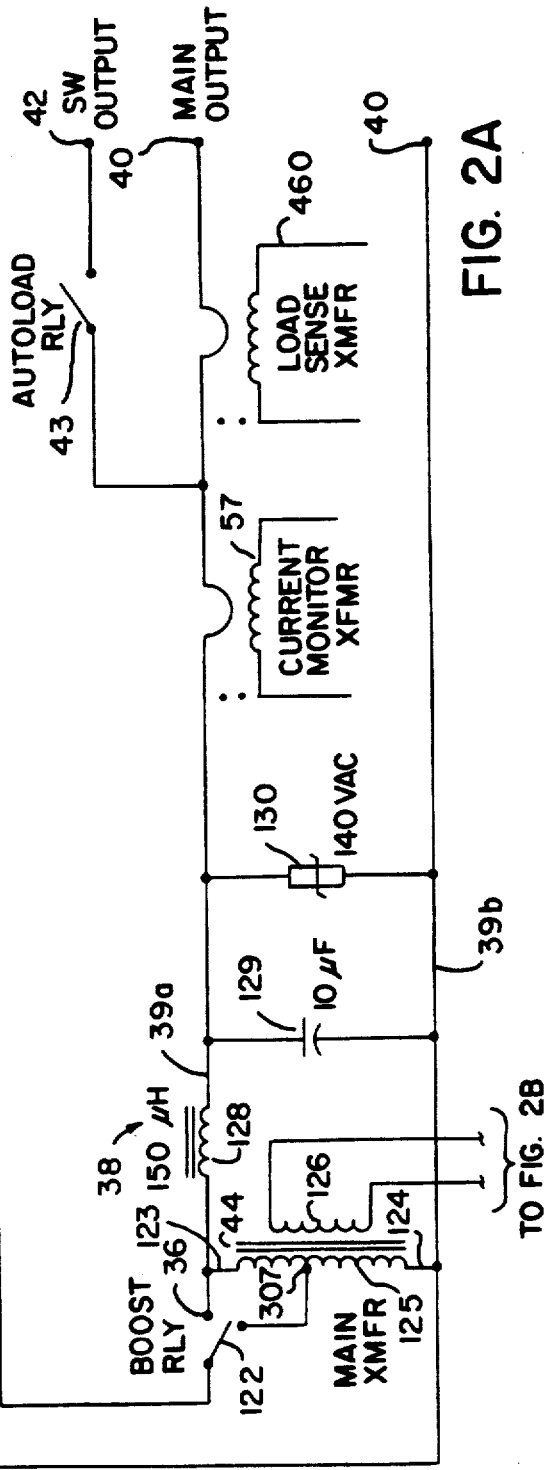
FIG. 2A

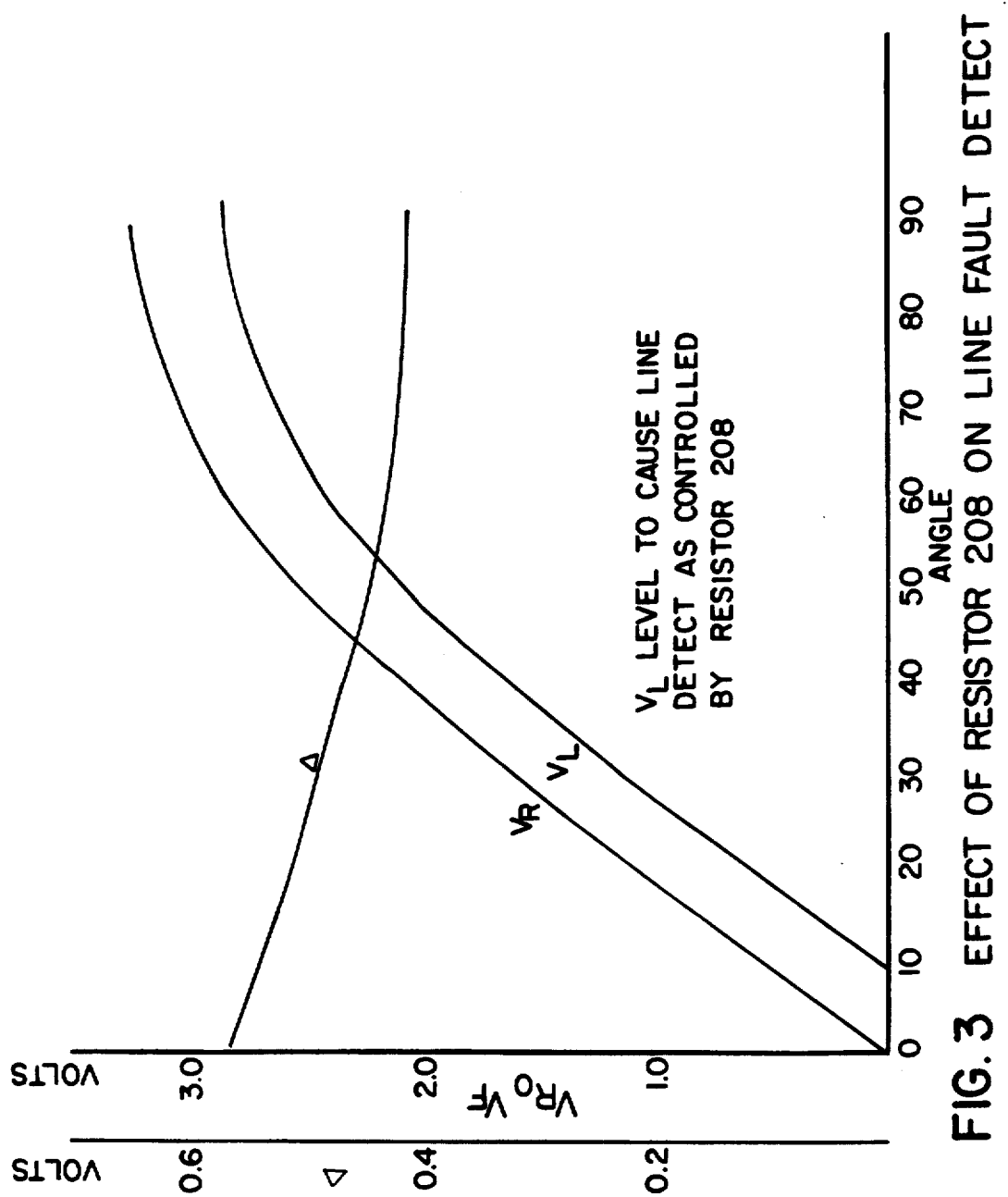

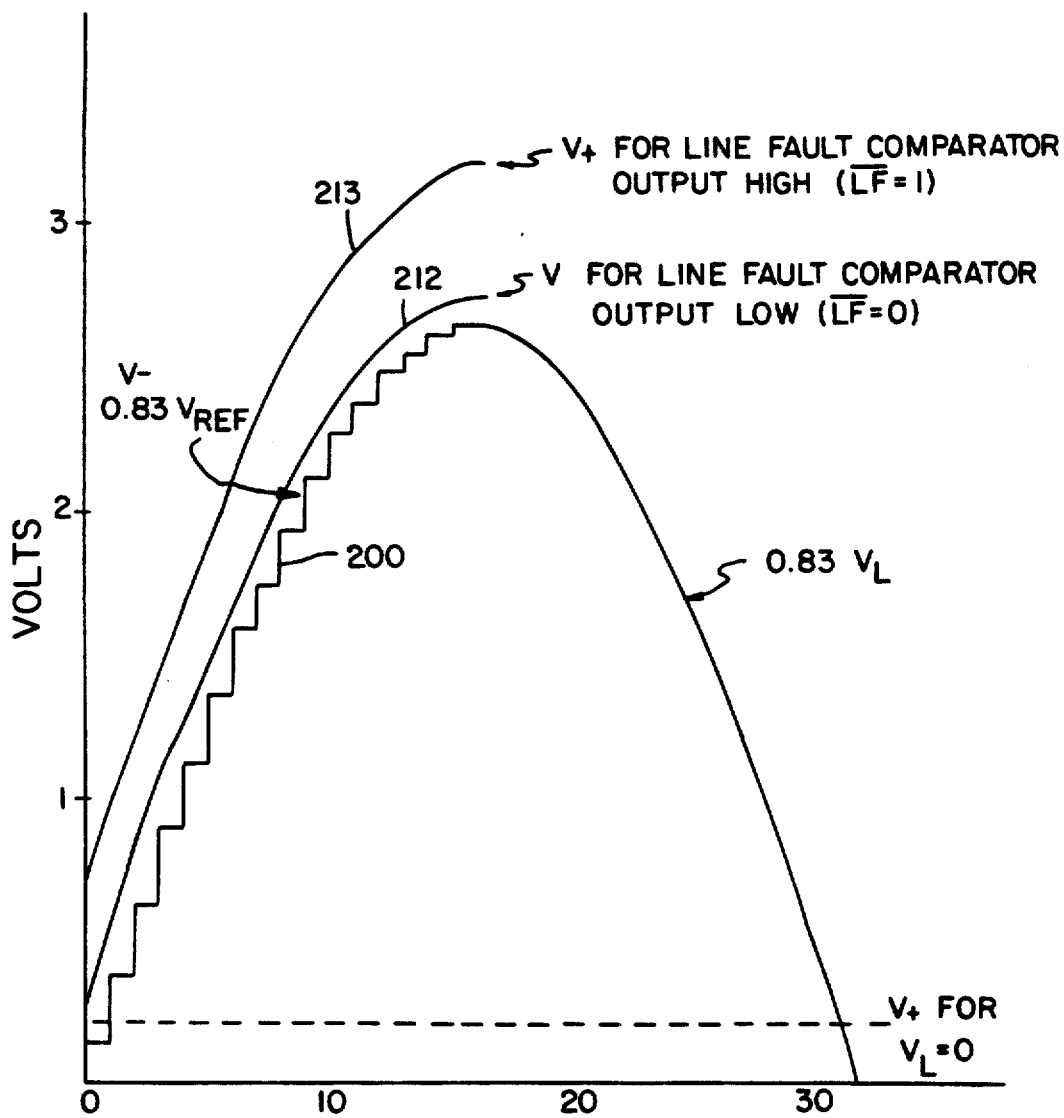
FIG. 4 OUTPUT SAMPLE

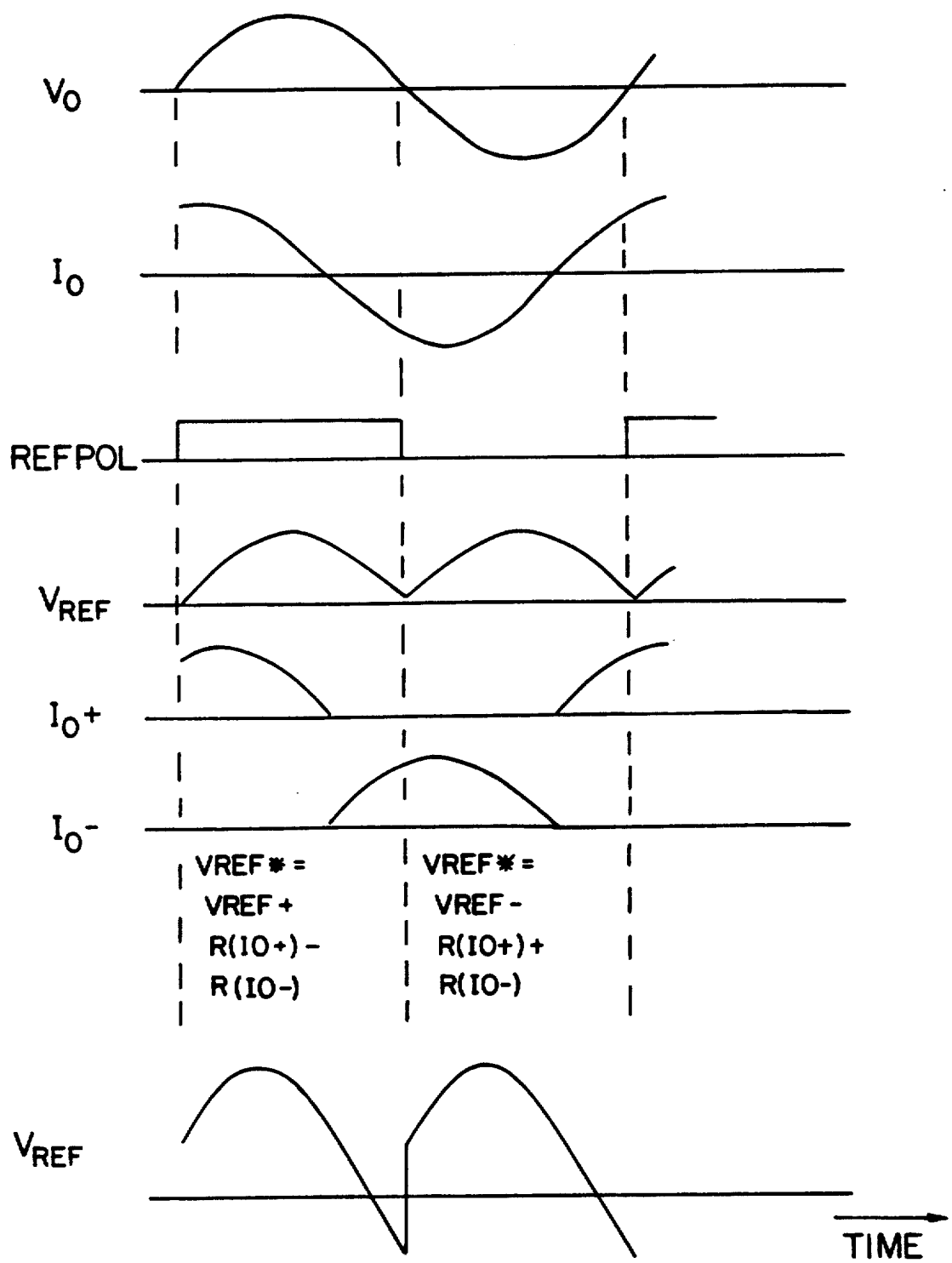
FIG. 7 REFERENCE COMPENSATION FOR LEADING POWER FACTOR LOAD

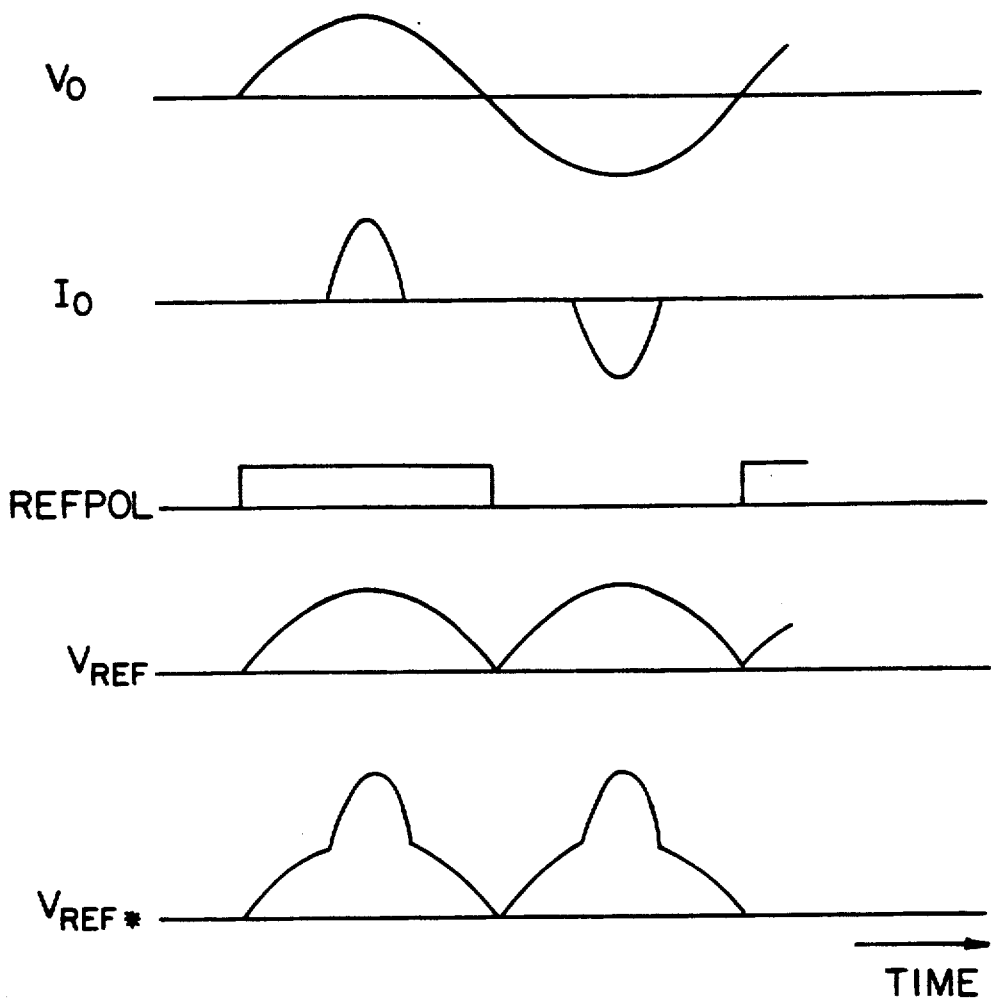
FIG. 8 REFERENCE COMPENSATION FOR DISTORTION POWER FACTOR LOAD

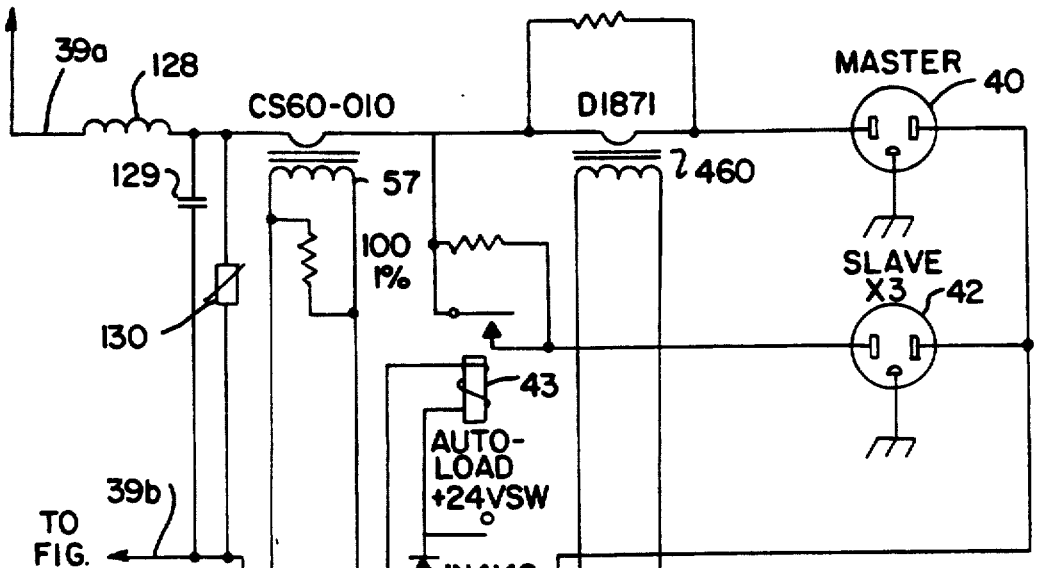
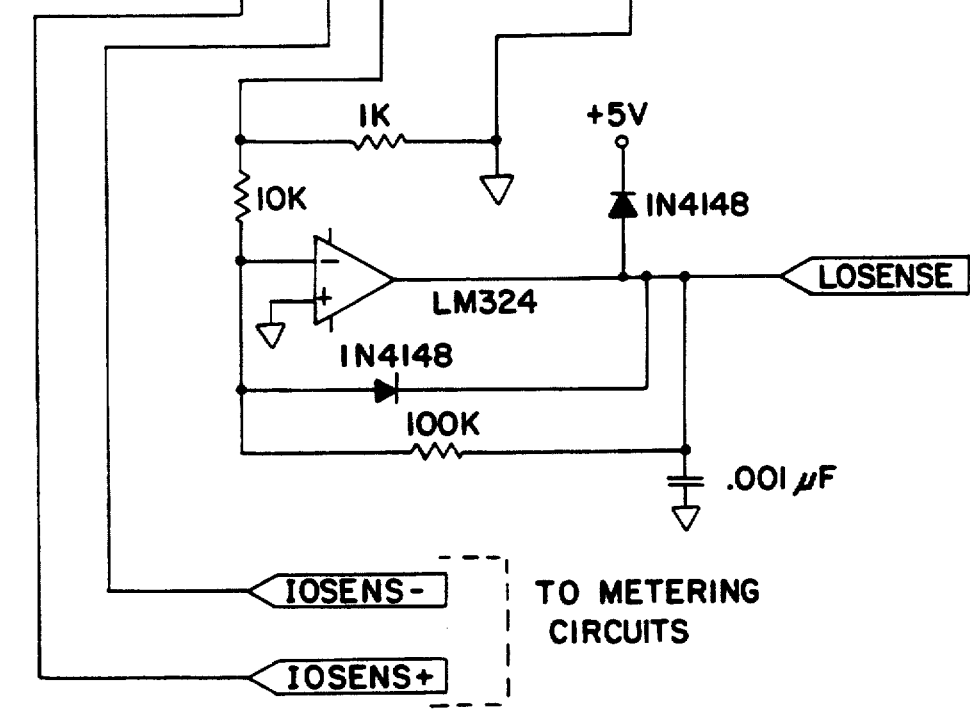
FIG. 9B

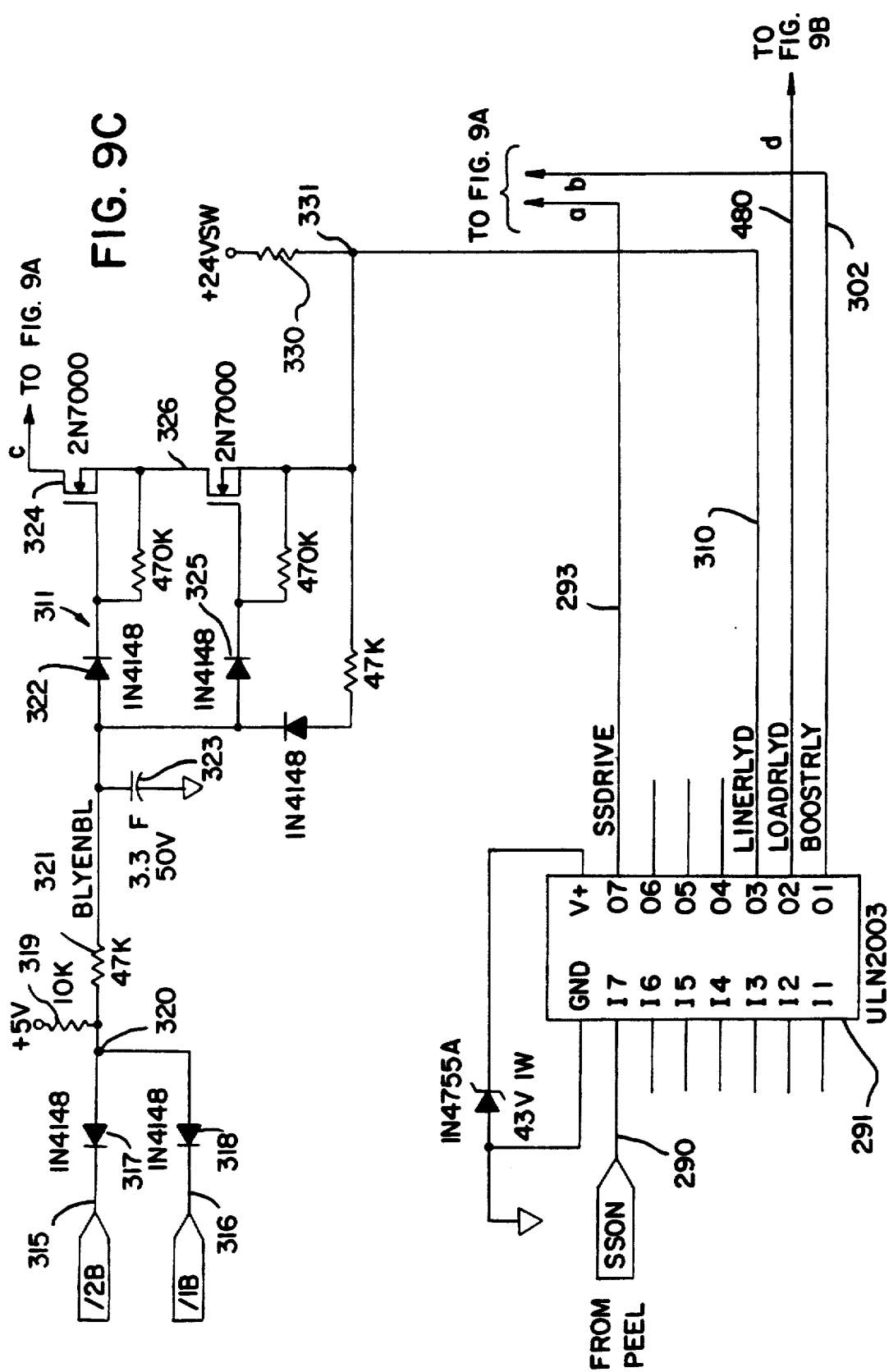

FIG. 15
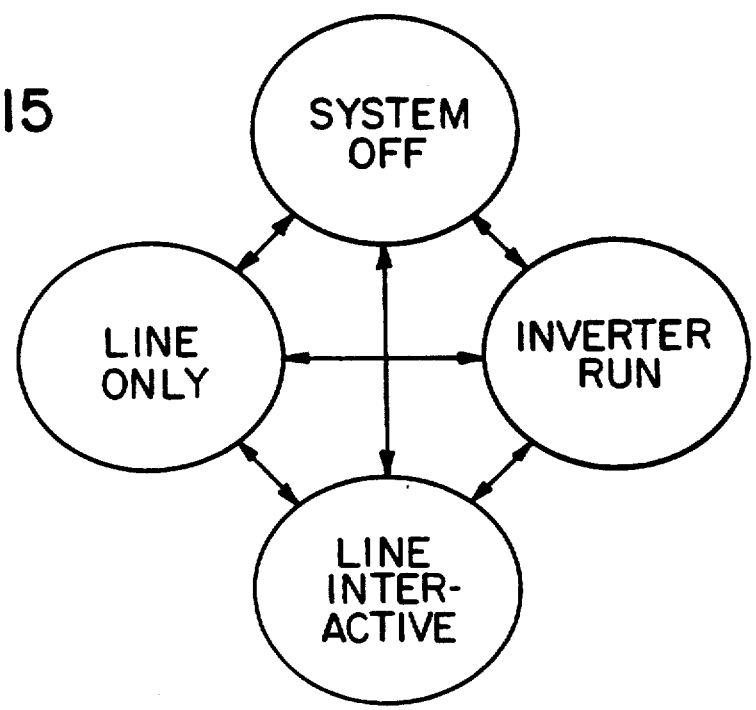
FIG. 17  STATE DIAGRAM
PWM & STATIC SWITCH SEQUENTIAL LOGIC
X, I or O = GENERAL VARIABLES
SEE BOOLEAN EQUATIONS
FOR SPECIFIC VARIABLES
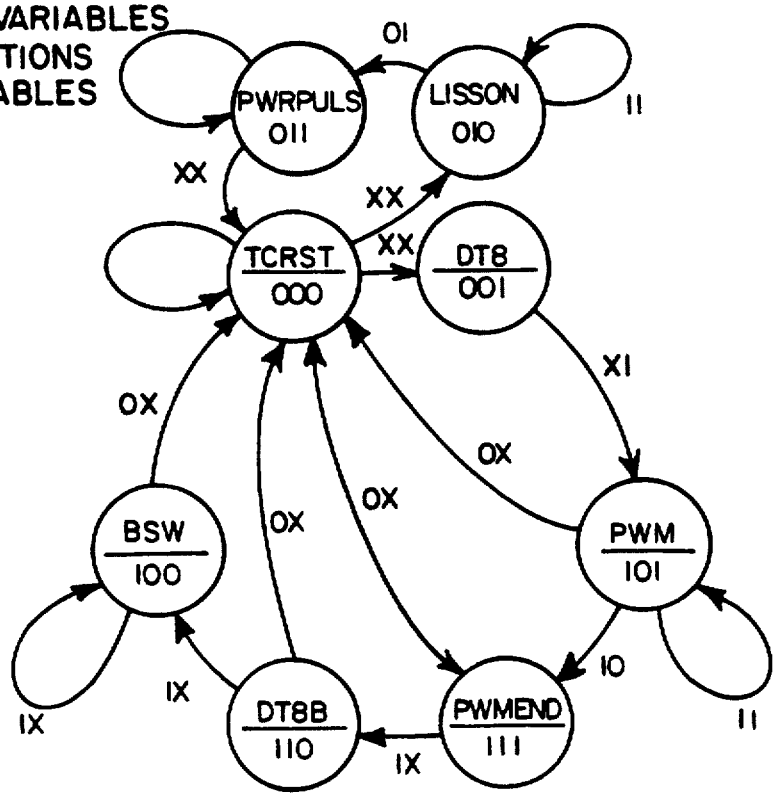

BOOLEAN EQUATIONS

| SYSTEM MODE | STATE INFORMATION | SYSTEM CONDITION |
|---|---|---|

MICROSTATE DECODING SECTION --

```
Q1  =   SSON & INVON &    !Q3 & Q2 & !Q1 &    !PWMFREQ & !LFAULT #
        SSON & INVON &    !Q3 & Q2 & !Q1 &    !LFAULT & !GP #
        SSON & INVON &    !Q3 & Q2 & Q1 &     PWMFREQ #
        !SSON &           !Q3 #
        !SSON &           !Q2 &                PWMFREQ #
                                     Q1 &
              INVON &     !Q3 & !Q2 &          !LFAULT #
              INVON &            !Q2 & Q1 &    PWMFREQ & !LFAULT #

Q2  =   SSON & INVON &    !Q3 & !Q2 & !Q1 &   LFAULT & 20K #
        SSON & INVON &    !Q3 & Q2 & !Q1 #
        !SSON &           !Q3 &        Q1 &    !LPULSEND #
        !SSON &                  Q2 & Q1 &     PWMFREQ
        !SSON &                        Q1 &    PWMFREQ & !LPULSEND #
              INVON &                  Q1 &    PWMFREQ & !LPULSEND & !LFAULT #
              INVON &           Q2 &   Q1 &    PWMFREQ & !LFAULT #
                          !Q3 & Q2 &   Q1 &    PWMFREQ

Q3  =   !SSON &           !Q3 &        Q1 #
        !SSON &           Q3 &                 PWMFREQ #
              INVON &     !Q3 & !Q2 & Q1 &     !LFAULT #
              INVON &     Q3 &                 PWMFREQ & !LFAULT
```

H-BRIDGE MOSFET SWITCH SECTION OUTPUTS --

```
2B  =   !SSON & INVON &                        POL #
        SSON & INVON &    Q3 &                 !LFAULT & POL #
        !SSON & INVON &   !Q3 & !Q2 & Q1 #
        SSON & INVON &    Q3 & !Q2 & !Q1 &     !LFAULT #
        SSON & INVON &    !Q3 & Q2 & Q1 &      GP & !POL & 1A #
        SSON & INVON &    !Q3 & Q2 & Q1 &      !GP & POL & 1A

2A  =   !SSON & INVON &    Q3 & !Q2 & Q1 &     !POL & LPULSEND #
        SSON & INVON &     Q3 & !Q2 & Q1 &     !LFAULT & !POL & LPULSEND #
        SSON & INVON &    !Q3 & Q2 & Q1 &      GP & POL & LPULSEND #
        SSON & INVON &    !Q3 & Q2 & Q1 &      !GP & !POL & LPULSEND

1B  =   !SSON & INVON &                        !POL #
        SSON & INVON &    Q3 &                 !LFAULT & !POL #
        !SSON & INVON &   Q3 & !Q2 & !Q1 #
        SSON & INVON &    Q3 & !Q2 & !Q1 &     !LFAULT #
        SSON & INVON &    !Q3 & Q2 & Q1 &      GP & POL & 2A #
        SSON & INVON &    !Q3 & Q2 & Q1 &      GP & !POL & 2A

1A  =   !SSON & INVON &    Q3 & !Q2 & Q1 &     POL & LPULSEND #
        SSON & INVON &     Q3 & !Q2 & Q1 &     !LFAULT & POL & LPULSEND #
        SSON & INVON &    !Q3 & Q2 & Q1 &      GP & !POL & LPULSEND #
        SSON & INVON &    !Q3 & Q2 & Q1 &      !GP & POL & LPULSEND
```

STATIC SWITCH

```
SSONOUT =
        SSON & !INVON &   !Q3 & !Q2 & !Q1 &    20K #
        SSON &  INVON &   !Q3 & !Q2 & !Q1 &    LFAULT #
        SSON &  INVON &   !Q3 & Q2 & !Q1 &     20K & LFAULT #
```

FIG. 19

BACK-UP UNINTERRUPTIBLE POWER SYSTEM

This application includes a microfiche appendix listing of a computer program having 3 microfinche and 130 frames. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of electrical power systems, and particularly to uninterruptible power supplies or systems.

BACKGROUND OF THE INVENTION

Uninterruptible power supplies or systems (commonly referred to as UPS) are used to provide back-up power to critical loads such as computer systems where a loss of line power can result in the interruption of programs and the loss of valuable data. Uninterruptible power supplies may also provide a line power conditioning function to ensure that transient spikes, low-voltage conditions, or distorted power waveforms on the AC power system do not disturb the operation of the computer which is supplied with power through the UPS. Typically, the UPS includes a battery which is interfaced through an inverter to the AC output line. One type of UPS operates such that when a fault occurs in the input AC power, the inverter is controlled to provide power from the battery to the A output line at the same frequency and with substantially the same waveform as the normal input AC power. It is desirable that the switching at the time of fault is accomplished as smoothly as possible so that substantial transient spikes or dips in the waveform supplied to the AC output line do not occur.

In double conversion UPS systems, the AC power is rectified to a DC voltage which is applied, in parallel with the battery voltage, to a constantly running inverter. If the inverter fails or is otherwise unable to supply power to the load, and AC power is still available from the AC power system, a bypass is usually provided around the UPS which is switched in to supply line power directly to the load. Ordinarily, however, the inverter runs constantly so that line power is not being directly connected to the load. If the line power fails, the output inverter continues to operate, but now delivers power from the back-up power source (usually a battery) to the critical load. The input rectifier is normally able to prevent back flow of power from the battery into the main power system, but in some cases a relay may be provided to disconnect the rectifier from the AC power mains during a power outage or a brownout to electrically isolate the battery and inverter from the input terminals to the UPS and thus to the AC power mains. Because the converter is constantly running and supplying power to the load, rapid switching to disconnect the power mains from the UPS upon power failure is not necessry to avoid interruptions or glitches in the power supplied to the load. Rapid switching is required, however, if the inverter itself fails and it is necessary to switch the load directly to the AC power mains, with the typical result that a momentary interruption in power supplied to the load occurs. Because the inverter in a double conversion UPS is operating constantly, energy is constantly consumed by the UPS itself. The inverter must also be sized and rated to operate constantly under all load conditions, thus requiring costly components.

In UPS systems which utilize a ferroresonant transformer, the inverter need not be running constantly since power is normally delivered from the AC power mains through the ferroresonant transformer to the load, with the ferroresonant transformer providing transient filtering of input line power and some compensation of short power disturbances. Upon detection of a power outage or brown-out on the AC power lines, an AC switch can be opened to disconnect the primary of the ferroresonant transformer from the AC power mains and an inverter is turned on to supply power from a battery to an auxiliary primary of the ferroresonant transformer which then takes over the job of supplying the power to the load. Because of the energy storage and waveform smoothing characteristics of the ferroresonant transformer, the switching events, if properly timed, will not significantly affect the waveform of the output voltage provided from the secondary of the ferroresonant transformer to the load, resulting in "no break" power to the load. An example of a ferroresonant UPS system is shown in U.S. Pat. No. 4,692,854 to Richard V. Baxter, et al. entitled Method and Apparatus for Modulating Inverter Pulse Width.

In certain other types of back-up power supplies, the AC power mains are normally connected directly to the load, and an inverter is turned on to supply power to the load typically only when the AC power mains fail. An advantage of such systems is that the direct connection of the AC power lines to the load during normal operation avoids energy loss in the auxiliary power supply and allows relatvely less expensive and less complicated inverter components to be used since the inverter will be operated infrequently. However, because the AC power mains are ordinarily directly connected to the load, upon failure of the AC power mains the auxiliary power system must first disconnect the load from the AC power system and then turn on the inverter to supply power to the load from the back-up power source, e.g., a battery. The switching time required can extend over a significant portion of a 50 Hz or 60 Hz power system cycle, or even several cycles, often resulting in a momentary disruption of power supplied to the load, or at the least a significant distortion of the waveform of the power supplied to the load. For safety reasons, the battery and inverter of the auxiliary power supply must be electrical isolated from the AC power mains by mechanical switches, which unavoidably have relatively slow switching times as compared to a 60 Hz waveform cycle. Further, the opening of the relay switches while power current is still being supplied through them from the AC power system to the load (as during a brown-out as opposed to a total power failure, or where a glitch or waveform distortion condition is occurring in the AC power system which requires disconnection of the power system from the load) arcing, sticking or even welding of the mechanical relay contacts can occur as they are rapidly opened while carrying current in an attempt to disconnect the load from the power system.

In a UPS system in which the inverter is not constantly running to supply power to the load, the ability to rapidly and accurately detect failure of the AC power system voltage, while avoiding unnecessary operation of the UPS, is a significant consideration. Generally, it is desirable if the UPS can detect power outages within a fraction of a 60 Hz half-cycle so that the UPS can be switched to supply power to the load within the same half cycle as that in which the power loss from the AC power system was detected. An adaptive system for detecting power outages in UPS systems is described in United States patent application Ser. No. 07/404,902, filed Sept. 8, 1989 by Richard V. Baxter, Jr. et al., entitled Method and Apparatus for Line Power Monitoring for Uninterruptible Power Supplies, now U.S. Pat. No. 5,229,651, the disclosure of which is incorporated herein by reference. The system disclosed in that patent application adaptively produces a reference waveform to which the present AC power system waveform is compared in a microprocessor. The reference waveform is a composite of data from a series of prior waveform cycles which changes at a relatively slow rate so that a moderate change in the voltage waveform indicative of a fault will be detected, while the reference can nonetheless adapt and conform to systematic distortions of the line power which deviate from a pure sine wave, but which are not indicative of power line failure, so as to avoid unnecessary switching of the UPS.

SUMMARY OF THE INVENTION

The back-up uninterruptible power system of the present invention provides substantially direct and efficient connection of the AC power mains to the critical load during normal conditions on the AC power system, so that relatively little energy is consumed in normal operation by the back-up power system itself. A power failure on the AC power mains is rapidly and accurately detected by the back-up power system, which rapidly isolates the AC power mains from the load and provides AC power, derived from a DC power source such as a battery, to the critical load with sufficient speed that no interruption in power is seen by the load. A critical load, such as a computer, thus will not have its power interrupted so as to lose data or otherwise interrupt its operation during the switch-over from AC line power to back-up power. Typically, the transfers from line power to back-up power are accomplished in a fraction of a cycle of the 60 Hz power.

The back-up power system includes a main transformer which has a secondary connected across the lines forming the power supply path through the backup power system, and a primary connected to an inverter which is supplied with DC power from a storage source such as a battery. A relay and a static switch, the latter composed of semiconductor switches such as SCRs, are connected in series between the input terminals of the back-up power system and the transformer. During normal supply of AC power to the load from the power mains, the relay contacts of the relay and the static switching devices are both closed to provide a direct connection of power to the load. Upon detection of line power failure, the static switch is rapidly turned off, in a fraction of a 60 Hz power cycle, and the inverter is turned on to supply power to the load. Where SCRs are used as the switching devices, the inverter is operated to provide a commutation voltage through the main transformer to force-commutate the SCRs and thereby ensure isolation of the inverter from the AC power lines. The turn-off of the SCRs and the turn-on of the inverter is carried out in a very short period of time so that little or no change is seen in the output voltage waveform during the switchover. Potential switching transients are further minimized by a low pass filter in the power path to the load. After the static switch is opened, the contacts of the relay are opened, under zero current flow conditions, to provide open circuit isolation of the input terminals of the back-up power system from the load.

Rapid line power failure detection is facilitated by a microprocessor controller which examines the input power and creates a reference waveform composed of a historical average of prior input cycles. The reference waveform is provided through a digital-to-analog converter to an analog comparator which compares the AC input signal to the reference voltage, the latter being read out by the microprocessor phase locked to the incoming AC signal. A selectable offset is provided between the incoming AC signal and the reference to define a tolerance band within which deviations of the AC input waveform from the norm will not trigger operation of the back-up power system. The tolerance band is preferably widest near the zero crossings of the waveform to avoid unnecessary triggering of a switchover to backup power.

The reference voltage generated by the microprocessor preferably is also used during inverter operation to provide a pulse width modulation (PWM) reference, with the switching devices of the inverter operated to provide the desired PWM pulses to the primary of the transformer, and the voltage at the secondary is supplied through appropriate low pass filtering to the load to provide essentially a sine wave shaped output voltage waveform to the load. The reference waveform is preferably compensated for power factor of the load, and the switching devices of the (e.g., H bridge) inverter are monitored to ensure that the current conducted through the switching devices (e.g., power FETs) does not exceed a selected limit. A preferred H bridge construction includes multiple switching devices in each arm of the bridge, with the top arms containing fewer paralleled switching devices than the lower arms, and with the lower arms operated to allow free-wheeling of current through the lower switches during periods between the pulses of the PWM waveform generated by the inverter. In this manner, the duty cycles of the individual FETs in the bridge are substantially balanced so that all devices are stressed approximately equally.

By utilizing a main transformer having an intermediate tap or taps, and a boost relay connected in the power supply path between the static switch and the transformer, under low power conditions from the AC power system which are indicative of brown-out but not total power system failure, the back-up power system can be operated to boost the voltage supplied to the load. The power system momentarily disconnects the load from the AC power lines, supplies power to the load from the inverter, switches the boost relay to connect to an intermediate tap of the transformer, and thereafter shuts off the inverter and reconnects the AC power lines. The connection of the AC power to an intermediate tap of the main transformer results in an increased voltage provided across the full secondary winding of the transformer as applied to the load, with the transformer thus effectively operating as an autotransformer. In this manner, the effective voltage applied to the load can be maintained relatively constant despite drops in voltage from the power mains. Upon return of the power mains to normal AC voltage levels, the process can be reversed, i.e., by opening the static switch to disconnect the AC power lines from the load, supplying power from the inverter to the load, changing the position of the contacts in the boost relay back to their normal position, turning off the inverter, and thereafter closing the static switch to reconnect power from the mains to the load. Because switching between line power and inverter power is accomplished quickly and without output waveform distortion, the load sees a substantially continuous output voltage waveform.

In the present invention, the main transformer and the H-bridge type inverter are advantageously utilized to provide charging of the battery during normal supply of AC power from the mains. Under normal conditions, the secondary of the main transformer functions as a primary to provide an output voltage on the transformer winding which is connected to the inverter. The intrinsic diodes of the switching devices in the lower arms of the H-bridge are used as rectifiers, forming two arms of a full-bridge rectifier which is connected to one side of the transformer winding, and with rectifying devices connected to the other side of the transformer winding through a main charging device to the battery. The main charger preferably includes a boost controller which serves to boost the output voltage from the rectifying devices to the desired voltage level required to charge the battery.

A further preferred feature of the back-up power system is the provision of multiple outlets to which several consuming devices can be connected. For example, the back-up power system may provide power separately to a computer and to its peripheral devices such as printers, CRTs, disk drives, and so forth. The power supply of the present invention may be operated so that the consuming device connected to a master outlet controls the turn-on and turn-off of power to the other outlets, e.g., the turn-off of the main computer by the user will result in shutdown of power to the peripherals. This is accomplished by monitoring the current supplied to the master outlet, and closing relays in power lines connected to the slave outlets as long as current continues to flow to the master outlet. When power to the master outlet is interrupted, the relay contacts at the slave outlets are opened to shut off the power to the auxiliary devices connected to the slave outlets.

A main controller monitors the input voltage to the system, the output current, and the various state conditions of the power system. The controller, which may utilize a microcomputer or microprocessor, controls the operation of the system to ensure rapid detection of line failures, coordinated turn on of the inverter to supply power to the load, and the reconnection of the power to the load upon restoration of power on the AC power system, as well as controlling the other functions of the system in an efficient and cost effective manner.

Further objects, features and advantages of the invention will be apparent from the following detailed description when taken in conjunction with the accompanying drawings.

BRIEF DESCRIPTION OF THE DRAWINGS

In the drawings:

FIG. 3 is a graph illustrating the comparison of line voltage to a reference waveform.

FIG. 4 is a graph further illustrating the formation of the reference waveform and the comparison with the line voltage waveform under various operating conditions.

FIG. 7 are graphs illustrating the formation of the voltage reference waveform for the pulse width modulator under various system conditions, particularly a leading power factor load.

FIG. 8 are graphs showing the waveforms in the system including the generation of the voltage reference waveform for pulse width modulation, particularly for distortion power factor load.

FIG. 15 is an illustrative graph showing transitions between various system states in the present invention.

FIG. 17 is a state flow diagram which depicts the state transition under various conditions in the back-up power system.

FIG. 19 is a table showing exemplary control equations for operation of a preferred programmable logic array device in accordance with the present invention.

DETAILED DESCRIPTION OF THE INVENTION

Figure 1:
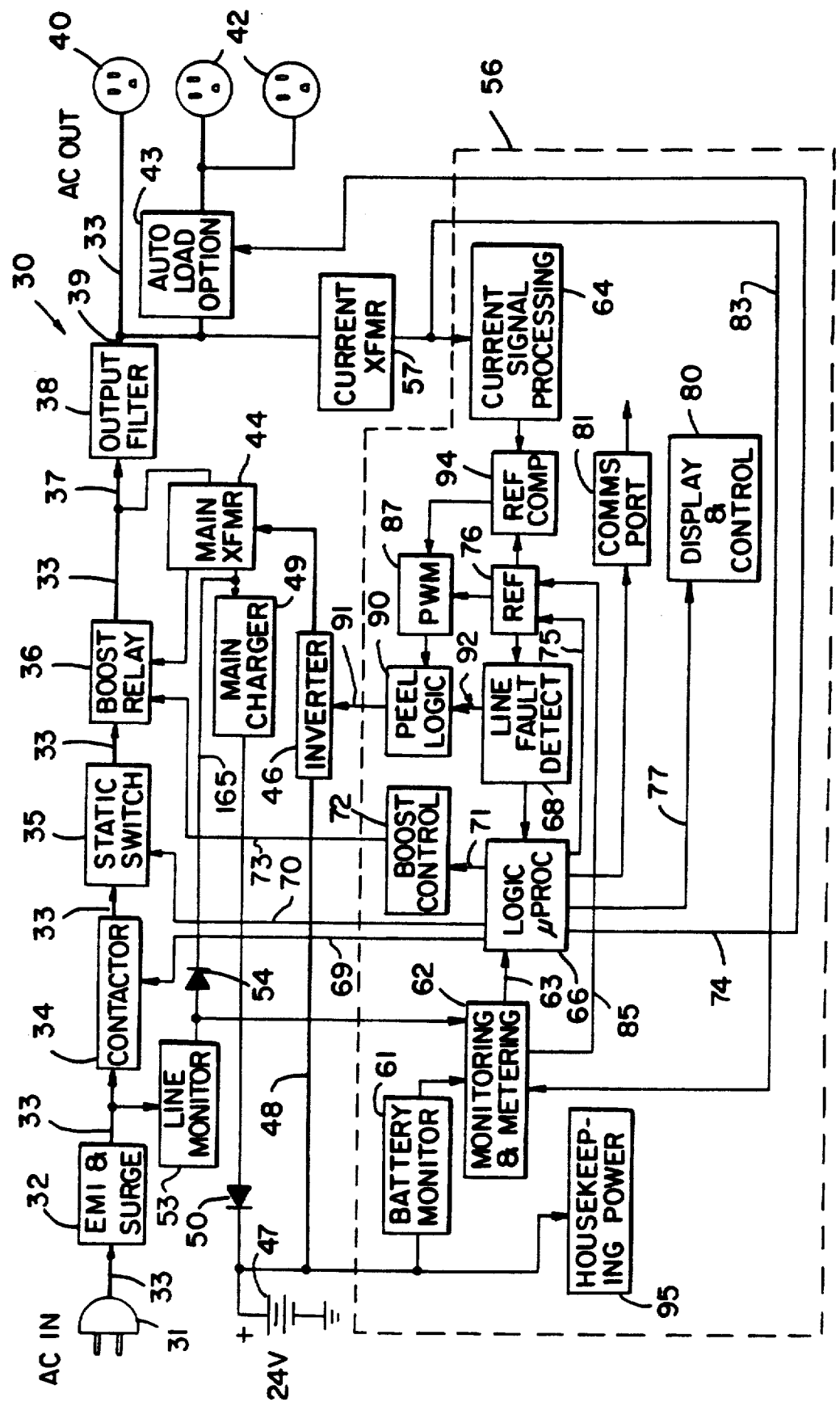
FIG. 1 is a block diagram of the back-up uninterruptible power system of the present invention.

With reference to the drawings, a block diagram which provides an overview of the back-up uninterruptible power system of the invention is shown generally at 30 in FIG. 1. This block diagram is somewhat simplified and abstracted to best illustrate the main functional units of the system and their interrelationship. Reference should be made to subsequent descriptions of the functional units to determine the actual operation of the system. AC power is received from the lines of an AC power system (e.g., from power utility mains) at input terminals such as an inlet plug 31, and this AC power is provided to a power supply path 33 and is filtered by an electromagnetic interference (EMI) and surge suppression circuit 32. The filtered AC power is provided on the power supply path 33 serially through a contactor relay 34, a static switch 35, a boost relay 36, and an output filter 38 to AC output terminals 40 to which the critical load, e.g., a computer, is connected. As explained further below, additional slave AC outlets 42 may receive power from the output filter 38 through an auto load control circuit 43. The functions of each of these components are discussed further below.

During normal supply of AC power to the power system input terminals 31, the relay contactor 34 and the static switch 35 are closed, providing electrical continuity therethrough and supplying AC power on the power supply path through the output filter 38 to the output terminals, the outlets 40 and 42. As discussed further below, the boost relay 36 cooperates with the main transformer 44 during low AC line voltage conditions to help boost the output voltage provided to the AC output terminals when the AC power has not completely failed, but is not providing a sufficiently high output voltage (a brown-out condition). When power from the AC power mains fails, an inverter 46 is turned on, and DC power is supplied to the inverter from an auxiliary power supply 47 on a DC bus 48. The inverter supplies AC voltage to the primary of the transformer 44, which then provides output power on the output line 37. The low pass output filter 38 filters out any switching transients so that the output waveform is continuous and undistorted during the switchover from line power to inverter and back again. To prevent backflow of power from the main transformer 44 to the failed AC power system, the static switch 35 is first turned off to cut the power flow through it before the inverter supplies power to the load, and then the relay contactor 34 is opened up to provide galvanic isolation of the transformer 44 from the AC power system.

The battery 47 (e.g., 24 volt storage battery) is preferably charged in two ways: first, from power supplied from the main transformer 44 wherein its primary now acts as a secondary, extracting power from the line 37 through a main charger 49 which is rectified, as by a diode 50, and supplied to the battery 47; and second, from the AC power system through a line monitor transformer 53 rectified by a rectifier 54 and provided to the input of the main charger 49.

The line monitor 53 monitors the voltage from the AC power system after passing through the EMI filter and surge supressors 32 to allow a determination of when the AC power system has failed completely or when its voltage has dropped from nominal voltage levels. The signal from the line monitor 53 is passed to a system controller, shown within the dashed lines labeled 56 in FIG. 1. The controller 56 also receives a signal from a current transformer 57, which is conneoted to the output power lines 39, to provide the controller with information indicative of the current being delivered by the back-up power system 30 to the power consuming equipment.

The controller 56 functions to monitor the condition of the system and to control its various components in reaction to system conditions. In addition to the line monitor 53 and the current transformer 57, a battery monitor 61 is used to monitor the voltage of the battery 47 and to provide a signal to the controller 56 indicating the state of the battery. The controller 56 includes a metering and monitoring circuit 62 which receives the signals from the battery monitor 61 and the line monitor 53, a current signal processing circuit 64 which receives the signal from the current transformer 57, a microprocessor system 66, with associated memory and input and output devices, which receives the signals from the monitoring circuit 62 and from a line-fault detection circuit 68 and provides control signals on lines 69 to the relay contactor 34, on a line 70 to the static switch 35, on a line 71 to a boost control circuit 72 which provides a drive signal on a line 73 to the boost relay 36, on lines 74 to the auto load circuit 43, and on lines 75 to a waveform reference generating circuit 76. The microprocessor 66 can communicate on input and output lines 77 to display and control circuits 80 (e.g., LED displays and a keyboard, with appropriate control and drive circuitry) which allow communication with the user, and through communication ports 81 to peripheral equipment. The output signal from the current transformer 57 is also provided on a line 83 to the metering and monitoring circuit 62 which provides its signal to the microprocessor on a line 63. The output of the monitoring and metering circuit 62 is also provided on a line 85 to the reference generating circuit 76. The output of the reference generating circuit 76, which is explained further below, is provided to a reference compensation circuit 94, while in turn sends a signal to a pulse width modulator 87 which provides signals to a programmable logic (PEEL) circuit 90 which provides drive signals on lines 91 to the inverter 46. The PEEL logic 90 also receives a signal on a line 92 from the line fault detection circuit 68. The output of the reference generating circuit 76 is provided to the line fault detection circuit 68 and to a reference compensation circuit 94 which receives the output of the current signal processing circuit 64.

As is also shown in FIG. 1, a housekeeping power supply 95 receives power from the battery 47 or from the chargers supplying power to the battery, and provides the various levels of power required by the operating components of the system 30.

The foregoing provides an illustrative overview of the main functional components of the power system 30 and their interconnection. These units are described in further detail below.

Figure 2B:
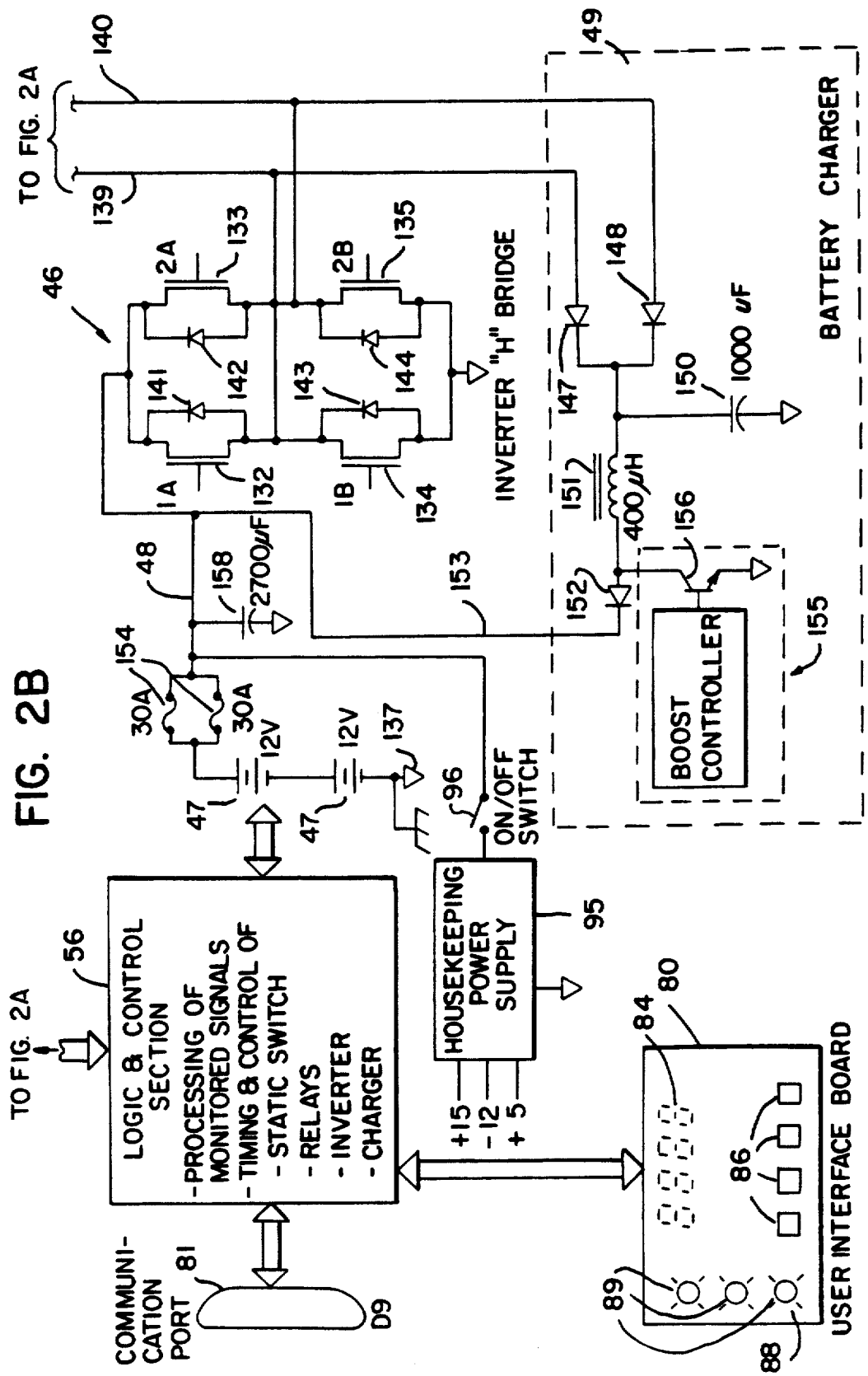
FIG. 2 composed of FIGS. 2A and 2B is a simplified schematic diagram of the electrical power paths through the back-up uninterruptible power system of the present invention.

A somewhat simplified schematic circuit diagram of the main components in the power flow path of the backup uninterruptible power system 30 is shown in FIG. 2A and 2B. As shown in FIG. 2A, the input terminals 31 of the system 30 include a live or high line 100, a low or neutral line 101, and a ground line 102 which is adapted to be connected to the ground of the AC power system. The surge suppression and protection circuit 32 includes a fuse 103 and varistors 104 and 105 connected between the high line 100 and the ground line 102 and between the high line 100 and the neutral line 101. The line 102 is also preferably connected to chassis ground. A main power fuse 103 is connected in the high line 100. The power across the lines 100 and 101 is provided to the voltage monitor transformer 53, which is protected by a fuse 108. The line relay 34 preferably consists of an upper relay contact 111 and a lower relay contact 112 so that both of the lines 100 and 101 are isolated from the rest of the backup power system 30 when the relay 34 is open. The output power from the relay 34 is filtered by a capacitor 113 connected between the lines 100 and 101, and by capacitors 114 and 115 connected between the lines 100 and 101 and ground, to filter out high frequency noise and any transients involved in opening or closing the relays.

The static switch 35 preferably consists of two controllable semiconductor switching devices, illustratively shown as thyristors (SCRs) 117 and 118 in FIG. 2A, which have their gates connected to a static switch driver circuit 120. The output of the static switch 35 is provided to the relay contact 122 of the boost relay 36. When the relay contact 122 is in the lower position as shown in FIG. 2A, power is provided to an intermediate tap on the main transformer 44 to provide an autotransformer type boost function, resulting in an increased output voltage across the output terminals 123 and 124 of the secondary 125 of the transformer to compensate for a decrease in the voltage provided by the power system to the input terminals 31. Although only a single tap is shown in FIG. 2A, the boost relay 36 may have several independently switchable relay contacts to provide multiple tap connections to the secondary 125 at different points in the secondary to thereby allow the choice of the amount of voltage boost provided by the transformer.

The low pass output filter 38 includes a filter inductor 128 connected in series in the upper output line 39a, and a capacitor 129 and varistor 130 connected across the output lines 39a and 39b. This filter filters out the high frequency components of the pulse width-modulated waveform provided from the inverter. It also effectively serves to provide sufficient energy storage, primarily in the capacitor 129, to ensure continuity of the output voltage waveform between the turn thru of the static switch and the turn on of the inverter.

The inverter 46 preferably comprises an "H" bridge inverter as shown in FIG. 2B, having four switching devices 132-135 connected in a bridge configuration, receiving power on the DC bus line 48 from the battery 47 and returning through a common 137, with the output voltage of the inverter connected to output lines 139 and 140 leading to the primary 126 of the transformer 44.

The switching devices 132-135 are preferably power FET devices which may have intrinsic bypass diodes 141-144, respectively, as is illustrated in FIG. 2B. The intrinsic diodes 143 and 144 of the MOSFETs 134 and 135 cooperate with diodes 147 and 148 in the battery charger 49, the diodes 147 and 148 also being connected to the lines 139 and 140 leading to the transformer primary 126. During normal operation, wherein AC power is available from the AC power system lines, the primary winding 126 acts as a secondary, providing stepped down voltage from that available across the terminals 123 and 124 of the transformer. This stepped down voltage is rectified by the diodes 147 and 148 on alternate half-cycles, and is passed through a filter composed of a parallel capacitor 150 and series inductor 151, through a schottky diode 152 and thence on a line 153 which is connected to the DC bus line 48. When the inverter 46 is not operating, the switching devices 132-135 are off and the intrinsic diodes 141 and 142 are back biased. Power flows from the battery charger 49 on a line 153 to the bus 48 and through protective fuses 154 to the battery 47 (which may be formed of two series connected 12 volt batteries as shown) to the common 137, and is returned from the common through the intrinsic diodes 143 or 144 of the MOSFETs 134 and 135 to either the line 139 or the line 140. Thus, the diodes 147, 148, 143 and 144 act in concert as a full bridge rectifier to fully rectify the power on the lines 139 and 140 and apply it to the battery 47. A boost controller 155, described in detail below, is illustratively shown as connected to the base of a transistor 156 which is connected between the output of the inductor 151 and common to provide boost control regulation of the voltage to the battery, as explained further below. The capacitor 158 connected between the bus line 48 and common serves to filter out the peaks in the power on the line 48 so that a relatively smooth DC voltage charging level is provided to the battery 47.

The controller 56 carries out the monitoring of the state of the backup uninterruptible power system 30 and control of its various components to achieve its objectives. The operation of the system 30 under the control of the controller 56 is described below.

Line Fault Detection

One method of line-fault detection which has been used in UPS systems samples the AC power line input voltage (e.g., at 32 times per half-cycle) and compares the samples to reference values stored in the memory of a microprocessor. The reference values are self-adjusting in that new samples are used to continually adjust the reference by an averaging technique. In this way, input voltages that have stationary periodic disturbances will not cause excessive switching between line and battery power. The comparison between sampled line voltage and the reference allows relatively quick detection of fast changing conditions in line voltage. For slower changing disturbances that would go undetected because of reference adaptation, a calculated value of RMS line voltage is compared to a fixed reference.

In the present invention, line fault detection is preferably very rapid so that the system can be switched to provide power from the battery through the inverter to the load within a fraction of a cycle from the point of power line failure. The system preferably has three modes of line-fault detection: 1) high-speed detection of line power loss for no-break operation, 2) detection of persisting line power faults requiring microprocessor intervention, and 3) detection of RMS levels that are less than the brownout threshold.

Figure 5A:
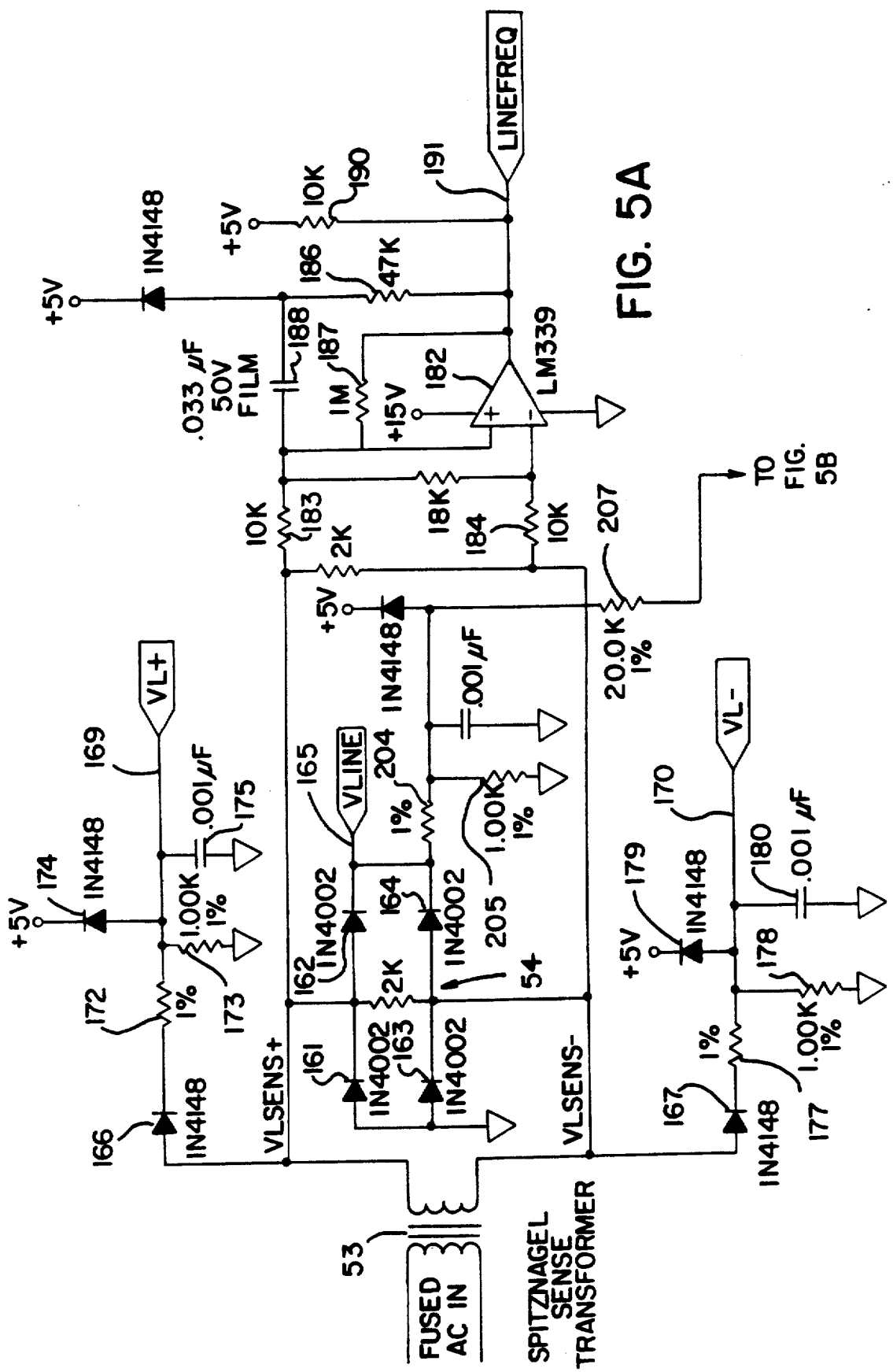
FIG. 5, composed of FIGS. 5A and 5B, is a schematic circuit diagram of the line fault detection circuitry in the back-up power system.
Figure 5B:
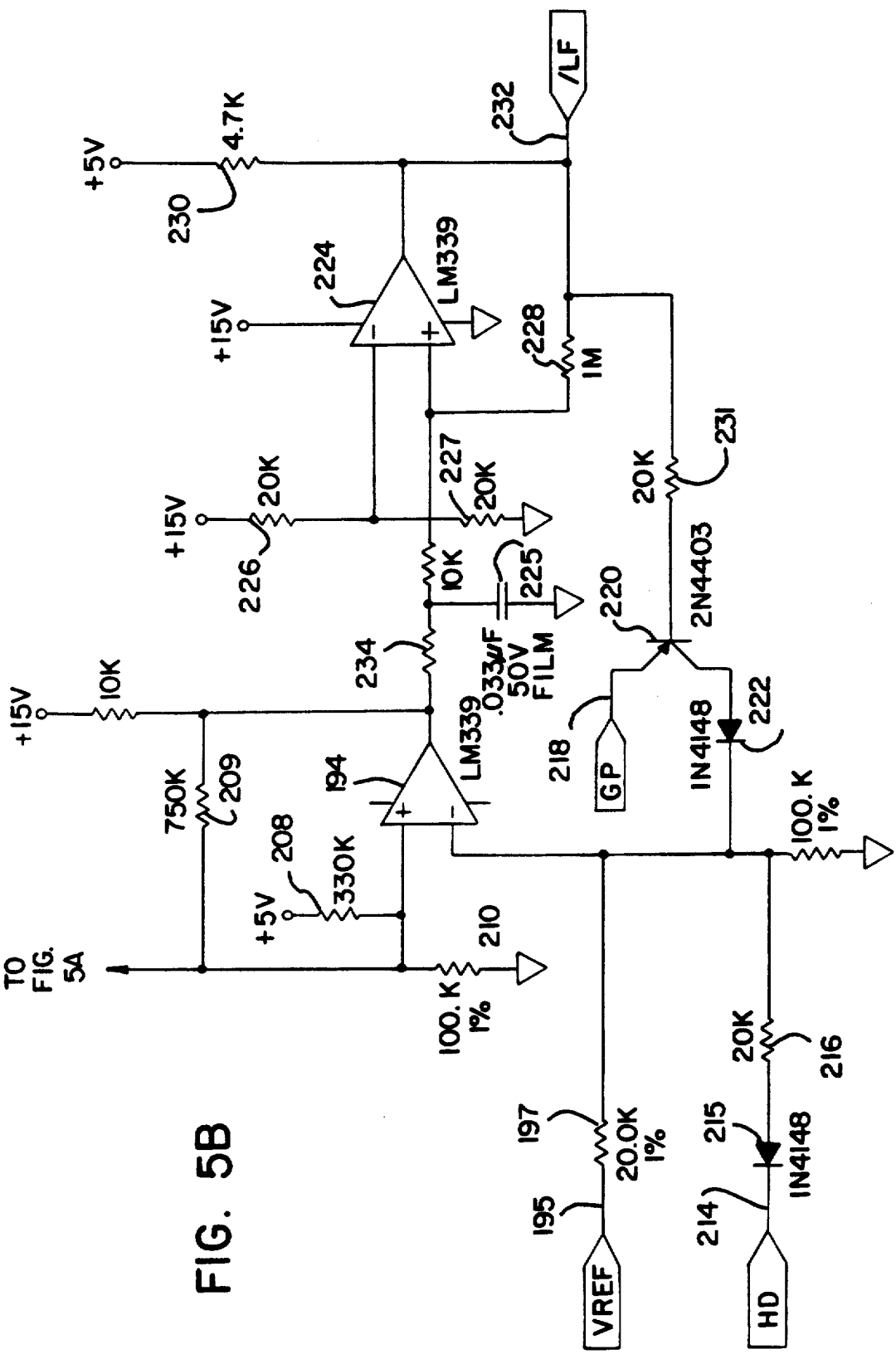

The first mode, high-speed detection, is performed primarily in circuitry outside of the microprocessor 66. Detection of a line fault condition, and action of the system to switch from line power to back-up power, takes place very rapidly, for example, within 10 μsec of fault detection. FIGS. 5A and 5B are a schematic circuit diagram for the circuits that operate, with the microprocessor 66, to perform line-fault detection.

Line voltage is sensed through the transformer 53. The voltage signal from the secondary of this transformer is sent through several paths. One of these paths is a full-wave rectifier 54, consisting of diodes 161-164, which supplies DC power for trickle charging on a line 165 and also supplies a DC voltage signal for line fault sensing. These functions are discussed further below. Other paths are half-wave rectifier circuits through diodes 166 and 167 which function to supply line voltage magnitude and polarity information to the microprocessor 66 on lines 169 and 170, respectively. Each half-wave rectifier circuit consists of a number of other components. In the uppermost circuit, resistors 172 and 173 scale the secondary voltage; a diode 174 clamps excessive voltages to protect the microprocessor input; and a capacitor 175 attenuates very high-frequency disturbances that are not relevant to detection. Similar components in the lower half-wave rectifier circuit are resistors 177 and 178, a diode 179, and a capacitor 180. The microprocessor 66 converts the analog half-wave rectified signals on the lines 169 and 170 to digital signals which are processed to form a voltage reference and to calculate the average value of the input voltage. The voltage reference is formed as a composite of present and former samples so that it adapts to different line conditions. The RMS or average value is used for metering purposes as well as for detection of slowly changing line disturbances.

The secondary of the transformer 53 is also connected to the inputs of a comparator 182 through resistors 183 and 184. This circuit uses the unrectified voltage from the transformer to form a square wave that is used for line frequency determination and synchronization. Resistors 186 and 187 along with a capacitor 188 form a positive feedback circuit. The resistor 187 provides 1% hysteresis for any input condition at any time. The resistor 186 and the capacitor 188 yield a larger amount of hysteresis just after the comparator output state changes; after a few milliseconds their effect wanes. This circuit rejects multiple zero crossings which may be caused by distortion and noise. A resistor 190 is connected between the output line 191 of the comparator and a 5 V supply and functions as a pull-up resistor to establish the comparator output as a 5 V logic level. The output signal from the comparator 182 is connected by the line 191 to a digital port pin (not shown in FIG. 5A) of the microprocessor 66. The signal on line 191 is used for a variety of purposes, but principally it is used as an input signal for a digital phase-locked loop in the microprocessor. Reference formation and reference polarity are all synchronized to this signal, and line frequency is determined from this signal.

A comparator 194 is utilized for high-speed line-fault detection. The unidirectional voltage reference waveform VREF (formed as described below) is supplied on a line 195 to one input of the comparator 194 through a resistor 197. The reference is obtained from the output of a digital-to-analog converter (not shown in FIG. 5B) and consists of a full-wave rectified replica of the historically averaged line voltage, as illustrated by the graph labeled 200 in FIG. 4. The actual full-wave rectified unidirectional line voltage VL is connected through a voltage divider composed of resistors 204 and 205 and a resistor 207 to the positive input of the comparator 194. The positive input is also connected to common through resistor 210. For static line conditions, the signals "VREF" the full wave rectified input voltage and "VL" should be approximately the same. However, at the inputs of the comparator 194 these signals are modified to provide a tolerance band for line fault detection so that the state of the line fault signal LF can be carefully controlled. Signal modifications include a resistor 208 which provides an offset by biasing the line voltage signal at the input to the comparator 194. Since the line voltage signal "VL" has a peak value of, e.g., 3.3 volts nominally, the effect of this bias is more pronounced at the zero crossings where it is desirable to desensitize detection. A resistor 209 is connected around the comparator 194 to provide positive feedback, and serves to desensitize line fault detection when the line voltage signal is normal, and to make the acceptable line voltage tolerance band tighter when attempting to return to AC power system power from battery operation when the AC line power returns.

The operation of the comparator circuit is illustrated by the graphs of the reference and input waveforms in FIGS. 3 and 4. FIG. 3 shows the effect of the resistor 208 modifying line delta (the allowable tolerance between the reference and line voltage) as a function of the phase angle. Note that the reference voltage VREF is represented by a continuous waveform in FIG. 3, whereas it is actually a stepped waveform as shown at 200 in FIG. 4. FIG. 4 shows the composite influence of the resistors 208 and 209. Under line fault conditions (LF=0) the + input signal to the comparator, shown at 212 in FIG. 4, is maintained slightly above the line voltage after it returns to normal and before the line fault signal LF cleared. This is a somewhat fictitious situation because generally this condition would be present for a short time. After the line fault is cleared, the resistor 209 causes the differences between the two inputs to the comparator to increase, with the V+ signal as shown at 213, to establish a reasonable line delta tolerance band.

There are other signals which can influence the comparator input signals. One of these is the "HD" (high delta) signal from the microprocessor. Certain applications, such as operation with a small generator as the AC line power source, may call for a higher line delta signal on a line 214, and this condition may be selected through the microprocessor. A low level HD on the line 214 will cause the reference input to the comparator to be lowered through a diode 215 and a resistor 216. The reference input can also be increased for a short time by means of the "GP" (guard pulse) signal on a line 218 from the microprocessor. This signal is only effective when LF=0, and it prevents the system from switching back from battery power to the AC line power at zero crossings of the reference voltage. Even a dead power line input might look normal at zero crossings. The width of the guard pulse is somewhat extended because it is used for another function, which is discussed below. However, the guard pulse needs to be wide enough to mask the effects of across-the-line capacitors at the system input when the fault condition is an open line. An exemplary pulse width for the guard pulse is 2.2 to 2.5 msec. and is roughly centered at the zero crossing. The guard pulse is generated by the microprocessor and is fed to the reference input of the comparator 194 when a transistor 220 is turned on by the signal LF being low. A diode 222 provides reverse blocking capability to the transistor switch. A comparator 224 serves as a noninverting buffer and a level translator, and the output of the comparator 224 on a line 232 constitutes the line fault signal LF. Certain optional nonstuffed components (a resistor 234 and capacitor 225) would be used in the event that a guaranteed minimum operating time on battery is desired. This is not necessary or appropriate where it is desired to have the system operate interactively on a subcycle basis such that battery operation can be as short as required. Resistors 226 and 227 form a voltage divider which establishes a threshold at the positive input to the buffer comparator 224. A resistor 228 adds hysteresis so that output states of the comparator 224 are fully determined. A resistor 230 is a pull-up resistor which pulls up the output of the comparator 224 to the +5 V logic level. The output of the comparator 224 provides the LF line fault signal which is fed through a resistor 231 to the base of the transistor 220.

Voltage Reference Formation

The method of sensing line voltage has been described above in the section on Line Fault Detection. The following relates to the manner in which the line voltage signal is processed in the microprocessor to form a voltage reference. This reference signal can be used for fast line-fault detection and also as a reference for the pulse-width-modulation (PWM) of the inverter during battery operation.

Figure 6A:
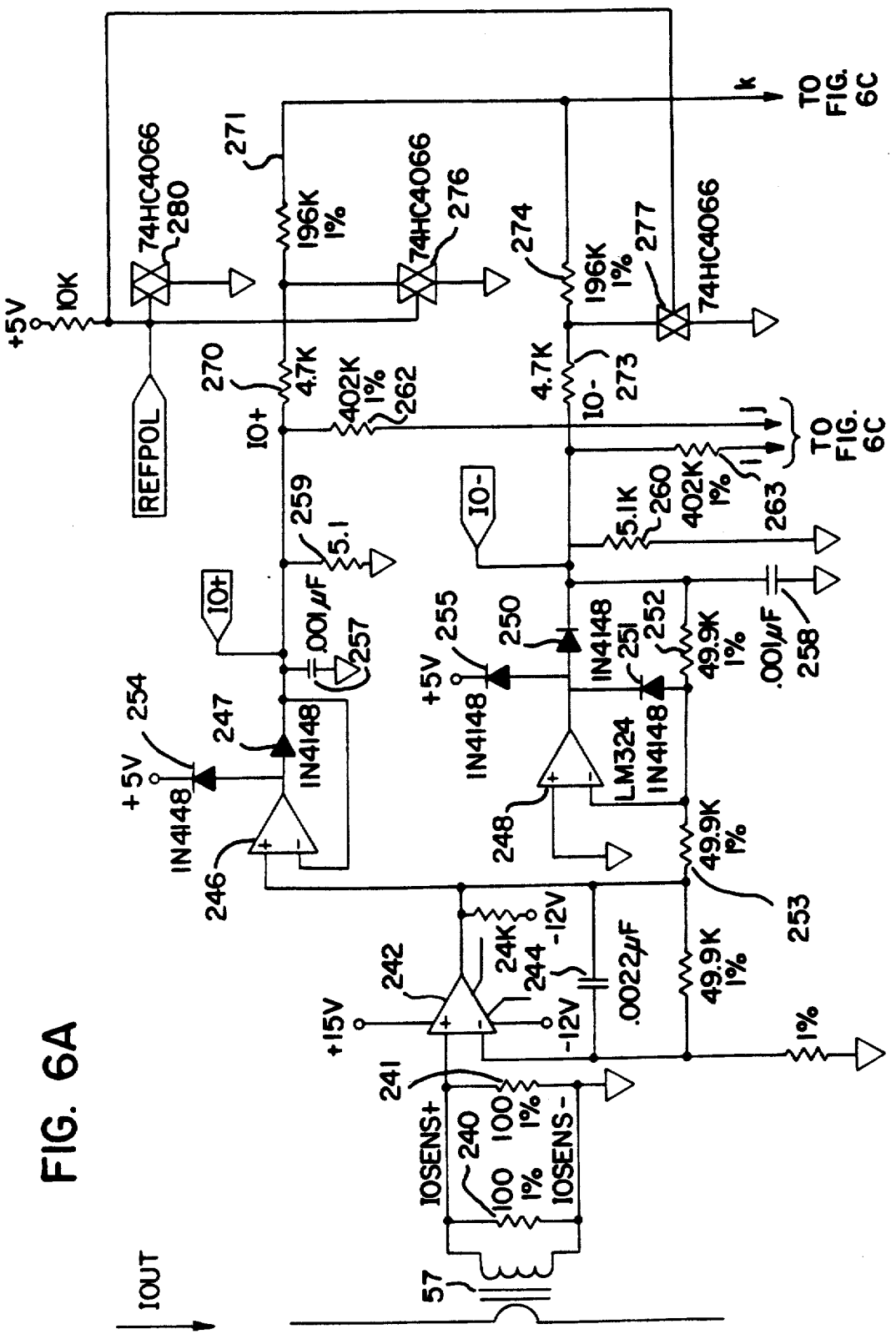
FIG. 6, composed of FIGS. 6A–6D, is a schematic circuit diagram of a portion of the controller of the present invention showing the pulse width modulation and compensation circuitry.
Figure 6B:
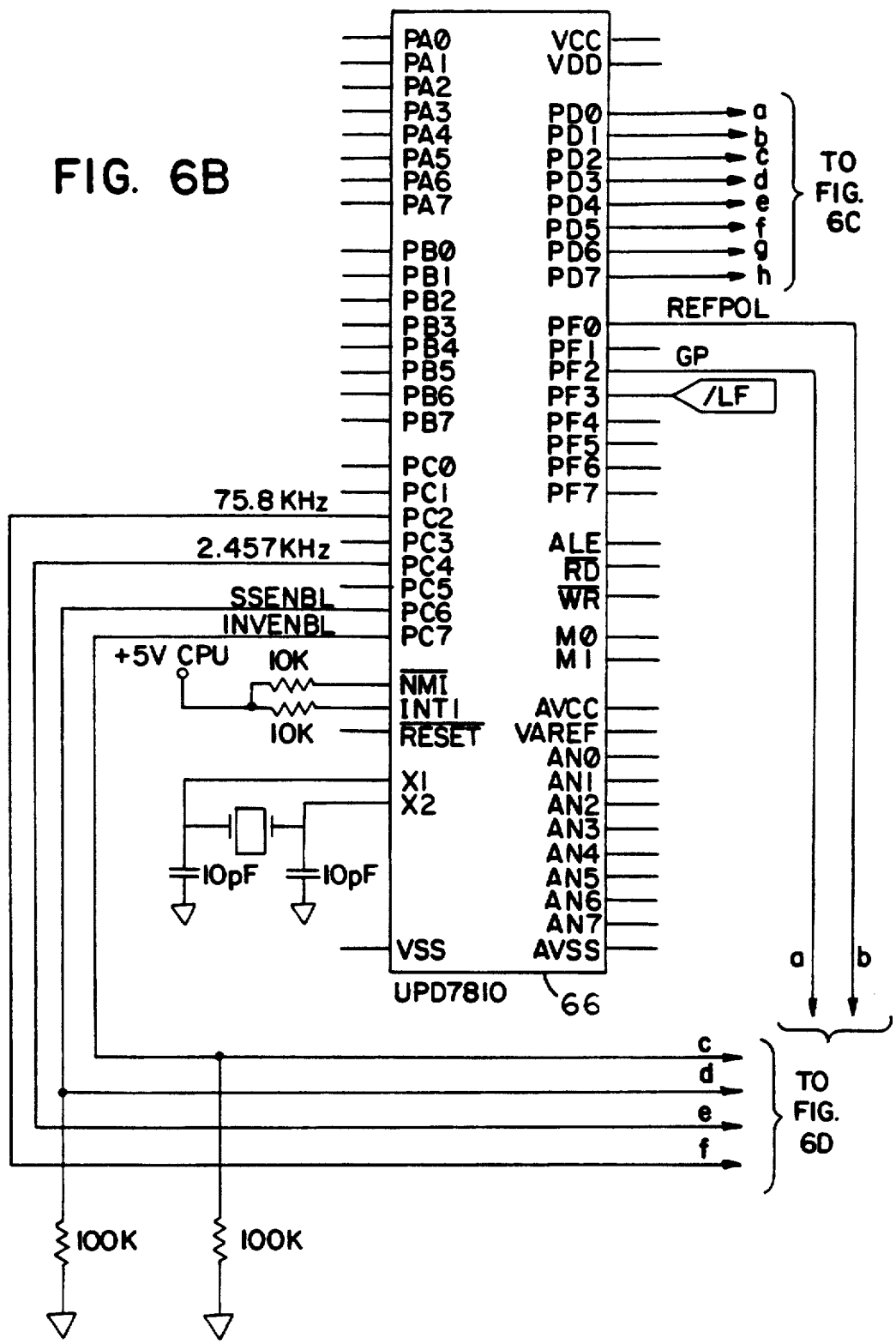
Figure 6C:
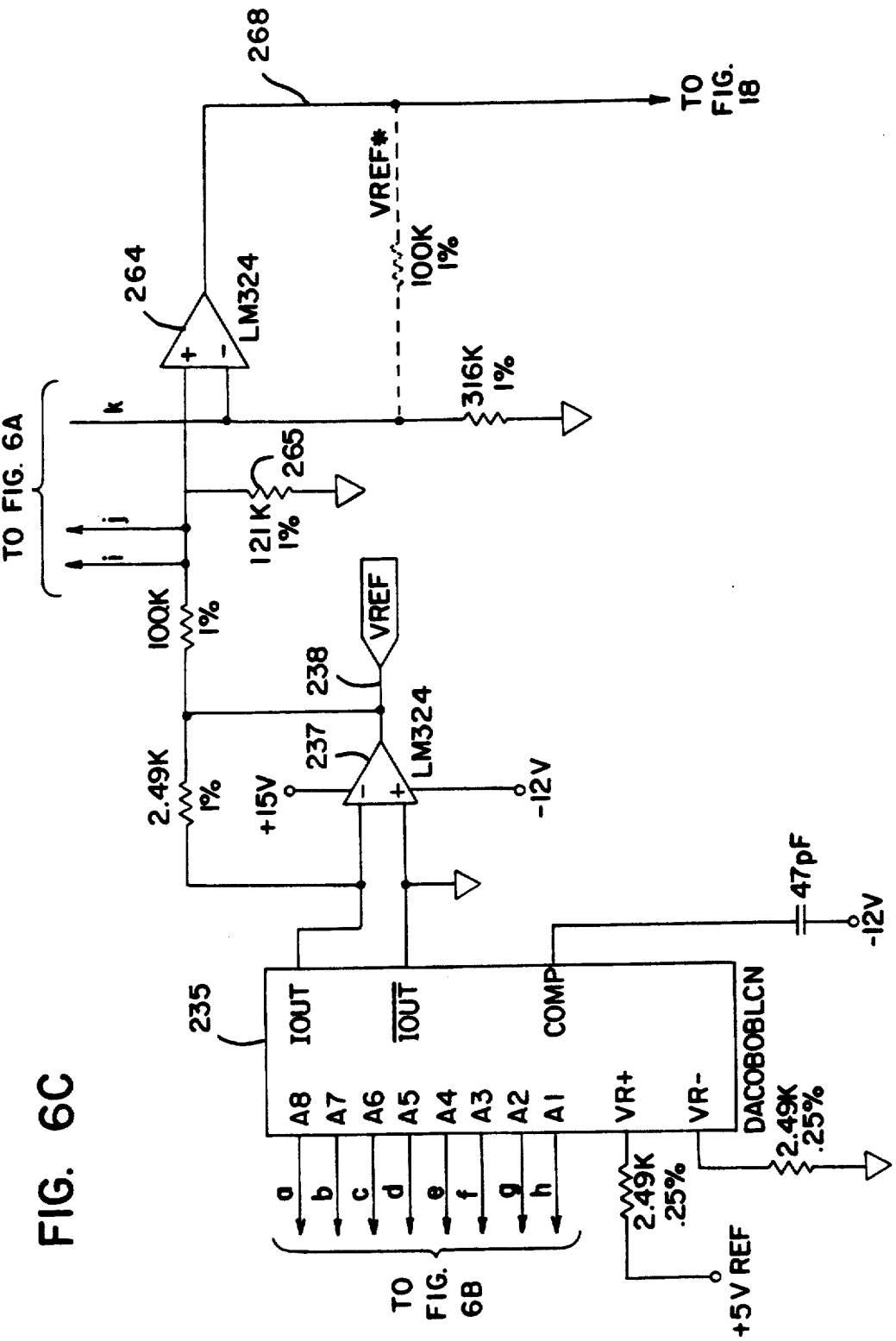
Figure 6D:
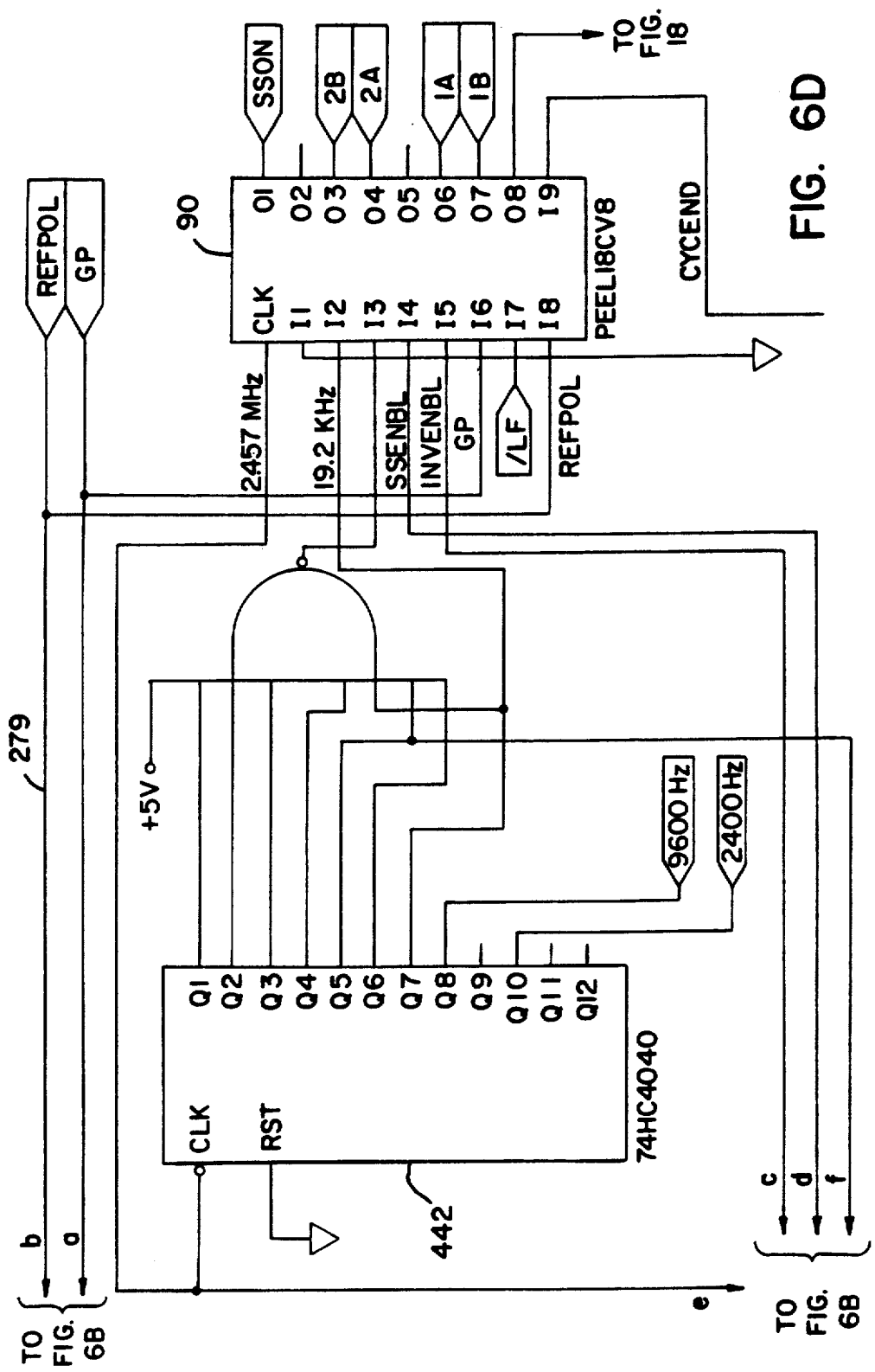

As noted above, the half-wave-rectified, line-voltage signals representing positive and negative polarity on the lines 169 and 170 are connected to A/D port pins AN0 and AN1, respectively, of the microprocessor 66, as shown in FIG. 6B. These analog signals are sampled 16 times per half-cycle. During line operation, the reference samples are continually updated by factoring into their formation the new line voltage samples. For example, the stored value for a given sample number can be updated by taking ⅔ of the stored value and adding to it ⅓ of the present sample. This can be done for each of the 32 samples per cycle in a time coherent manner. Time coherency is maintained by a digital phase-locked loop in the microprocessor which uses the previously described LINE FREQ signal as an input and produces the REF POL output signal. The reference waveform is preferably produced such that each reference value in the reference waveform at each sample time comprises a selectively weighted average of sample values of the cycle of the AC waveform presently being sampled and prior cycles of the AC power voltage signal. A preferred averaging process is described, in the aforesaid U.S. patent application Ser. No. 07/404,902, now U.S. Pat. No. 5,229,651, incorporated by reference.

The line fault signal LF, from line 232 of FIG. 5B, is connected to port pin PF3 of the microprocessor 66. If this signal should persist at a low level beyond a settable glitch count, or if the calculated RMS level of the input voltage goes below a selected brownout threshold, then the reference voltage will be updated with values from memory within the microprocessor rather than from line. The stored memory values in external ROM of the processor 66 are sinusoidal with an RMS output level corresponding to 120 volts. When the line fault is cleared and the line input is determined to have a proper RMS level, the reference is again determined by line samples. Because of the averaging technique employed, there is a gradual slewing of the reference waveform from one source of input data to the other. Conversely, when the AC line power is restored, the system preferably continues to operate on the inverter for a short time during which samples of line voltage are used to update the reference waveform and to phase lock the reference to the incoming AC waveform before switchover from inverter to AC line power.

FIGS. 6A–6D shows the main circuitry associated with reference formation. The digitally generated reference data is converted to an analog signal by means of a digital-to-analog (D/A) converter 235 which is an 8-bit, high-speed, current-output device. The microprocessor 66 outputs the reference waveform digital data synchronized in frequency and phase by the phase locked loop to the incoming AC line power. Complementary current outputs are available on pins 4 and 2 of the converter 235. An operational amplifier 237 converts the current signal to an analog voltage reference on an output line 238 which is connected to the line 195 of FIG. 5B. The nominal magnitude of the voltage reference VREF has a peak value of 3.28 volts.

To save cost on systems with lower power ratings, it is possible to avoid the use of an output voltage sensing transformer, and to use the main power transformer 44 for this purpose. However, since the transformer 44 carries substantial current during inverter operation, the voltage drops across the primary and secondary winding resistances can be substantial. Therefore, the sensing points on the inverter winding 126 will not accurately portray the output voltage magnitude for all load currents. To compensate for this effect, the voltage reference signal must be compensated with another signal that is proportional to load current. The top part of the circuitry of FIG. 6A accomplishes this function.

Output current is sensed by means of the current transformer 57. Resistors 240 and 241 form a burden resistor which converts the current transformer current signal to a voltage. An operational amplifier 242 amplifies the signal to a usable level (gain≈90) and removes high-frequency noise through a feedback capacitor 244. The amplified signal is processed further by two half-wave rectifier circuits. An operational amplifier 246, in conjunction with a diode 247, extracts the positive half-cycle of the current signal at unity gain. An operational amplifier 248 in conjunction with diodes 250 and 251 and resistors 252 and 253 forms a unity-gain, inverting, half-wave rectifier for the negative half-cycle of the current signal. The diode 251 clamps the inverting input of the op amp 248 to its output during the positive input half-cycle so that excessive output swings are avoided. Diodes 254 and 255 are clamps which limit the rectifier outputs to 5 volts. Capacitors 257 and 258 serve to reduce noise. Resistors 259 and 260 are for output pull-down when output diodes 247 and 250, respectively, are in the blocking state.

The rectified current signals travel several paths. These signals are labeled "IO+" and "IO−" and are used both in the analog circuits and in the microprocessor. These current signals are used to modify the voltage reference in the analog circuits.

Signals IO+ and IO− are added to the reference voltage through summing resistors 262 and 263 at the noninverting input of an amplifier 264. The amount of current signal added to the voltage reference can be adjusted in the design by specifying the values of the resistors 265, 262 and 263. A certain amount of output voltage deviation is possible due to component tolerance. With a zero current signal, the voltage gain of the amplifier 264 circuit is unity, i.e., VREF=VREF*, where VREF* is the output of the amplifier 264 on a line 268. For current signals in phase with VREF, VREF*>VREF.

However, other provisions must be made for instantaneous current that is of the opposite polarity as the reference voltage, such as may be caused by displacement power factor loads. For this situation, it is necessary to subtract from the reference because now the instantaneous direction of energy is from the load to the inverter. To accomplish this control function, signals IO+ and IO− are entered into the inverting input of the amplifier 264 through resistors 270 and 271 and resistors 273 and 274, respectively. Shunt switches 276 and 277 are arranged at the resistor junctions so that the subtraction from the reference can be controlled. Also, the sum of the resistances, i.e., resistors 270 plus 271 or 273 plus 274, is one half that of the current adding resistors 262 and 263. In this way, the summing at the noninverting node is compensated during the required subtraction at the inverting node.

When the reference polarity signal REFPOL from the microprocessor on a line 279 is at a one level, a positive polarity of VREF is indicated, and at the second level of RFPOL a negative polarity of VREF is indicated. Both half cycles of VREF and VREF* have the same polarity. Therefore, REFPOL at a one level causes the switch 276 to conduct, thereby not allowing IO+ to subtract from the reference. A switch 280 is used as an inverter and is configured such that a low level of REFPOL will cause the switch 277 to conduct. In this way IO− will not subtract from VREF during the time that REFPOL is low. However, if IO+ is >0 for REFPOL=0, or if IO− is >0 for REFPOL=1, then VREF will be reduced accordingly.

In summary:

when REFPOL=1: VREF*=VREF+R(IO+)−−R(IO−);

and when REFPOL=0: VREF*=VREF−R(IO+)+−R(IO−).

Various system waveforms illustrating this function are shown in FIG. 7 for a leading power factor load. This example is somewhat exaggerated so that the function can be seen clearly. Note that VREF* has a negative portion that would cause a small amount of voltage distortion, and is ignored by the PWM comparator 392 shown in FIG. 18.

FIG. 8 shows the waveforms for a similar process of voltage reference formation for a distortion power factor load. In this situation, reference compensation is quite effective because of fast response. It should be noted that while VREF* is the reference for the pulse width modulation of the inverter, VREF is still used for line fault detection.

Inverter-Commutated Static Switch-Operation

Catastrophic consequences can result if the static switch SCRs 117 and 118 continue to conduct when the AC power system hot and neutral conductors are shorted. Everywhere except near the zero crossing points of the line voltage the inverter turns on in a polarity such that the conducting SCR is commutated. This prevents catastrophic consequences due to undesired conduction of the SCRs. A problem arises near the zero crossing points because the system exhibits an inverter transformer magnetization current that flows from the utility line through the static switch into the inverter transformer. The system will exhibit an inverter transformer magnetization current that flows from the utility line through the static switch 35. Magnetization current lags line voltage and becomes a problem when a shorted line occurs close to the utility line voltage zero crossover (within about a millisecond). Even small values of magnetization current will tend to hold the SCRs of the static switch in conduction under one of these conditions.

Furthermore, the microprocessor generated reference signal is phase/frequency correlated to line frequency. The microprocessor 66 generates a reference waveform signal <pol> for the PWM modulation circuitry which will determine the polarity of the inverter bridge output voltage, and this signal will be consistent with the normal voltage polarity point that would have occurred if the utility line were not shorted. Because the magnetization current is a lagging current, it maintains its polarity beyond where the crossover point would have been, thereby holding the critical SCR in conduction. However, the inverte reverses its polarity based on the phase-locked reference, so the inverter will turn ON in a polarity that promotes a large current in the direction of the magnetization curren. This forces the SCR into heavier conduction, and subsequently, the inverter would now be trying to supply energy to a nearly direct short from its output to the shorted utility line.

In the present system, the operation of the PEEL 90 (described further below) requires the synthesis of a "guard pulse" signal, <gp>, by the microprocessor, which approximately centers on the zero crossover point of line voltage. Specifically, this guard pulse is a logic level signal consistent with the line voltage zero crossover point. The guard pulse defines a "danger zone" on each side of the zero crossover point where the catastrophic conditions described above are likely to occur. When the signal <!lfault> appears at the PEEL 90, the PEEL makes its normal transition from the 010 static switch ON state to the initial unsynchronized inverter power pulse state, 011. This is illustrated in FIG. 17 and described further below. If the line fault occurs during the presence of <gp>, the PEEL 90 will reverse the polarity of the normal power pulse such that it force commutates the SCR which was previously held in conduction by the relatively small magnetization current; the static switch is thereby abruptly shut off.

Unlike the variable power pulse associated with state 011 (see FIG. 17)that occurs when a line fault is detected outside the guard pulse, the commutation pulse is guaranteed to be 52 microseconds in duration—a complete inverter cycle. This full pulse width is necessary to insure SCR commutation. This is accomplished by delaying the transition to state 011 until the <!pwmfreq> signal appears which indicates the initiation of the next invertor period. Since the state transition from state 011 can only happen upon the next occurrence of <!pwmfreq>, the commutation pulse is forced to be exactly one inverter cycle long—52 microseconds. The delay in the transition from state 010 to state 011 could also be as much as 52 microseconds, but this is insignificant since this occurs only near the zero crossover point, where volt*ampere delivery is minimal.

After the commutation pulse is delivered, the PEEL state machine will proceed to the initial inverter cycle state, 000, and resume normal, synchronous PWM operation. If the line fault occurs outside the occurrence of the guard pulse, the inverter power pulse is immediately dispensed in a polarity consistent with the subsequent, PWM synchronized inverter output which is phase coherent with the reference signal. That is, state 011 is entered without hesitation, so the power pulse is delivered immediately. Its duration can be from 0 to 52 microseconds, with pulse durations determinated by the PWM circuitry. Whether turn-on occurs inside or outside the guard pulse, smooth transfers result.

The static switch turn-on signals from the PEEL 90 are provided, as shown in FIG. 9C on a line 290 to the pin I7 of a power driver 291. The power driver circuit 291 provides a static switch drive signal on a line 293 through a resistor 294 to the primary of a switching transformer 296. One secondary 298 of the transformer 296 is connected to provide the driving pulse to the gate of the SCR 117, and the other secondary 300 is connected to provide the driving pulse to the gate of the SCR 118.

The driver 291 also provides an output signal on a line 302 to the relay coil 303 of boost relay 36. When the switch 122 of the relay 36 is in its normally closed position shown in FIG. 9A, the input power is provided on a line 305 to the full primary of the transformer 44, whereas when the relay is operated to turn the switch 122 to its alternate position, power is provided on a line 306 to an intermediate tap 307 of the primary 125 of the transformer 44. In this configuration, the transformer 44 functions as an auto transformer to provide a boosted output signal between the neutral line 39b and the line 305 which is connected to the other output line 39a.

The line relay 34 allows full galvanic isolation of the power lines 100 from the inverter output. The driver 291 is also utilized to provide an output drive signal on a line 310 to a control circuit 311 to provide drive power to the coil 313 of the line relay 34, thereby switching the relay contacts 111 and 112 to their closed position during normal system operation.

Line Relay Operation

The switching of the line relay 34 is coordinated with the switching of the static switch 35 to achieve robust on-off control which satisfies redundancy requirements and IEC 3 mm contact separation requirements to isolate the inverter of the back-up power system 30 from its input terminal 31 without impairing high-speed transfers. The operation of the relay 34 allows cost effective, high-speed static switching with robust inrush current carrying capability, two pole air gap isolation, and protection from hazardous voltages on the power inlet plug 31 even when there is a failure of the static switch and an additional random failure. When input utility power is first applied to the input terminals 100 and 101, the static switch 35 and the two pole line relay 34 are both in the "open" state. The power is then provided to the coil 313 to energize the line relay, applying line voltage to the SCR static switch 35, which is still open (non-conducting) at this time. After a short delay, the SCRs 117 and 118 of the static switch are triggered by high-frequency gate pulses, thereby providing output power to loads connected across the line and neutral outputs.

When inverter operation is desired, the static switch gate trigger signals are inhibited, and the SCRs 117 and 118 are force-commutated off as described above, preventing backfeed of inverter power to the utility line, after which the line relay switches 111 and 112 are opened.

During both of the above-described sequences of operations, the line relay 34 is always "dry-switched", that is, it is always switched open or closed with the static switch open so that current is not being conducted through the line relay during the time of switching.

The SCRs 117 and 118 of the static switch 35 are selected to have high $I^2t$ rating, to which the input fuse 103 $I^2t$ clearing characteristics are matched. Thus, the fuse 103 protects the static switch SCRs 117 and 118 from excessive output surge clearance and overloads. The robust static SCR switch handles high-stress load surges and output current requirements, and the dry-switching mode of relay operation extends the life of the relay contacts and prevents contact sticking or welding that might otherwise occur due to high-stress current switching.

Electrical equipment safety standards generally require that uninterruptible power systems should be provided with backfeed protection to prevent a shock hazard from being present on the AC input terminals of the device during interruption of utility input power. This backfeed protection is required utilizing a device having air-gap contacts, such as an electromechanical relay, to prevent shock hazard.

In UPS systems which employ only electromechanical relays to provide the isolation of the inverter power from the AC input terminals, the relays must handle the high-stress in-rush current and must be able to open and close while conducting load current. The relatively slow operation of the electromechanical line relays results in a significant "dead time", between 2-6 milliseconds, during which power supply to the UPS load can be interrupted when power supply to the load is being transferred from the AC power system to the inverter and back again. During these switching events, the electromechanical relay must contend with high-current switching stresses which can result in sticking of contacts and welded contacts.

Figure 9A:
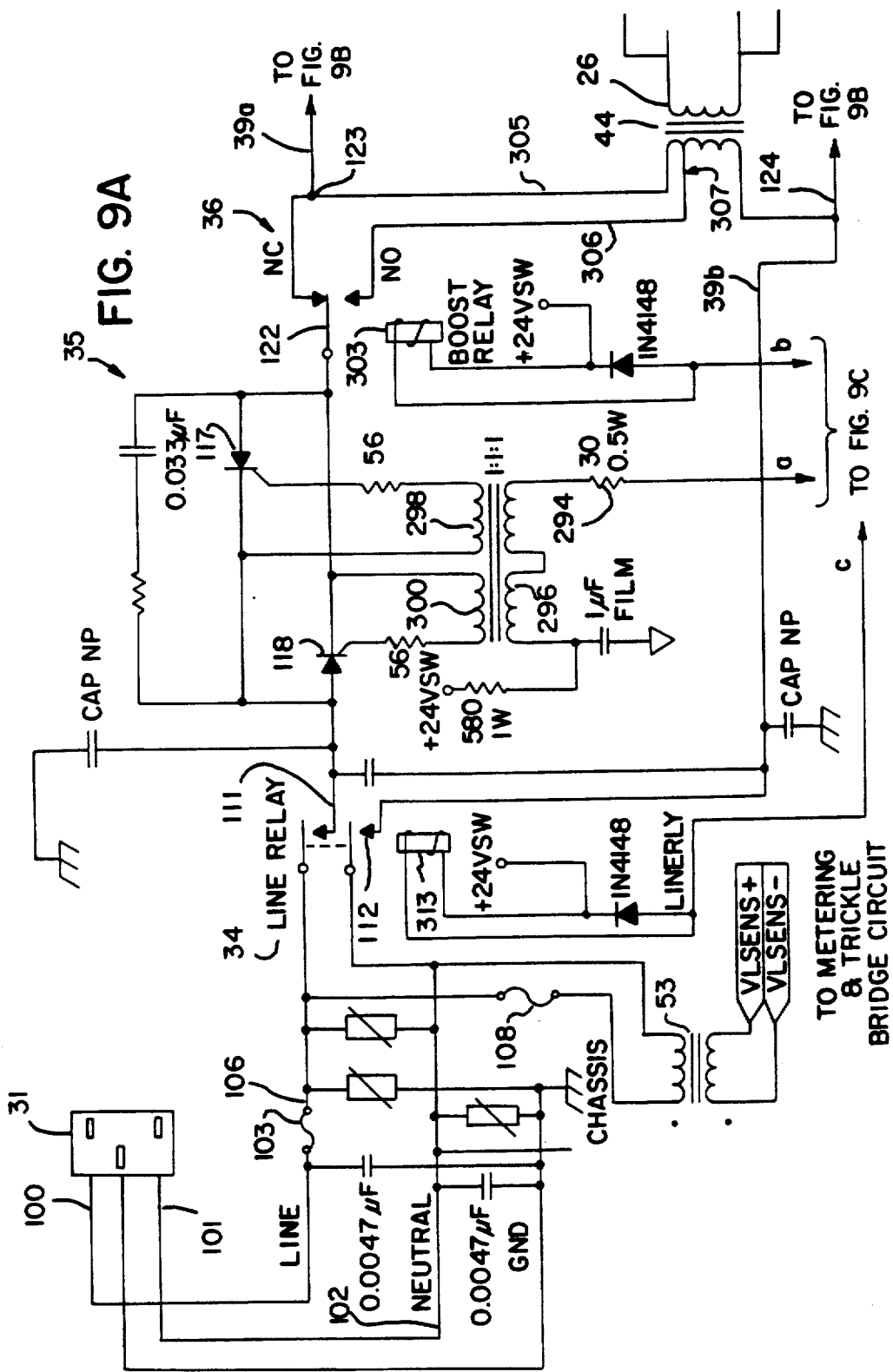
FIG. 9, composed of FIGS. 9A–9C, is a schematic circuit diagram of the line relay and static switch and associated control circuitry.

The switching of the line relay under microprocessor control is accomplished in the following manner, with particular reference to FIG. 9A. Initially, utility AC power is applied to the input terminals 100 and 101. A rear panel control switch 96 (shown in FIG. 2B) is closed, thereby providing power to the housekeeping power supply 95 which provides the supply voltages to the circu of FIGS. 9A-9C (e.g., +24 volts and +5 volts). The control signals to the gates of the inverter switches 134 and 135 are provided on lines 315 and 316, through diodes 317 and 318, respectively, to a common node 320. A resistor 319 is connected between the +5 volt logic power and the node 320 to provide a standard logic level voltage at the node 320 when the diodes 317 and 318 are both back biased. The voltage at node 320 is provided through a resistor 321 and a diode 322 to the gate of an FET 324 and through a diode 325 to the gate of an FET 326. A resistor 330 is connected to the line 310 at a node 331, with the FETs 324 and 326 connected in series with each other between the coil 313 and the node 331. The microprocessor preferably then executes initial test routines on, e.g., the inverter, the battery, and the utilty line. If these routines are acceptable, the gate control signals on the lines 315 and 316 from the inverter are driven high, and the FETs 324 and 326 are switched on, thereby passing the LINERLY signal from the line 310 to energize the coil 313 and close the relay contacts 111 and 112 of the line relay 34. The signal SSON on the line 290 from the PEEL 90, a high frequency string of pulses, is then inverted by the driver 291 as the signal SSDRIVE on the line 293, to provide high frequency trigger signals across the transformer 296 to the gates of the SCRs 117 and 118. Each of the SCRs 117 and 118 will become forward biased in one-half of the input voltage waveform and will trigger on as soon as a triggering pulse is received to the gate of the SCR. Each of the SCRs will similarly be commutated off when the polarity of the input voltage waveform reverses and back biases the SCR. Thus, the full wave power from the line 106 will be provided through the static switch 35 to the output line 39.

When a power outage occurs, the static switch 35 is commutated off in the manner described above, the static switch drive signal SSDRIVE is interrupted, and the turn on of the inverter causes the signals on the lines 315 and 316 to change, alternatively driving low, which ultimately turns off the FETs 324 and 326, de-energizes the relay coil 313, and opens the contacts 111 and 112. However, the opening of the line relay does not occur immediately upon inverter operation since a capacitor 323 is charged up during the time that the line relay is closed and discharges through the resistor, 321, allowing a controlled delay between the turn on of the inverter and the opening of the line relay switches 111 and 112. By the time the switches 111 and 112 are open, the static switches 117 and 118 have been commutated as described above and both turned off so that no current is flowing through the relay at that time.

When the line power failure condition is over, the inverter is inhibited, bringing both of the lines 315 and 316 high, turning on the FETs 324 and 326 and permitting the line 310 to energize the coil 313 to close the relay contact 111 and 112. Thereafter, the static switch drive signal SSDRIVE is applied to open the SCRs 117 and 118 to allow poWer to flow from the AC power system to the load.

Should a brown-out occur, that is, a decrease in AC input line voltage below nominal, the static switch 35 is opened and the system goes into inverter mode operation to provide power from the inverter to the output lines 39. A signal is then provided on a line 302 to energize the boost relay coil 303 to connect the switch 122 of the relay 36 to the intermediate tap 307 of the transformer, the inverter is then turned off and the system is transferred back to AC line power by activating the SCRs 117 and 118, thereby providing substantially continuous, no-break power to the load.

Inverter Operation

Figure 10:
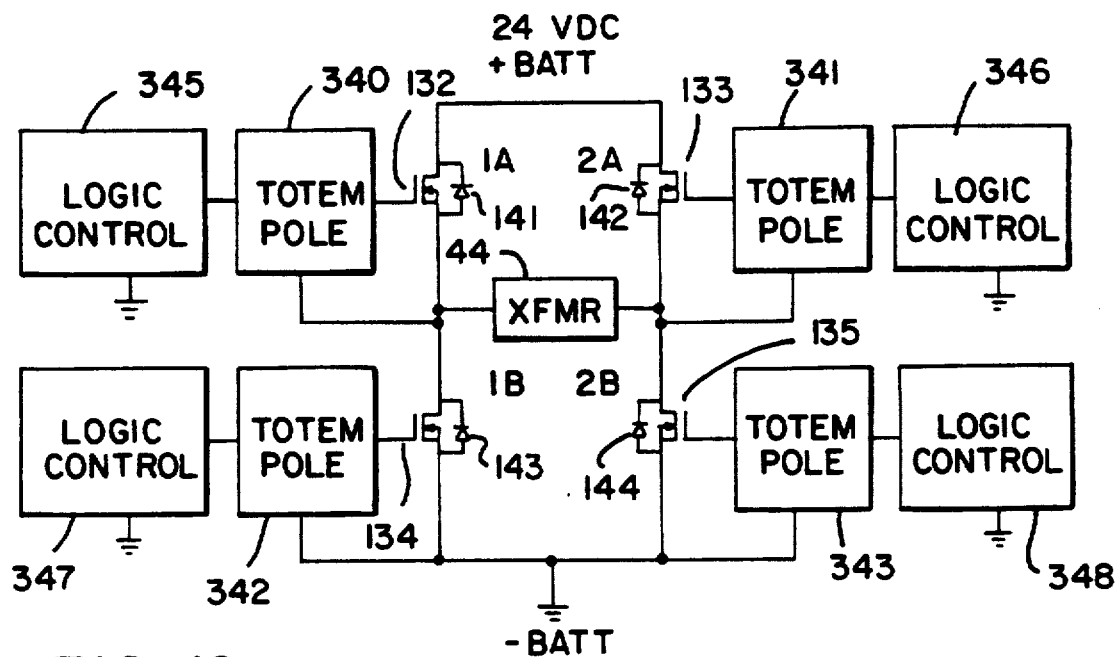
FIG. 10 is an illustrative block diagram showing the control components for the static switches in the H-bridge inverter.
Figure 13A:
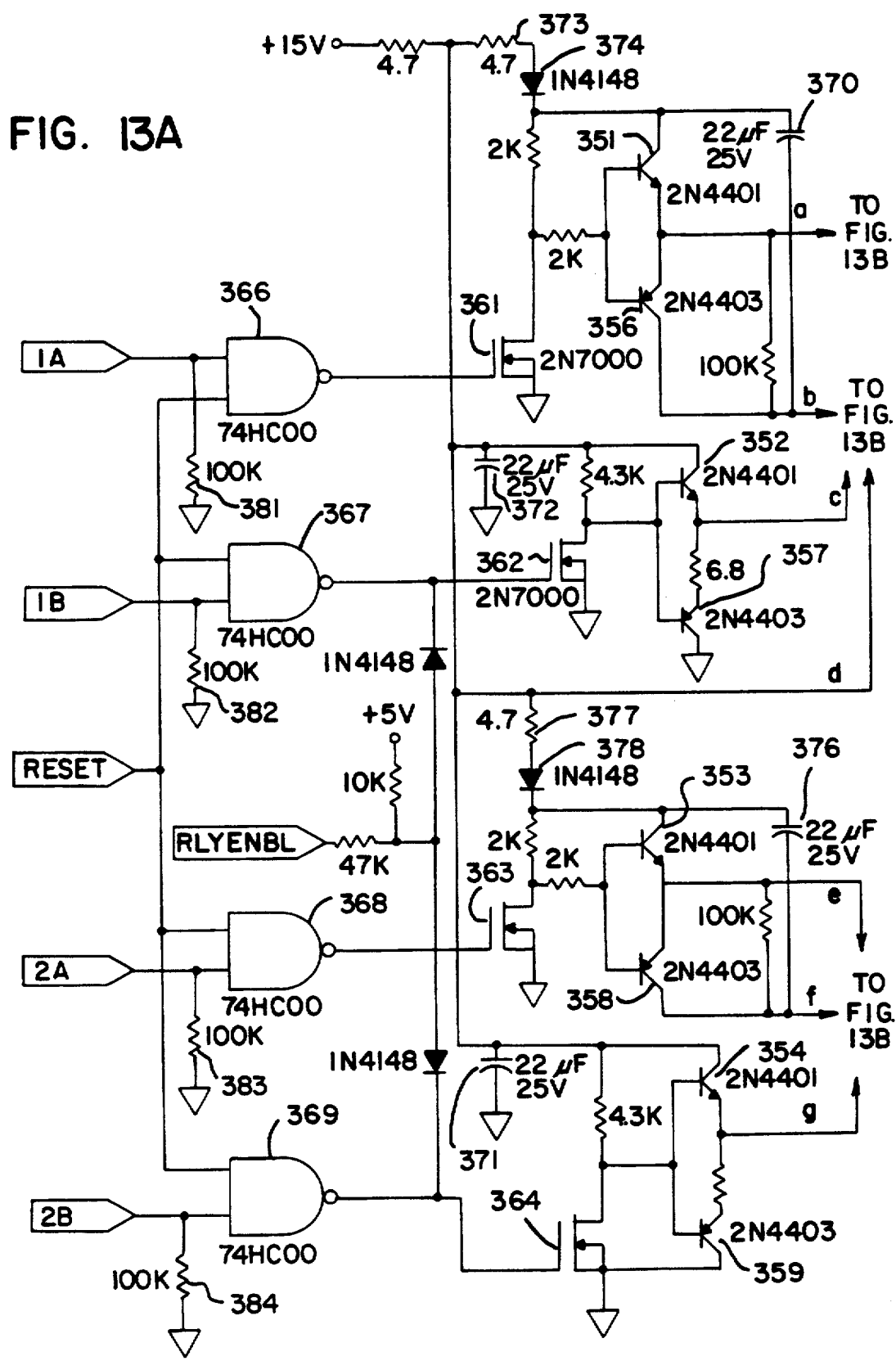
FIG. 13, composed of FIGS. 13A and 13B, is a schematic circuit diagram showing the inverter, drivers, and the conduction limit circuit which monitors the current flowing through the switching devices of the inverter and determines when a current overload occurs.
Figure 13B:
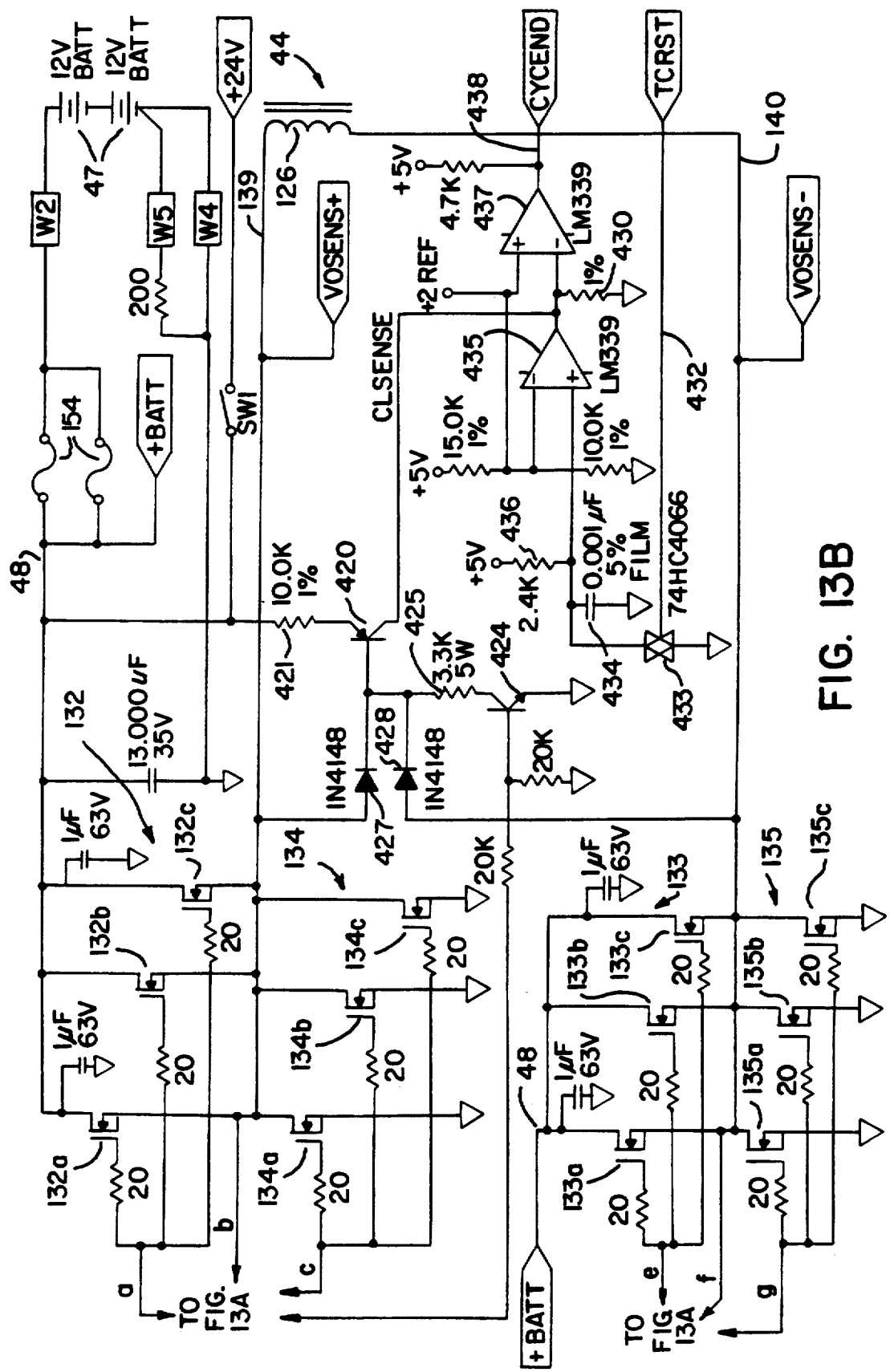

A preferred inverter topology for the backup uninterruptible power system 30 is a 19.2 KHz pulse width modulated, H-bridge configuration as shown in FIGS. 2A-2B in simplified schematic form in FIG. 10, and in a schematic circuit diagram in FIGS. 13A-13B.

The inverter uses a relatively low voltage battery 47, e.g., 24 V DC (two 12 V batteries), as its power source. One side of the inverter transformer 44 primary winding 126 connects to the switching device 133 and/or the switching device 135 while the other connects to the switching device 132 and/or the switching device 134. As discussed below, the switching devices 132-135 are preferably power FETs. The transformer receives the 19.2 KHz, 24 V, inverter signal at its primary 126 and steps it up at the secondary 125 to the nominal output voltage at the power supply path, where the inductor 128 and the capacitor 129 low pass filter the signal into a sine wave output. The inductor 128 is preferably about 150 microhenrys and the capacitor 129 is preferably about 10 microfarads for a 660VA/120V system.

As shown in the block diagram of FIG. 10, the power FETs 132-135 of the H bridge control the power through the transformer. The totem poles 340-343 are used to drive the gates of the power FETs, while the logic controls 345-348 determine the FETs to be turned on and the pulse width of the inverter cycle.

In discussing the operation of the inverter FETs, the following definitions should be noted:

Positive ½ cycle—Positive portion of the sine wave output.

Negative ½ cycle—Negative portion of the sine wave output.

PEEL 90=Programmable, Electrical Erasable Logic, which contains the inverter control logic.

Switch path 1A=Provides a power pulse path through the top FET 132 for the positive ½ cycle from voltage +BATT to the transformer 44.

Switch path 1B=Provides a power pulse path through the bottom FET 134 for the negative ½ cycle from Voltage −BATT to the transformer 44.

Switch path 2A=Provides a power pulse path through the top FET 133 for the negative ½ cycle from voltage +BATT to the transformer 44.

Switch path 2B=Provides a power pulse path through the bottom FET 135 for the positive ½ cycle from voltage −BATT to the transformer.

TOTEM POLE—A transistor drive circuit, consisting of an NPN transistor used to drive high level signals, and a PNP transistor used to drive low level signals. The "TOTEM POLE" name comes from the typical stacked circuit arrangement of these transistors.

REF POL=Reference polarity, a 60 Hz logic signal derived from the microprocessor and used to determine which FETs to turn on. For example, if REF POL="1" or 5 V, the FETs needed to control the positive ½ cycle output are turned on. If the REF POL="0" or 0V, then the FETs used to control the negative portion of the ½ cycle output are turned on.

Figure 11:
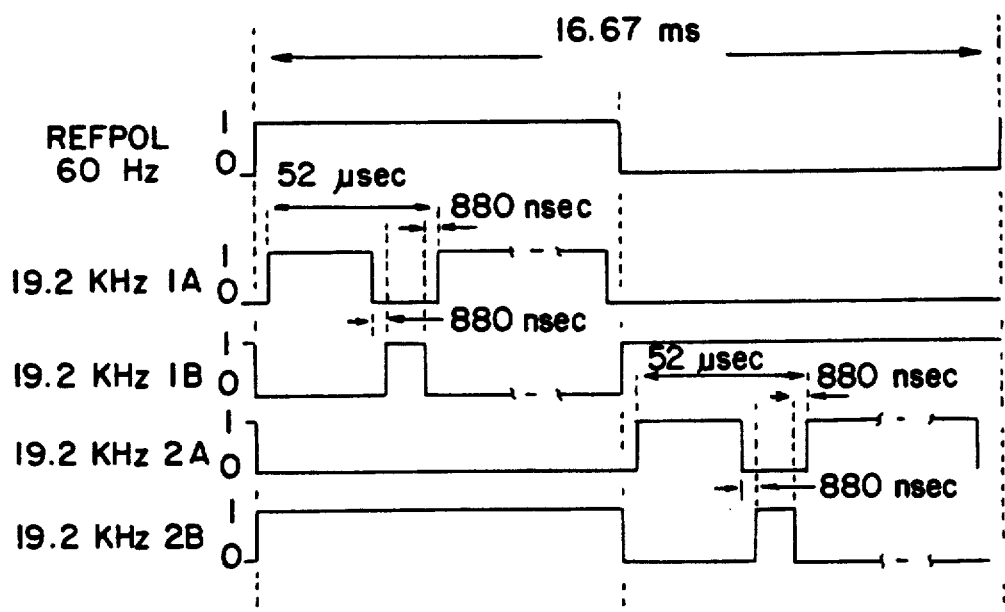
FIG. 11 are graphs showing timing diagrams for the turn on and off of the various switches in the inverter bridge.

The timing between the various inverter drive signals is shown in FIG. 11. During the positive ½ cycle, switch 2B, which preferably consists of multiple (e.g., three) paralleled FETs 135a, 135b, 135c, as shown in FIG. 13B, is turned on for the full duration of the ½ cycle. Switch 1A (e.g., two paralleled FETs 132a and 132c) is also turned on. Power flows from +BATT, through the "1A" FETs, through the transformer inverter winding 126, through the "2B" FETs, to −BATT. During this time, battery voltage is being applied across the inverter winding 126. This pulse is referred to as the power pulse. Once the pulse width of the "Power" pulse as determined by the logic is completed, the 1A FETs are turned off. There is approximately an 880 nsec delay before the 1B FETs (134a, 134b, 134c, in FIG. 13B) are then turned on. With the 1B FETs and the 2B FETs both on, enerqy is held in the transformer for the remainder of the inverter cycle (52 μsec) and there is only a small voltage across the inverter winding 126. This is called the "Free Wheel Mode". The energy circulating during this period is stored and/or dissipated in transformer leakage inductance, and in the output filter and load resistance.

The 880 nsec delay allows time for the 1A FETs to turn off before the 1B FETs turn on. The 880 nsec delay also occurs between 1B, turn off and 1A turn on.

This pattern continues for the duration of the positive ½ cycle. The pulse width of the inverter cycles are narrow near the zero crossings of the half cycle and get wider at the peaks of the half cycle.

The 1B FETs are turned on for the duration of the negative ½ cycle. The power pulse occurs when switch 2A turns on. Power flows from +BATT through the 2A FETs (133a and 133c and optionally 133b, although 133b need not be provided as described further below), through the inverter winding, through the 1B FETs to −BATT. The free wheel mode occurs when switch 2B turns on after 2A turns off, and also between 2B turn off and 2A turn on.

The power FET gates are driven by their respective totem-pole driver. Each totem pole consists of an NPN transistor (351-354 as shown in FIG. 13A) (e.g., 2N4401), a PNP transistor (356-359 as shown in FIG. 13A) (e. 2N4403) and a level shifter (361-364 as shown in FIG. 13A) (e.g., 2N7000). It is called a "totem-pole driver" because of the stacked arrangement of the active elements. Each totem pole and its +15 V decoupled supply are referenced to the group of power FETs it drives.

The level shifters 361-364 consist of N channel low power FETs (e.g., 2N7000). Each level shifter is used to convert the +5 V logic signal from NAND gates 366-369 to a +15 V control signal.

When a low level is applied to the gate of the FETs 361-364, the FET is off (open). This allows the transistors 351-354 to be biased on through their base resistor(s). +15 V is now applied to the gate of the appropriate power FETs in the inverter, turning them on.

When +15 V is applied to the gate of each level shifter FET it is turned on. This takes base current away from the NPN transistors (351-54) to which it is connected at the same time the gate of the PNP transistor (356-359) to which it is connected is forward biased, turning it on. This drives the gates of the power FETs to 0 V with respect to the FET source terminals, thus turning the power FETs off. The +15 V supply used to drive the 1A and 2A power FETs is derived by the use of a boot-strap supply.

For example, when the 1B FETs are on, the sources of the 1A FETs along with a capacitor 370 and the collector of transistor 356, are pulled to −BATT. At this time, the +15 V on a capacitor 371 and a capacitor 372 charge the capacitor 370 through a resistor 373 and a diode 374. The voltage on the capacitor supplies the gate voltage for turning on FETs 132a and 132c (generally, the third FET 132b need not be provided). The charge on capacitor 370 gets refreshed every time the 1B FETs turn on. The voltage on a capacitor 376 supplies the gate voltage for turning on FETs 133a and 133c. The capacitor 376 is charged in the same manner when the 2B FETs (135a, 135b, 135c) are on. The capacitor 376 charges through a resistor 377 and a diode 378 and is recharged every time the 2B FETs are on.

The boot strap supplies stay charged when the system is operating on-line because the inverter winding 126 is used to create a DC voltage for the battery charger operation. The reverse diodes in the 2B FETs, 135a, 135b, and 135c, make up the other bottom leg of a full wave rectifier. When the diodes of the 1B FETs conduct, the sources of the 1A FETs, 132a, 132b and 132c are pulled to −BATT, and therefore the capacitor 370 is kept charged to +15 V. In the same manner that capacitor 370 is charged when the diodes of the 1B FETs conduct, the capacitor 376 is kept charged when the diodes of the 2B FETs conduct. The purpose of the NAND gates 366-369 is to guarantee control of the inverter during start-up and shut-down of the system. The +5 V supply that feeds the gates 366-369 is the +5 V CPU supply. The +5 CPU supply comes up faster than the +15 V supply at turn on. The RESET signal which connects to the input of the gates 366-369 stays low until the +5 CPU gets to ≃4.75 V, then /RESET goes high (+5 V). The low /RESET guarantees a high (+5 V) on the gates of the FETs 361-364, which keeps the power FETs off.

If for any reason the PEEL 90 is not fully energized by the time /RESET goes hih, resistors 381-384 pull their respective inputs of the gates 366-369 low, which in turn hold the power FETs off.

During shut-down of the unit, the +5 CPU supply and /RESET stay powered longer than the +15 V supply. For the same reasons as on power-up when /RESET is low, the power FETs are guaranteed off.

Again, during de-energization before the gates 366-369 lose power, the resistors 381-384 pull their respective inputs to the gates low, therefore holding the power FETs off.

During normal operation, /RESET is high (+5 V), therefore the gates 366-369 invert the signals coming from the PEEL 90. These signals control normal operation of the inverter, as shown in the previous timing diagrams of FIG. 11.

The PEEL 90 controls the inverter timing. Coming into pin 11 of the PEEL 90 is the /CYCEND signal. During inverter operation if /CYCEND goes low the power pulse of the inverter cycle is terminated. Either of two circuits cause /CYCEND to go low during the inverter operation, the "modulation" circuit and conduction limit circuit.

Figure 12:
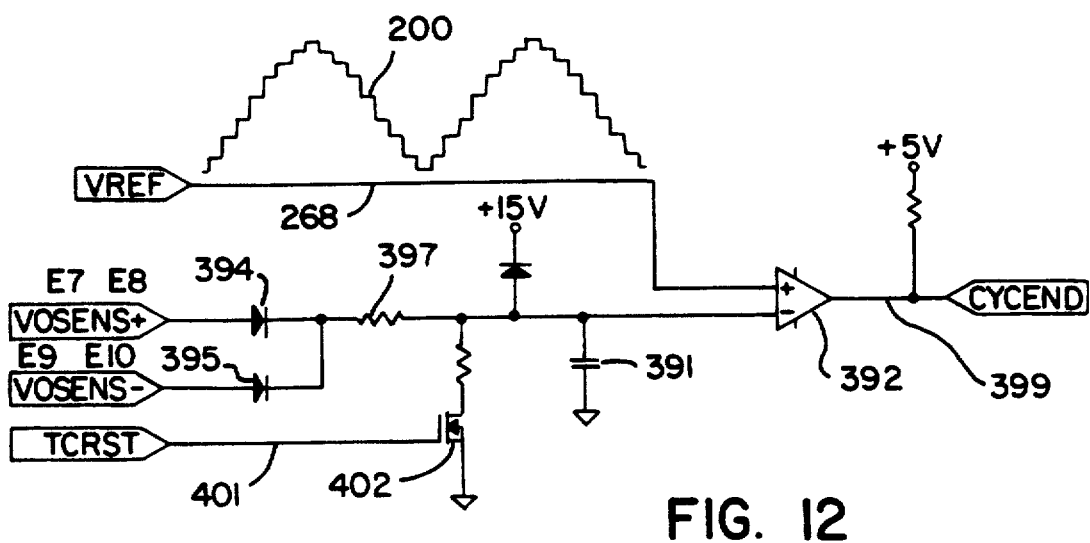
FIG. 12 is a schematic circuit diagram of the PWM modulation circuit which determines the length of the pulse turn-on of the switching devices of the bridge.

In the modulation circuit, shown in FIG. 12, a 32 step replica of the ½ cycle of line (VREF) on a line 268 is compared to the voltage charge of a capacitor 391 in a comparator 392. The charge and reset of the capacitor 391 is done at 19.2 KHz.

When the inverter turns on, (Power Pulse), either the anode of the diode 394 for the positive ½ cycle or of the diode 395 for the negative ½ cycle is pulled to near +BATT voltage through the appropriate power FETs (1A FETs for positive ½ cycle, 2A FETs for negative ½ cycle). This action causes the capacitor 391 to be charged through the resistor 397. When the voltage on the capacitor 391 exceeds the voltage of VREF, the output from the capacitor 392 on a line 399, /CYCEND, goes low, the "power pulse", or pulse width of the inverter cycle is ended, and the bottom FETs (2A FETs and 2B FETs) are turned on. This is the "Free Wheel" mode of the inverter cycle.

The first 880 Nsec of each inverter cycle is used to reset or discharge the capacitor 391 from the previous inverter cycle. This is done by the "Time Constant Reset" (TCRST) signal on a line 401. This signal turns on the FET 402 for 880 Nsec, discharging the capacitor 391 in preparation for the next cycle.

As VREF increases in amplitude, the longer is the time needed for the capacitor 391 to charge, and thus narrow the pulse widths are obtained when VREF is at or near 0 V and wide pulse widths near the peak of VREF.

This pulse width pattern is reflected on the output of the inverter, which is transferred to the output of the transformer 44, wherein the inductor 128 (150 μh) in conjunction with transformer leakage inductance and the capacitor 129 (10 μf) filter the inverter signals into substantially a sine wave output.

Because of this modulation scheme, it is possible to track the shape of VREF. The microprocessor determines what the incoming AC power line "looks" like and adapts the reference to reflect the voltage input. This procedure allows minimum battery operations while keeping the system interactive with the power line.

The second circuit used to contro the /CYCEND signal is the "conduction limit" circuit shown in FIG. 13B. This circuit protects the power FETs 132-135 from damage in case of an overload, such as a short placed on the system output during inverter operation. The power pulse of each inverter cycle, for the positive ½ cycle, has current flowing from +BATT through the 1A power FETs 132, and through the transformer winding 126 through the 2B power FETs 135 to −BATT. The same current flows through the 1A FETs 132 (e.g., two paralleled FETs 132a and 132c) as flows through the 2B FETs 135 (e.g., three paralleled FETs 135a, 135b, 135c). Since there are only two 1A FETs and three 2B FETs the current causes a larger voltage drop across the 1A power FETs than across the 2B power FETs. For the negative ½ cycle of inverter power pulses, the voltage drop across the two 2A power FETs (133a and 133c) is larger than the voltage drop across the three 1B power FETs (134a, 134b, 134c) since the same current flows through the 2A FETs as through the 1B FETs.

Because the top switches (1A and 2A) FETs always have the larger voltage drop when current is transferred into the transformer, the voltage across the 1A FETs is monitored to protect the power FETs for the positive ½ cycle, and the voltage across the 2A FETs is monitored to protect the power FETs for the negative ½ cycle.

The voltage across the top FETs is monitored by turning on a transistor 420 having its emitter connected through a resistor 421 connected to the battery voltage +BATT. The transistor 420 obtains a bias source when a transistor 424 pulls a resistor 425 to −BATT or GND. When the 1A power FETs 132 are on, the base of the transistor 420 is pulled to the same potential as the source of the 1A power FETs 132, minus the diode drop of diode 427. The voltage at the base of the transistor 420 is equal to the voltage across the drain to source of FET 133 plus the voltage drop of a diode 428 (0.6 V DC). The voltage seen at the emitter of transistor 420 equals voltage at the base of the transistor minus the voltage drop of the emitter-base junction (0.6 V) of the transistor 420. Therefore, the voltage seen across resistor 421 is equal to the voltage across the drain to source of the 1A FETs 132. Equivalently, the diode drop of the diode 427 is approximately equal to the emitter to base voltage of the transistor 420. This makes the voltage across the resistor 421 equal to the drain to source voltage of the 1A power FETs 132.

During the negative ½ cycle when the 2A FETs 133 are conducting, the base of the transistor 420 is pulled up to the same potential as the source of the 2A power FETs 133 minus a diode drop. The diode drop of the diode 428 is equal to the emitter-base junction of the transistor 420, which makes the voltage seen across the resistor 421 equal to the drain to source voltage of the 2A power FETs 133. Note that only one channel of protection is required for all four switches of the inverter.

The current through the resistor 421 is equal to the current flowing through a resistor 430 connected to the collector of the transistor 420; assuming that the transistor 420 has a high gain, and since the resistors 421 and 430 are equal in resistance, the voltage seen across the resistor 421 equals the voltage across the resistor 430. As with the modulation circuit, the signal TCRST (Time Constant Reset) on a line 432 turns on an analog switch 433 for the first 880 Nsec of each inverter cycle.

The analog switch 433 discharges the capacitor 434 and pulls the positive input of a comparator 435 to ground. Now, when TCRST turns off the switch 433, this releases the capacitor 434, and the power pulse of an inverter cycle is started. The voltage on capacitor 434 stays below the +2V threshold, seen on the negative input of the comparator 435 for approximately 1.2 μsec. During this time the negative input of a comparator 437 is pulled to GND, allowing its output signal, /CYCEND, to remain high. The 1.2 μsec. delay allows enough time for the top FETs 132 or 133 (1A or 2A) to turn on fully. After the 1.2 μsec. delay, the voltage on the capacitor 434 exceeds the 2V threshold. This allows the voltage on the resistor 430 to follow the voltage on the resistor 421.

When the voltage on the resistor 430, which equals the voltage seen on the resistor 421, exceeds 2V, /CYCEND, the signal on the output line 438 of the comparator 437, is forced low, which terminates the power pulse of the inverter cycle prematurely due to an overload condition.

The maximum output peak current allowed by the conduction limit circuit preferably is selected to vary by unit size as set forth below:

| Unit Size | Nominal Output Peak Current |
|---|---|
| 660VA | 16A |
| 460VA | 12A |
| 360VA | 10A |

The purpose of the transistor 424 is to turn off the transistor 420 when power to the unit is turned off. This eliminates unwanted current drain from the battery.

Several advantages are obtained from the foregoing circuit arrangement: (1) the number of power devices are kept to a minimum and are fully utilized; (2) two power devices are used in the 1A and 2A positions while three power devices are used in the 1B and 2B positions, and the unsymmetrical use of these power devides are controlled such that nearly equal power dissipation is seen in all power devices, (3) utilization of a single channel over-current protection circuit minimizes component count, which increases reliability of the system, and (4) the over current protection circuitry protects the more vulnerable top devices 132 and 133 (1A and 2A), and the boot strap supplies. The boot strap supplies could become discharged, which could result in insufficient gate voltage. This further increases the reliability of the system.

Microcomputer Control and Software

Figure 14A:
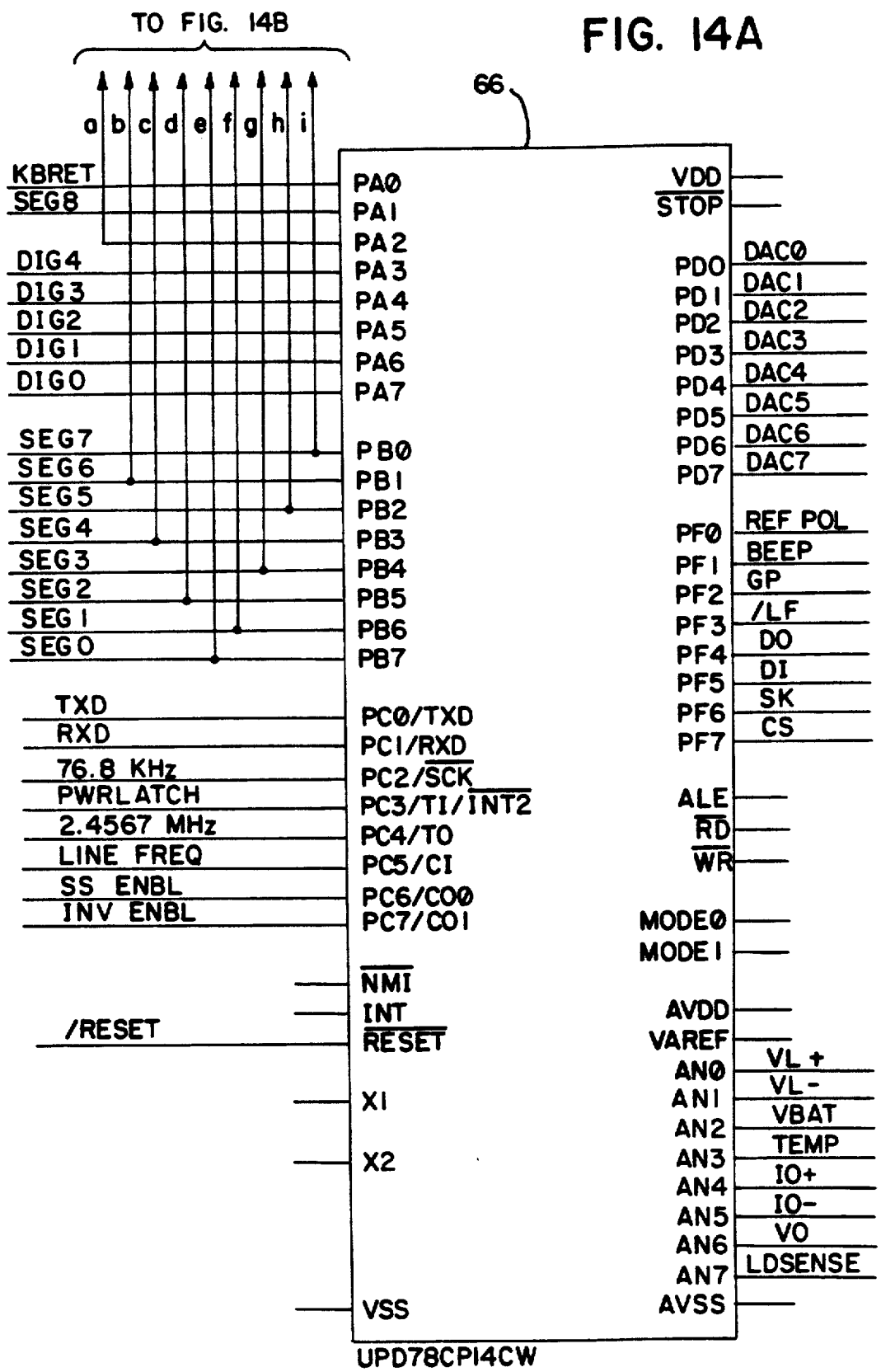
FIG. 14, composed of FIGS. 14A and 14B, is an exemplary port map showing connections of various signals to an exemplary microcomputer which may be utilized in the controller of the present invention.

Primary control functions, timing, and logic are provided by a high integration single chip microcomputer 66, such as the UPD78C14CW, manufactured by NEC. This device integrates the functions of an 8-bit central processing unit (CPU), program memory, data memory, input/output (I/O), and many peripheral functions in a single 64 pin integrated circuit. A port map for the microcomputer 66 is shown in FIG. 14A. An exemplary program for the microcomputer 66 to carry out the functions described herein is set forth in the microfiche appendix.

Internal peripheral functions include an 8-bit analog to digital converter (A/D) with internal sample and hold, an 8-input analog multiplexer, two 8-bit interval timers, a 16 bit multi-function time/event counter, and a serial communications interface capable of synchronous or asynchronous operation. Five 8-bit digital I/O ports are also provided. The uPD78C14CW single chip microcomputer provides 16 K bytes of internal read-only-memory (ROM) for storage of program and constant data. 256 K bytes of internal random-access-memory (RAM) are provided for storage of intermediate program data and stack. This memory is volatile, and is lost upon removal of CPU power.

An external electrically-erasable programmable read only memory (EEPROM) is provided for storage of programmable user constants, factory setup data, and calibration factors. This device is accessed serially and contains 1 K bits of data arranged as 64×16. The device is selected for access with the CD signal, and data is exchanged with the CPU via the DI (input) and DO (output) lines synchronously with the rising edge of clock signal SK. Write operations to the EEPROM are self-timed. A special write disable function is provided to prevent inadvertent data corruption during the power-up or power-down transient condition.

Figure 14B:
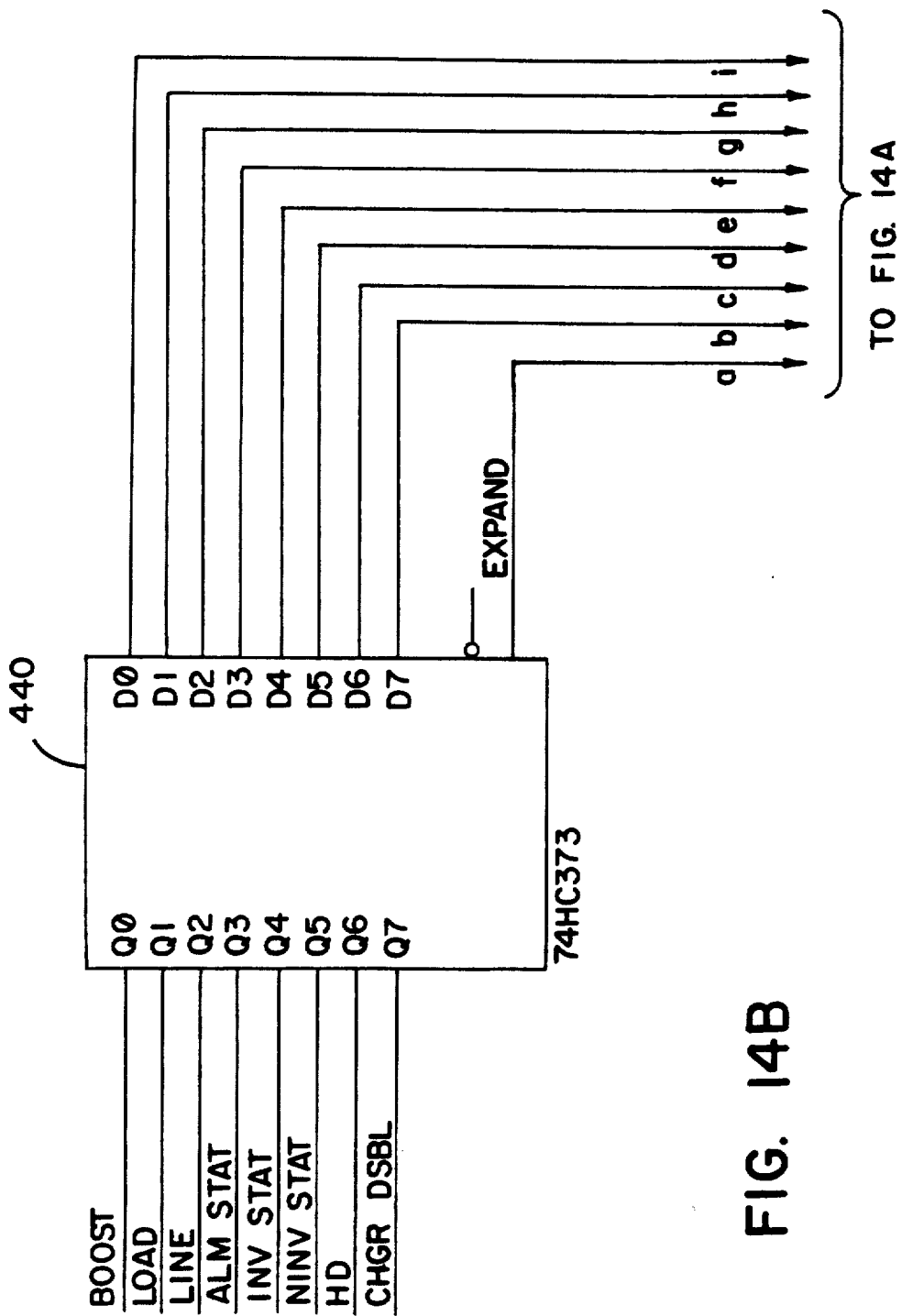

Digital outputs in addition to those provided directly by the microcomputer are derived by the 8-bit latch 440 shown in FIG. 14B. Data directed to this expansion latch is presented briefly on segment lines SEG-0-SEG7, and are strobed to the latc by toggling the EXPAND signal. Under the control of software, the latch is updated approximately every 2.5 milliseconds.

The user interface 80 provides communication between the microprocessor and the user and may contain, for example, a 4-digit LED display, LED annunciators, momentary contact pushbutton switches, and appropriate drive circuitry.

Major functions associated with the control of the back-up uninterruptible power system are performed by the microcomputer 66 under the control of a software program resident in the 16K byte internal read-only-memory (ROM). These functions include a digital phase-locked loop (PLL), acquisition and processing of analog inputs for display and control purposes, synthesis of a Reference Waveform, detection of anomalies on the input AC line, control of UPS primary and peripheral circuiss including the inverter, static switch, battery charger, user interface hardware, line and boost relays, and audible alarm, and scanning for anomalies on analog and digital inputs indicative of system alarm conditions. In addition, the microcomputer and associated program provide a means whereby external equipment may query status and alarm information from the UPS either by contact closures or a serial communications protocol.

A software phase-locked loop (PLL) is implemented to maintain synchronization of internal control functions to incoming AC line. When AC line is not present and the system is operating on inverter, the PLL maintains synchronization to an internally derived reference signal, selectable as either 60 or 50 Hertz.

The software PLL utilizes a variety of the microcomputer's peripheral functions, namely one of the 8-bit interval timers (TIMER0) and associated interrupt, the 16-bit multi-function timer/event counter configured in the interval measurement mode, and the CI edge-detection interrupt INT_EDGE.

The LINEFREQ output of the AC line zero-cross detection circuit is applied to the CI timer input of the microcomputer 66. The microcomputer's 16-bit timer is configured to measure the time interval between successive zero crossings of input AC line. The measured time interval is checked against absolute and rate of change limits to determine the suitability of the input line frequency signal. This filtered time interval value is then used to establish a frequency reference for the 8-bit interval timer TIMER0, operating at precisely 128 times the measured AC input line frequency. This timer is configured to generate an interrupt upon expiration, and therefore an interrupt source at exactly 128 times the line frequency is established.

In addition to period measurement as described above, the LINEFREQ input also generates an interrupt at each falling edge called INT_EDGE. As a part of the TIMER0 interrupt program, a down counter is maintained that counts in the sequence 127, 126, . . . 3, 2, 1, 0, 127, 126, and so forth. The INT_EDGE interrupt looks at the value of the TIMER0 interrupt counter to determine the phase of the internal counter relative to the line zero crossings. A counter value of 0 at the edge interrupt is defined to be "in phase". If the TIMER0 counter value is other than 0, the frequency of the 128× TIMER0 interrupt is adjusted proportionally up or down, subject to slew rate limits, as necessary to bring the counter in phase relative to line zero crossings. Thus, a phase lock to AC input line is achieved.

If successive INT_EDGE zero crossing interrupts are not detected within a prescribed amount of time, the AC input is determined to be outside of the desired tracking range and unsuitable for use as the frequency reference. In this mode, an internal 60 or 50 Hertz frequency reference is used. Phase lock to this internal reference is achieved in exactly the same manner and with the same slew rate limitations as to the INT_EDGE reference.

The PLL is used primarily to synchronize the internally generated Reference Waveform to AC input line, and to provide a phase-coherent reference for sampling of analog inputs with the A/D converter.

The microcomputer 66 and associated program sample and process signals provided by analog inputs AN-0-AN7. The process results of these signals are used for control of the UPS and display purposes. The sampling and processing of analog inputs is described below.

AC input line signals VL+ and VL− are sampled by the A/D converter 32 times/cycle each and every cycle, using as a time base the TIMER0 interrupt from the PLL. The VL+ signal represents the positive portion of the full-wave rectified AC line signal, and the VL− signal represents the negative portion. The signed value of AC input line is derived at each of the 32 sample points as VL+-VL−. The results are used in formation of the Reference Waveform, as well as summed over each cycle to determine average input voltage on a cycle by cycle basis. The sum of samples is multiplied by a linear calibration factor from EEPROM such that the result is equal to the RMS value of the AC input line assuming a sinusoidal waveform. This RMS value of input line is used for display and control of the inverter operation.

Battery voltage signal VBAT is sampled by the A/D converter 32 times/cycle every fifth cycle, using as a time base the TIMER0 interrupt from the PLL. The resultant 32 samples are averaged and multiplied by a linear calibration factor CFBAT stored in EEPROM. The resultant value is used for display, alarm, and run time calculation purposes.

Preferably, the system includes an electronic thermometer (not shown) which provides an ambient temperature signal TEMP which is sampled by the A/D converter 32 times/cycle every fifth cycle, using as a time base the TIMER0 interrupt from the PLL. The resultant 32 samples are averaged, then converted to degrees Celsius by multiplying by a conversion constant, and then subtracting an offset constant. The resultant value is used for display and alarm purposes.

AC output current signals IO+ and IO− are sampled by the A/D converter 32 times/cycle every fifth cycle, using as a time base the TIMER0 interrupt form the PLL. The IO+ signal represents the positive portion of the full-wave rectified output current signal, and the IO− signal represents the negative portion. The signed value of output current is derived and stored at each of the 32 sample points as IO+−IO−. The RMS value of output current is calculated as the square root of the sum of the squares of sample points, multiplied by a linear calibration factor CPACAO from EEPROM. This true RMS calculation is important to maintain accuracy of the measurement, in that high crest factor, nonlinear loads will cause the current waveform to be non-sinusoidal. The RMS calculation of output current is used for alarm, display, and protective shutdown of the output. The signed, instantaneous values of output current are also used to calculate output power.

The inverter primary voltage V0 is sampled by the A/D converter 32 times/cycle every fifth cycle, using as a time base the TIMER0 interrupt from the PLL. This signal is filtered by a capacitor prior to the A/D converter to remove high-frequency components present in the signal when the inverter is operating. The low-frequency (60 or 50 Hertz) component remains. The 32 samples are averaged and multiplied by a linear calibration factor stored in EEPROM. The calibration factor CFACVO accounts for the primary to secondary turns ratio of the main transformer, such that the resultant value represents the AC output voltage on inverter at no load.

The pilot outlet current signal LDSENSE is sampled by the A/D converter 32 times/cycle every fifth cycle, using as a time base the TIMER0 interrupt from the PLL. The resultant 32 samples are averaged and stored.

An important function of the microcomputer is the formation of a Reference Waveform. A modified version of the Reference Waveform signal is used by the line fault comparator for rapid detection of line anomalies for line interactive operation, and is used as an input to the inverter pulse-width modulator as the desired output waveform during inverter operation. The formation of this Reference Waveform is dependent on the system operating mode and is described below.

The Reference Waveform normally represents the historical value of AC input line over the preceding line cycles. It is compared, with an allowable delta, against the instantaneous value of line in the line fault comparator for the purpose of determining, on a sub-cycle basis, the suitability of line to power the protected load. During inverter operation, it represents the desired output waveform, both in magnitude and wave shape. It is stored as an array of 32 signed, 8-bit values and is output by the microprocessor in an interpolated form 64 times per cycle, in phase-coherence with the PLL. The magnitude is output to the D/A converter via signals REF-0–REF7, and the polarity is present on the REFPOL output, with REFPOL=high representing positive values. The formation of the Reference Waveform values is dependent on the operating mode of the system.

During line operation, the Reference Waveform is calculated as an exponentially smoothed combination of the instantaneous value of AC input line as sensed by the VL+ and VL− analog inputs, and the present value of the particular Reference Waveform point, representing the historical value of the waveform. The software applies exponentially smoothing weights of $\frac{1}{8}$ and $\frac{7}{8}$ to the instantaneous and present values, respectively. The Reference Waveform formation is thus according to the equation:

$$REFDAT(n) \leftarrow (\tfrac{1}{8})*VL(n)+(\tfrac{7}{8})*REFDAT(n)$$

where REFDAT(n) is the nth sample point of the Reference Waveform (range of 0..31) and VL(n) is the instantaneous value of AC input line at sample point (n). The "<−" symbol means "is assigned the value of".

The Reference Waveform during inverter operation is formed in a similar manner to that during normal line operation, except that a sample from the desired output waveform from ROM memory is used as the input to the exponential smoothing function, instead of the instantaneous value of AC input line. Thus, the reference is formed according to the equation:

$$REFDAT(n) \leftarrow (\tfrac{1}{8})*ROMDAT+(\tfrac{7}{8})*REFDAT(n)$$

where ROMDAT(n) is the nth entry in an array of 32 signed, 8-bit values representing the desired inverter output waveform (generally, a sine wave).

In boost operation, the reference waveform is calculated and output in the same manner as on line operation, but the waveform is not output to the D/A converter and REFPOL during the transition from boost to inverter. Instead, the desired sine wave output waveform stored in ROM memory is directly output to the D/A without exponential smoothing. This prevents the inverter from generating too low an output voltage for the several cycles following transfer.

The microcomputer and associated software program calculates several metering variables used for control and display purposes based on mathematically derived results from measured signals rather than direct measurement. These "derived metering" variables include system AC Output Voltage, Run Time, Output Power, Percent Full Load, and Frequency. Their derivations and relationship to directly measured signals is described below.

For the purposes of cost savings, AC output voltage need not be directly measured, but can be implied from other measured signals, and is dependent upon the mode of operation. During normal line operation, the AC output voltage may be displayed as identical to the measured AC input voltage, although this method does not account for the voltage drops across the input line relay 34 or static switch 35.

During boost operation, where the main transformer functions as a step-up autotransformer, the AC output voltage is displayed as the measured AC input voltage multiplied by the linear calibration factor CFBOOST from the EEPROM. This factor is approximately equal to 1.16, but is adjusted during calibration to account for manufacturing differences in transformers.

The AC output voltage on inverter operation is calculated according to the equation: VOUT=V0−(R-T)(IO), where V0 is the inverter primary voltage scaled by a factor to account for the main inverter transformer turns ratio, RT is a constant term to account for the lumped resistance of the transformer, and IO is the calibrated RMS value of output current.

True output power in watts is calculated for the purpose of Percent Full Load calculation and Overload Alarm. Power is normally calculated as an average of 5 V(n)*I(n) samples, where V(n) and I(n) represent the nth samples of voltage and current samples coherently over one period. Since the system does not measure the output voltage directly, the calculation must use the estimates of output voltage as described above. Therefore, during line operation, power is calculated, using for the V(n) samples the value of REFDAT(n), which represent the historical values of input AC line. Including the appropriate calibation factors CFACVI and CFACAO for input voltage and output current respectively, the equation becomes:

$$WATTS = CFACVI * CFACAO * (1/32) \sum_{n=0}^{31} REFDAT(n)*IO(n)$$

For boost operation, a similar power calculation method is used, but the boost ratio of the transformer must be considered. The boost calibration factor replaces the normal AC input voltage factor and the equation becomes:

$$WATTS = CFBOOST * CFACAO * (1/32) \sum_{n=0}^{31} REFDAT(n)*IO(n)$$

During inverter operation, the power calculation must consider the measured inverter primary voltage, a term to account for the inverter transformer turns ratio, and the RMS value of the desired output waveform from ROM. When the inverter primary voltage and turns ratio factor are lumped into the VO term, the power equation becomes:

$$WATTS = CFWATTS * CFACAO * (1/32) \sum_{n=0}^{31} REFDAT(n)*IO(n)$$

CFWATTS is a term deterimined during calibration and represents the gain of the inverter.

Percent Full Load is calculated as: 100*WATTS/WATT RATING. The calculation is rounded to the nearest 5%, and hysteresis is applied to the calculation to enhance stability of the displayed value.

Frequency is calculated according to the equation: FREQ=1/LECPT, where LECPT is the instantaneous period of the software phase locked loop (PLL). During line operation and under locked conditions, this is equal to the frequency of the input AC line. During inverter operation and under locked conditions, this is equal to the nominal operation frequency as programmed in the EEPROM, either 60 or 50 Hertz.

Several modes of line anomaly detection are provided by the microcomputer and associated system software. These modes supplement the rapid, line interactive detection provided by the line fault hardware.

The microcomputer monitors the average-derived RMS voltage level of the AC input line on a cycle by cycle basis. If this level falls below a predefined setpoint, the microcomputer directs the system to run continuously on inverter by opeing the AC input line relay 34 and static switch 35 by driving the LINE and SS ENBL signals low. The INV ENBL signal must also remain in its normal high state. The threshold for this setpoint is defined by the V_LO setpoint and the boost ratio, represented as CFBOOST. This condition is defined as: VL<=(V_LO)/CFBOOST, where VL is the calibrated voltage level of AC input line, and CFBOOST is approximately equal to 1.16. The system remains in this state until either the AC line returns to normal or the batteries expire.

When the average-derived RMS voltage level of the AC input line is between the very low condition as defined above and the V_LO setpoint, the operation is defined as boost mode. The microcomputer first operates on inverter (SS ENBL=low), then closes the boost relay by forcing the BOOST output to the active high state. The system waits for the operate time of the boost relay, then re-enables the static switch and provides boosted line to the load. This mode is useful for extended periods of brownout that would otherwise deplete the battery. The transition through inverter operation is necessary to prevent a momentary loss of output as the boost relay operates. The transition through inverter is also performed when the system exits the boost mode.

If the AC input voltage is determined to be too high, and might cause damage to the protected load, the microcomputer directs the system to operate continuously on inverter until the condition returns to normal. This High Line mode is defined by: VL> =V_HI, where V_HI is the programmable high line setpoint from EEPROM.

With certain types of line interruptions, in particular a ring-down decay of the AC input, the cycle by cycle, average-derived RMS method of line anomaly detection is insufficient to provide adequate transfers. An additional detect mechanism is provided by the microcomputer that monitors the status of the line fault comparator output /LF on a sub-cycle basis. If the /LF signal is found to be continuously low for a programmable amount of time, the system transfers to inverter operation in the same manner as it does in response to an average-derived RMS anomaly. This time is nominally 1.5 milliseconds.

Two signals are provided by the system hardware to modify the line anomaly detection under certain conditions. These signals, under the control of software, modify the inputs to the line fault comparator 194.

The Guard Pulse signal GP is used to prevent the transfer from inverter to line operation at or near the zero crossings of AC input line during line interactive operation. This signal is controlled in the PLL TIMER0 interrupt and is driven to the active high state for approximately 2.5 milliseconds each half cycle, centered about the zero-crossings.

The High Delta output HD is used to prevent excessive line-interactive operation from depleting the system battery. The software control of this signal is adaptive, and optimized to provide high sensitivity to line faults (HD=high) whenever possible.

The program continuously monitors the battery voltage signal VBAT. When the battery voltage is determined to be dropping without the system having transferred to inverter operation, the software determines that line-interactive operation is occurring too frequently for the system battery charger to keep up. The HD output is then driven to the active low state.

After a period of time, and when the monitored battery voltage returns to the properly charged state, the software reverts the HD output to the high sensitivity mode.

The Auto Load Sense option provides the user the ability to control the ON/OFF status of auxiliary AC output outlets based on the current drawn by a pilot outlet. The stored, averaged value of the LDSENSE input is compared against a value stored in EEPROM. If the Auto Load Sense option is selected, and the averaged LDSENSE current is greater than the stored setpoint, the LOAD relay is closed, subject to hysteresis and timing constraints. If the option is not selected, the LOAD relay is maintained closed.

The microcomputer has the ability to control the ON/OFF status of the primary battery charger through the CHGR_DSBL signal. The battery charger is disabled during inverter operation by forcing the CHGR_DSBL output to the high state. The charger is enabled when CHGR_DSBL is in the low state.

The microcomputer 66 and software program also check for any of nine (9) alarm conditions associated with operation of the UPS. Alarm conditions are derived from a combination of the status of analog and digital inputs to the microcomputer, operating mode, and internal microcomputer timing. The alarm conditions and derivation thereof are described below.

The system software monitors the RMS output current IO and emulates a circuit breaker function. A term relating to the time integrated, squared output current is maintained and continuously compared against a predefined setpoint in EEPROM. The time-based accumulation and comparison is made according to the expression: $((IO)^{**}2)T - (K1)T < K2$. When the left side term equals or exceeds the K2 term, the output is shut down. On line operation, this is achieved by opening the AC input line relay and static switch by forcing LINE and SS ENBL control signals to the low state. During inverter operation, the inverter is shut down by forcing the INV ENBL output to the low state.

The system automatically tests the integrity of nonvolatile EEPROM memory during the power up sequence. The microcomputer checks a special address of EEPROM memory and compares the data there against a pre-defined pattern and a ROM memory version number contained in the program memory. If the patterns do not match, a Memory Error alarm is generated and the EEPROM is initialized to default settings.

An Overload alarm is generated when the Percent Full Load variable, calculated as a ratio of WATTS to WATT RATING, exceeds 100%. A small alarm debounce period prevents nuisance alarms due to momentary output load surges.

Two types of Low Battery alarms may be provided. The Low Battery Shutdown alarm occurs when the battery voltage drops below a programmable setpoint, nominally 19.0 VDC. This normally occurs following extended operation on inverter. The microcomputer 66 performs the shutdown operation by forcing the INV ENBL line to the low state.

The system can be configured to restart from the Low Battery Shutdown condition automatically upon restoration of AC line power. This is controlled with the Auto Restart programmable parameter. When so programmed, the system restarts the output upon restoration of AC power, thereby allowing the primary battery charger to function. The Low Battery alarm is cleared when the Battery OK setpoint, nominally 24.0 volts is achieved.

A second Low Battery alarm is designed to prevent a destructive deep discharge of the battery. When the battery voltage drops below 17.0 VDC, the microcomputer 66 forces the PWR LATCH signal low, ultimately removing base drive from the power switch transistor. All load, including that consumed by the control and logic, is thereby removed from the battery.

A Low Run Time Battery alarm is provided to alert the user of an impending shutdown while operating on inverter. This alarm compares the run time as calculated under "Derived Metering" above against a programmable setpoint contained in EEPROM. The alarm is signaled when the calculated run time is less than or equal to the setpoint.

An Over Temperature alarm is provided such that when the ambient temperature sensed by the TEMP analog input is equal to or exceeds a programmable setpoint, the alarm occurs.

A piezoelectric audible alarm may be provided to alert the user of inverter operation and alarm conditions, and to supplement the tactile feel of front panel pushbutton switches by providing a "click" when a key is depressed. The 2400 Hz audible alarm is controlled by software using the active high BEEP output. The audible alarm may be selectively disabled using the Silence Alarm 1 and 2 programmable parameters.

The microcomputer system and software provides an extensive set of communications I/O and routines for interface to external equipment. The communications make use of the RS-232 level signals TXD (output) and RXD (input), and the open collector outputs ALM STAT, INV STAT, and NINV STAT.

The microcomputer 66 and software program provide status information and a means to control the UPS system via a local interface which, for example, may comprise a four-digit, 7-segment LED display, three (3) status LED indicators, and four (4) pushbutton switches.

A 4 digit LED display 84 may be provided to give the user access to the various metered data, setup parameters, and alarm code information. Normal, readily viewable data includes AC Input Voltage, AC Output Voltage, Percent Full Load, Run Time, Battery Voltage, and Model Rating. Alarm code information is presented in the form "A X", where X is a single digit code representing the type of alarm. Alarm code information may be alternated with the relevant associated metered parameter. For example, Output overload alarm (code A 1) is alternated with the calculated Percent Full Load.

In the programming mode, the left-mode digit is used to describe which particular parameter is being viewed or altered, and is so indicated by rapid flashing. As data is changed and entered, the flashing is slowed to indicate that the requested change was made.

LED's 89 can be provided on the front panel 88 for annunciation of system operating mode and status. A green LED represents the status of input AC line. OFF indicates that input line is below the boostable level. A SLOW BLINK indicates that the AC input voltage is low, but boostable to a suitable output voltage level. ON indicates that line is normal and between the range V_LO to V_HI. FAST BLINK indicates that line is above the V_HI setpoint. The red LED indicates the presence of one or more alarm conditions as described above. The yellow LED indicates invertor operation in a non-live interactive mode.

Front-panel pushbutton switches 86 may be provided for control of the display, audible alarm, access to view and change setup parameters, and invocation of the other desired features. In the normal mode of operation, metered data may be viewed by depressing one pushbutton or two adjacent pushbuttons. The selected metered data is displayed for 5 seconds, then the display reverts to the normal display, either Run Time or AC Input Voltage. The CANCEL switch may be pressed to silence the audible alarm following an alarm condition. The self test features are invoked by depressing and holding the TEST switch. A special two-key entry method may be provided for access to user, factory, and calibration parameters. Multiple keys must be depressed and held for approximately 2 seconds to access the setup and calibration levels. In this mode, two switches are used to increment or decrement the value of the selected parameter, and the CANCEL and TEST buttons are used for parameter selection and entry.

The remaining inverter run-time available from the battery is determined by the microprocessor in accordance with the following procedures. During inverter operation:

$$t_R(INV) = \left[ K_1 + \frac{K_2}{I_o(INV)} \right] \frac{(V_B - V_{LL})^2}{(V_{FC} - V_B)}$$

FOR $t_R(INV) < t_R(LINE)$
OTHERWISE $t_R(INV) - t_R(LINE)$ where:
- $t_R(INV)$ = estimated run-time on inverter usually expressed in minutes.
- $K_1, K_2$, = constants for proportionality and for adjusting the relationship's dependence on load current.
- $I_o(INV)$ = inverter output load current in RMS amperes.
- $V_B$ = battery terminal voltage.
- $V_{LL}$ = lower limit of battery voltage.
- $V_{FC}$ = battery open-circuit, full-charge voltage.
- $t_R(LINE)$ = run-time available on inverter, but estimated during line operation while battery is charging. In this context, it would be the last such value calculated just prior to inverter operation.

After line input returns to acceptable quality and just prior to transfer from inverter to line, the following calculation is made.

$$V_B(OC)C = V_B + K_3 I_o(INV)$$

where:
- $V_B(OC)C$ = calculated open-circuit battery voltage.
- $K_3$ = a constant equivalent to battery resistance referred to load current. This value is recalculated during line operation and stored.
- $V_B(OC)C$ and $I_o(INV)$ are stored for later reference.

During line operation:

Immediately upon return to line, the battery charger is held off for a period of time so that the open-circuited battery voltage can be measured. The hold-off time can be 0.5 to 1.5 minutes. Then the following calculation is made:

$$K_3 \leftarrow \frac{V_B(OC)M - V_B(OC)C}{I_o(INV)} + K_3$$

where: $V_B(OC)M$ = measured open-circuited battery voltage. K3 value is refreshed by the above process if the following conditions are met:
1) % load $\geq 25\%$;
2) $t_R(INV) < t_R(LINE)$, validating equation (1);
3) $t_R(INV) >$ low run-time alarm value;
4) K3 changes by more than 10/256

$$K_3 \leq \frac{V_{FC} - V_{LL}}{I_o(RATED)}$$

and
5) new

Then $V_B(OC)C$ is replaced with $V_B(OC)M$:

$$V_B(OC)C \leftarrow V_B(OC)M$$

At periodic intervals, $V_B(OC)C$ is updated:

$$V_B(OC)C \leftarrow V_B(OC)C + K_4 (\Delta t)$$

where:
- K4 = constant expressing the change in open-circuit battery voltage for a given time interval and is related to battery capacity and net battery charging current. Generally this contact is calculated from recharge data and is expressed in $\mu V/sec$.
- $\Delta t$ = periodic calculation interval.

Then the following is calculated:

$$V_BC = V_B(OC)C - K_3 I_o(LINE)$$

where
- $V_BC$ = calculated battery terminal voltage.
- $I_o(LINE)$ = output current during line operation.

Finally:

$$t_R(LINE) = (K_1 + \left[ \frac{K_2}{I_o(LINE)} \right] \frac{(V_{BC} - V_{LL})^2}{(V_{FC} - V_{BC})}$$

The remaining run-time $t_R(LINE)$ and $t_R(INV)$ can be made available for display to the user through the user interface, with a warning signal automatically provided if the run-time drops below a preselected minimum level.

Programmable Logic Device Operation

The following description uses the definitions below.
PEEL—PEEL is an acronym for "Programmable Electrically Erasable Logic". The device can be programmed and reprogrammed, thereby providing a versatile and economical implementation of digital logic designs.
MACROSTATE—A "macrostate" (hereafter referred to simply as state) describes a condition of, or a condition imposed upon, the uninterruptible power system 30 (UPS). Examples are inverter test state; line-interactive state; utility line-shorted state. Macrostates are used in this discussion to describe system conditions and system response from a "macro" perspective of the system.
MICROSTATE—A "microstate" (hereafter also referred to as a "state") describes a uniquely defined state of a digital logic state machine—which is a virtually physical portion of the digital circuit implemented in the PEEL. The difference between "macrostates" and "microstates" will usually be apparent from the context of the discussion. Microstates are always assigned binary number representations and will be referred to by those binary number representations. However, there is sometimes a one to one correspondence among macrostates and microstates—where an ambiguity exists, the full term, macrostate or microstate,will be used.

The PWM/static switch logic is preferably incorporated in the PEEL 90, for example, a 20 pin dual-in-line integrated circuit commercially available under the designation PEEL18CV8.

The logic design resident in the PEEL 90 serves as an interpreter of UPS system 30 macrostate information—information regarding utility-line condition, user interaction, etc.—which is provided to the PEEL by the system's analog circuitry and the microprocessor 66. PEEL logic (hereafter referred to as the PEEL) then coordinates the operation of the static switch and H-bridge inverter subsystems.

Logic programmed into the PEEL is designed to accommodate the following functions associated with PWM control of the H-bridge inverter 46 and the SCR static switch 35.

PEEL FUNCTIONS

I. STATIC SWITCH and INVERTER SUBSYSTEM COORDINATION, which is dependent upon UPS mode of operation.
II. PWM BRIDGE-SWITCH SEQUENCING:
  a. modulation sequencing;
  b. dead-time generation (over-current protection);
  c. switch shutdown due to over-current;
  d. reset of PWM and conduction limit holdoff (CLH) RC circuits.
III. SCR STATIC SWITCH DRIVER CONTROL:
  a. first pulse initiation;
  b. 19.2 kHz pulse coordination.
IV. SUBSYSTEM TRANSFERS (static switch to inverter and vice versa):
  a. UPS mode discrimination;
  b. first transfer-pulse discrimination;
  c. inverter commutation of static switch.

FIG. 15 depicts a macrostate diagram illustrating four modes of system operation which are selectable by the user. PEEL state-machine operation will be described by first enumerating various UPS modes of operation concurrent with conditions imposed on the UPS, and then by defining appropriate subsystem responses to these conditions.

Figure 16A:
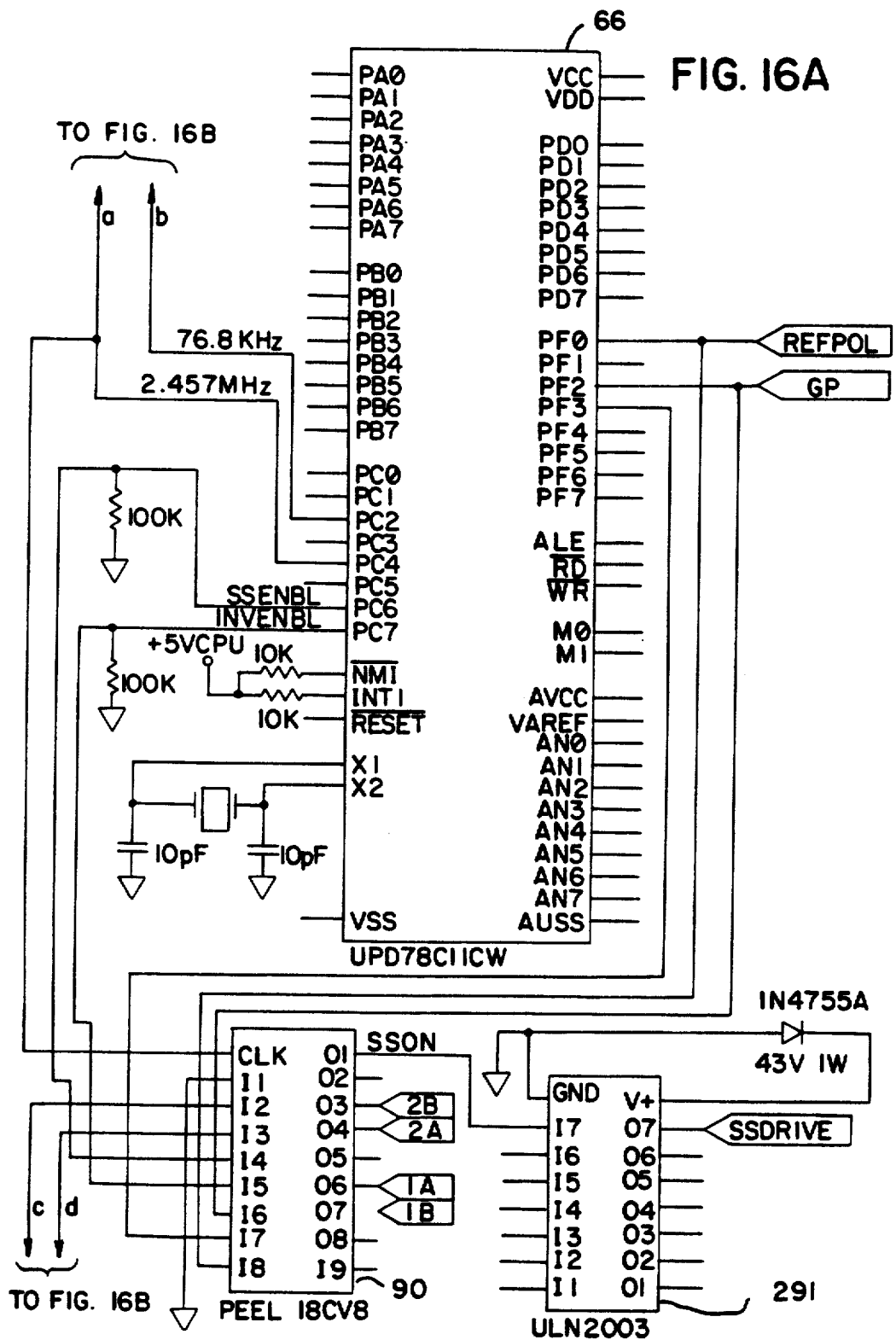
FIG. 16, composed of FIGS. 16A and 16B, is a schematic circuit diagram showing illustrative connections between a preferred microprocessor and an exemplary programmable logic array which is utilized for pulse width modulation and static switch control.
Figure 16B:
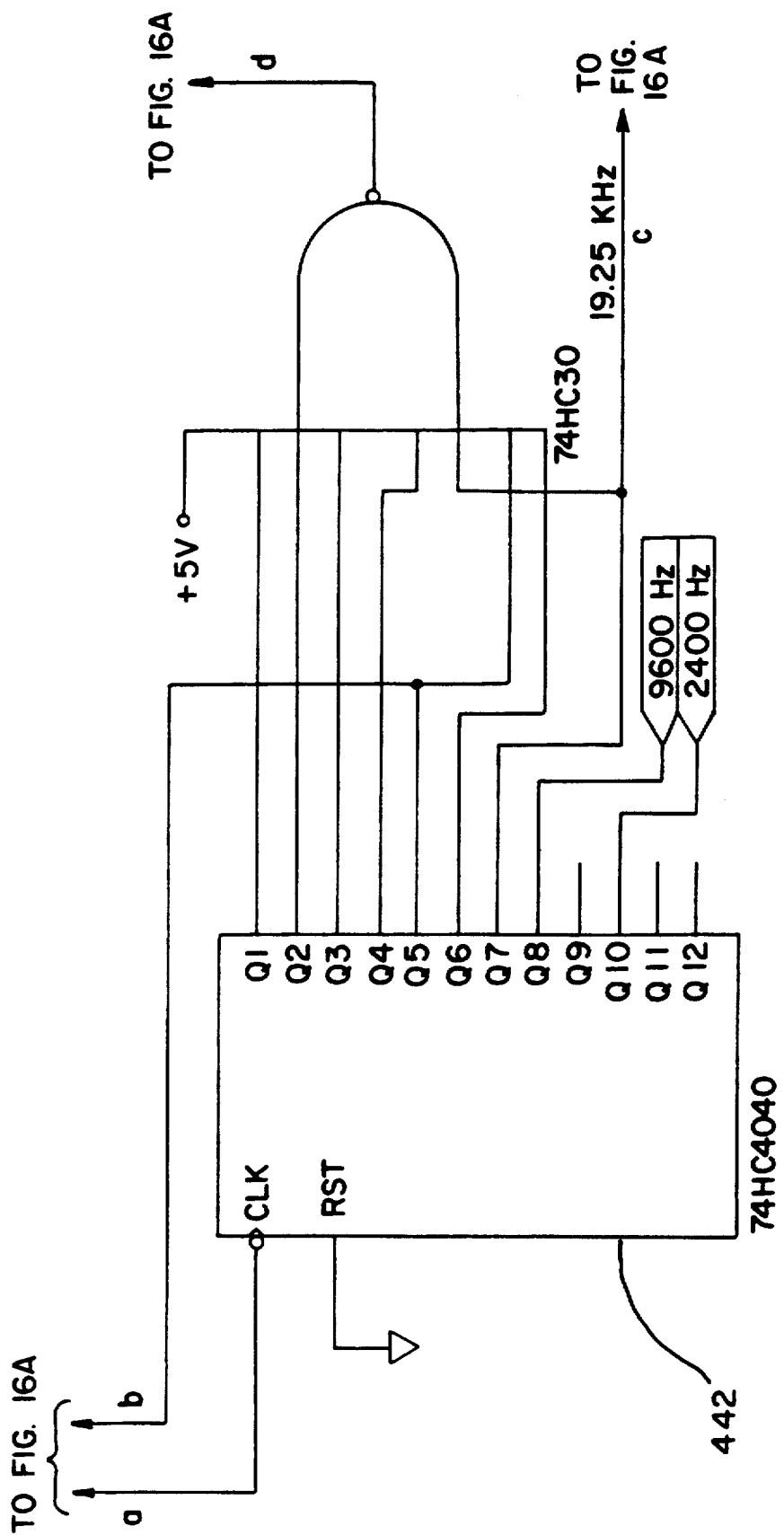

By means of the circuit shown in FIGS. 16A–16B, the microprocessor sends two logic signals to the PEEL—SSENBL (static switch enable) and INVENBL (inverter enable); Hereafter, these signals will be referred to as SSON and INVON. The microprocessor interprets the keypad commands input by the user and passes this information on to the PEEL in the form of these two signals, provided that the conditions imposed on the UPS are sufficient for operation in the selected mode. The inverter and static switch subsystems will be operated with different sets of rules, depending on which system mode the user has chosen. These rules are expressed in a general manner in Table 1.

TABLE 1

| SYSTEM MODE | SYSTEM MODES OF OPERATION | | |
|---|---|---|---|
| | Binary Number | | GENERAL |
| | SSON | INVON | RESPONSE OF PEEL |
| System off | 0 | 0 | Hold static switch AND inverter OFF, regardless of line condition. |
| Line Only | 1 | 0 | Hold static switch ON and inverter OFF, regardless of line condition. |
| Inverter Run | 0 | 1 | Hold static switch OFF and inverter ON, regardless of line condition. |
| Interactive | 1 | 1 | Hold static switch ON, except when line fault occurs—transfer to inverter until line fault clears. |

Besides modifying the static switch and inverter response according to each of these system modes, the PEEL coordinates the orderly transition of power between line and inverter during the virtually instantaneous transitions among system modes. The PEEL will coordinate these transitions and supplement other system circuitry in guaranteeing static switch SCR commutation through inverter control, and will provide instantaneous drive for the static switch pulse-transformer driver 291 as shown in FIG. 9C. These additional operations are required to provide smooth transfers between line and inverter under a variety of line-fault conditions.

Before operation under each of the system modes is examined, and before power transitions are examined, it is appropriate to introduce the Boolean equations that define PEEL operation. The connection between conditions imposed on the system, represented by the input variables on the right side of the equal sign, and the response of the static switch and inverter subsystems, represented by the output name located to the left of the equal sign, can be seen. The following definitions which explain PEEL assembler Boolean operators should be noted:

!—The PEEL source code assembler Boolean NEGATION operator. "!sson" means static switch enable signal is false; "sson" means static switch enable signal is true. In this example, the false condition corresponds to the static switch subsystem being inactive.
&—The PEEL assembler Boolean AND operator.
—The PEEL assembler Boolean OR operator.

System Boolean Equations:

MICROSTATE DECODING SECTION—
(These equations determine the next microstate based on the current state, current system mode and other conditions)
Q1 = SSON & INVON & !Q3 & Q2 & !Q1 & !PWMFREQ & !LFAULT #
    SSON & INVON & !Q3 & Q2 & !Q1 & !LFAULT & !GP #
    SSON & INVON & !Q3 & Q2 & Q1 & PWMFREQ #
    !SSON & !Q3 & INVON#
    !SSON & !Q2 & Q1 & PWMFREQ #
    INVON & !Q3 * !Q2 * !LFAULT #
    INVON & !Q2 & Q1 & PWMFREQ & !LFAULT #

-continued

```
Q2 =   SSON & INVON & !Q3 & !Q2 & !Q1 & LFAULT & 20K #
       SSON & INVON & !Q3 & Q2 & !Q1 #
       !SSON & !Q3 & Q1 & !LPULSEND #
       !SSON & Q2 & Q1 & PWMFREQ#
       !SSON & Q1 & PWMFREQ & !LPULSEND #
       INVON & Q1 & PWMFREQ & !LPULSEND & !LFAULT #
       INVON & Q2 & Q1 & PWMFREQ & !LFAULT #
       !Q3 & Q2 & Q1 & PWMFREQ
Q3 =   !SSON & Q3 & Q1 #
       !SSON & Q3 & PWMFREQ #
       INVON & !Q3 & !Q2 & Q1 & !LFAULT #
       INVON & Q3 & PWMFREQ & !LFAULT
H-BRIDGE MOSFET SWITCH SECTION OUTPUTS—
("B" switches are low side; "A" are high side; "1" are left
side; "2" are right side)
2B =   !SSON & INVON & POL #
       SSON & INVON & !LFAULT & POL & Q3 #
       SSON & INVON & !Q1 & !Q2 & Q3 #
       SSON & INVON & !LFAULT & Q1 & !Q2 & Q3 #
       SSON & INVON & !Q3 & Q2 & Q1 & GP & !POL & 1A #
       SSON & INVON & !Q3 & Q2 & Q1 & !GP & POL & 1A
2A =   !SSON & INVON & Q1 & !Q2 & Q3 & !POL & LPULSEND #
       SSON & INVON & !LFAULT & !POL & Q1 & !Q2 & Q3 & LPULSEND#
       SSON & INVON & !Q3 & Q2 & Q1 & GP & POL & LPULSEND#
       SSON & INVON & !Q3 & Q2 & Q1 &GP & !POL & LPULESEND#
1B =   !SSON & INVON & !POL#
       SSON & INVON & !LFAULT & !POL & Q3#
       !SSON & INVON & !Q1 & !Q2 & Q3#
       SSON & INVON & !LFAULT & !Q1 & !Q2 & Q3#
       SSON & INVON !Q3 & Q2 & Q1 & GP & POL & 2A#
       SSON & INVON & !Q3 & Q2 & Q1 & !GP & !POL & 2A
1A =   !SSON & INVON & POL & Q1 & !Q2 & Q3 & LPULSEND #
       SSON & INVON & !LFAULT & POL & Q1 & !Q2 & Q3 & LPULSEND #
       SSON & INVON & !Q3 & Q2 & Q1 & GP & !POL & LPULSEND #
       SSON & INVON & !Q3 & Q2 & Q1 & !GP & POL & LPULSEND
SCR STATIC SWITCH DRIVER SECTION OUTPUT—
SSONOUT =   SSON & !INVON & !Q3 & !Q2 & !Q1 & 20K #
            SSON & INVON & !Q3 & !Q2 & !Q1 & LFAULT #
            SSON & INVON & !Q3 & Q2 & !Q1 & 20K & LFAULT
```

The names on the left of the equal sign are the outputs of the PEEL. These connect directly to the static switch pulse transformer drivers; to the H-bridge inverter solid state switches; and to the Pulse Width Modulation (PWM) and conduction limit hold-off time constant reset switches. When the logical conditions of the system as defined by the expressions to the right of the equal sign are true, the corresponding output (physical device) will be enabled.

Signal Definitions:

SSON—(Static Switch ON enable) is a logic level signal from microprocessor that permits the PEEL to enable the static switch, provided the PEEL recognizes that other conditions are also met.

INVON—(INVerter ON enable) is a logic level signal from the microprocessor that permits the PEEL to enable the inverter, provided the PEEL recognizes that other conditions are also met.

LFAULT—(active Low, line-FAULT) is generated by the line fault detection circuitry; this signal indicates that line voltage has deviated outside an acceptable voltage envelope. The first letter, "L", indicates that the signal is active low (when the signal is low, a line fault has occurred).

20K—(20 Kilo Hertz) is generated by the 4040 ripple counter 442; this signal serves as the 50% duty cycle timing pulse for the static switch driver.

GP—(Guard Pulse) is generated by the microprocessor 66; this pulse surrounds the zero cross point of the reference wave form. It is used to determine when a static switch commutation pulse is necessary.

PWMFREQ—PEEL input signal generated from the 4040 ripple counter 442 and decoded with an eight input NAND logic gate before it enters the PEEL. It assumes a logic low for 408 nanoseconds at the 19.2 kHz invertor rate. Its function is to initiate the invertor cycle.

LPULSEND—PEEL input signal generated by the PWM comparator or the Conduction Limit Comparator. This signal assumes a low logic level when it signals the normal termination of a PWM pulse or a premature termination of a PWM pulse due the high side H-bridge MOSFETS conducting excessive current.

POL—(reference voltage POLarity) is generated by the microprocessor, this signal indicates which polarity the rectified reference voltage signal is representing at a particular moment in time.

Q1,Q2,Q3—state machine latch-memory outputs. The associated latches store state condition information which, along with instantaneous state information, determines the next state and the present outputs of the state machine.

System Off Mode

By examining combinations of the SSON and INVON signals present in the PEEL Boolean expressions given above, one can see that no combinations of !sson & !invon appear—since the combination does not appear, the outputs are off (i.e., false) by default—which means that no outputs will be enabled and the static switch and inverter subsystems are not active.

Because these two signals are also input to the decoding circuit portion of the state machine, the decoding circuit outputs will also be false by default, and the state machine will remain "idle" in its 000 microstate, the power-up/ready microstate, until after the microprocessor finishes its system checks and initiates a new mode.

The PEEL "state flow diagram" of FIG. 17 will help illustrate transitions to the three remaining system modes.

Each circle in the state diagram represents a unique microstate; each state has a name and a binary number representation. Each digit of the binary number representation is equivalent to the logic level of the D-type latch Q output pins. Note that one can determine the relationship between any of the Boolean expressions and the state diagram by noting the logic levels of the Qs in the Boolean expression. For example, <!Q1 & Q2 & Q3 indicates state 011. Any Boolean expression with this set of Qs either determines what the next state will be, or it determines what the current outputs will be while the state machine remains in the state being represented by the Qs.

Line Only Mode and Static Switch Operation

In the following discussion, logic input signals to the PEEL will appear in brackets, <*>, to separate them from conventional text (e.g., <sson>); PEEL output signals will appear in brackets and will be ccapitalized (e.g., <SSONOUT>).

Line Only Mode & Basic Static Switch Operation

"System Off" mode placed the state machine in State 000. Assume the user has now chosen Line-only mode. If after checking critical system conditions, the microprocessor decides all conditions are satisfactory, it will change <!sson & !invon> to <sson & !invon>; which will close the static switch. If the <SSONOUT> signal in the Boolean equations is examined, it is seen that the static switch will be enabled as soon as the 20 kHz signal changes to a high logic level. No microstate transition needs to occur since the machine is already in microstate 000. As long as this state is maintained by <sson & !invon>, the <SSONOUT> signal will toggle ON and OFF at the 20 kHz rate, which will prevent the static switch pulse transformers from saturating.

As much as a 25 microsecond delay in the static switch turn on may occur while waiting for the rising edge of the 20 Khz signal; however, this is not critical for this particular mode of transfer.

Complex Static Switch Operation

The Line-interactive mode requires static switch operation that is more complex; an immediate SCR turn-on pulse is necessary to help provide faultless transfers from invertor to line. Output logic for <SSONOUT>, shown in the first equation below, shows this immediate pulse; when a line fault is cleared, the state transition logic will first force the machine to state 000 where output logic can provide the immediate pulse:

| Output Logic: | |
|---|---|
| SSONOUT = | SSON & INVON & !Q3 & !Q2 & !Q1 & LFAULT # |
| | (immediate ON pulse for the duration of state 000) |
| | SSON & INVON & !Q3 & Q2 & !Q1 & 20K & LFAULT |
| | (subsequent. 20 kHz pulses in state 010) |

But since the static switch SCR gates are driven by pulse transformers, the PEEL <SSONOUT> signal cannot be allowed to remain high or the pulse transformers will saturate and the SCRs will commutate at the next line-current zero crossover point. Therefore, after the first, asynchronous static switch ON signal, synchronous pulses at the 20 kHz frequency will keep the pulse transformers from saturating. This is accomplished by making a transition to the next microstate, 010; as illustrated by the first two product terms that comprise Line-interactive state transition decoding for the second D-type flip flop. The second D flip-flop corresponds to bit position #2 in the binary state representation ($Q_3Q_2Q_1$):

| State transition decoding: | |
|---|---|
| Q2 = | SSON & INVON & !Q3 & !Q2 & !Q1 & LFAULT & 20K # |
| | (go from state 000 to state 010) |
| | SSON & INVON & !Q3 & Q2 & !Q1 (remain in state 010) |

The first term causes the latches to change to 010 if Line-interactive mode is active, while the second term holds the second bit of the 010 state at 1 as long as the utility line is well behaved and none of the other bits change due to a line fault. By perusing the state decoding it can be seen there are no other conditions which will make the Q3 and Q1 latch outputs change to logic high as long as <lfault> is high and the system mode is not deselected. Subsequently, while the machine is in state 010, the <SSONOUT> signal is seen to be true when the <20k> signal is high, and false when it is not. The <20k> signal represents a 19.2 kH, 50% duty cycle square wave which allows the transformers driving the SCR gates to reset:

| Output logic: | |
|---|---|
| SSONOUT = | SSON & INVON & !Q3 & !Q2 & !Q1 & LFAULT # |
| | (immediate ON pulse) |
| | SSON & INVON & !Q3 & Q2 & !Q1 * 20K & LFAULT |
| | (subsqnt. pulses) |

Note that the logic that drives the physical device is a function of the microstate, which determines the operating rules for the static switch subsystem.

Inverter Run Mode

The H-bridge inverter is illustrated in FIGS. 2B and 10. Each of the four switches 132–135 illustrated represents up to several paralleled Metal Oxide Silicon Field Effect Transistors (MOSFETS). The PEEL 90 output logic indirectly drives these solid state "switches" through power-up fail safe circuits including the NAND gates 366–369 and the resistors 381–384, and current-boosting MOSFET gate driver circuits 340–343.

Power is provided to the critical load by pulse width modulation of 19.2 kHz carrier with a 60 Hertz sine wave reference signal. The PEEL works in conjunction with analog circuitry to implement power delivery by suitable coordination of the bridge switches.

Referring to the state diagram of FIG. 17, note the six states positioned on the lower part of the diagram. Fundamentally, each of these states represent different aspects of the PWM modulation, which are enumerated below.

TIME CONSTANT RESET: states 000 and 001

State 000, when in Inverter Run or Line-interactive mode, serves as the initiation of the PWM and Conduction Limit Holdoff (CLH) TIME-CONSTANT RESET signals.

PWM/CLH Time-Constant-Reset

Figure 18:
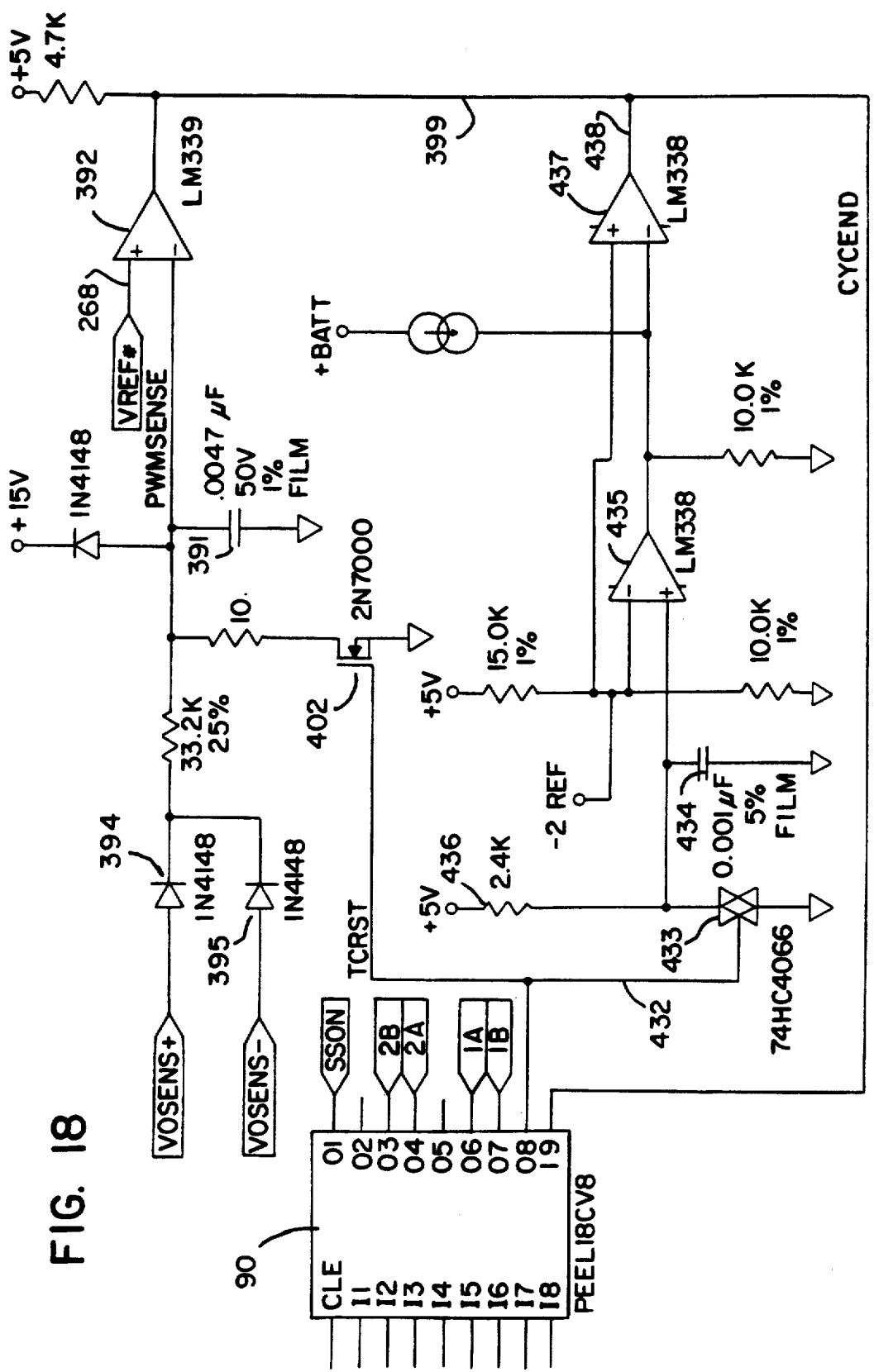
FIG. 18 is a schematic circuit diagram showing the PWM time reference reset circuit.

The 19.2 Khz inverter pulse is modulated by charging a simple RC circuit composed of a resistor 436 and a capacitor 434 and comparing the resulting voltage value in comparators 435 and 437 against a reference voltage, as illustrated in FIG. 18. When the RC voltage exceeds the reference, the pulse is terminated, and the high side bridge switch is deactivated until the beginning of the next cycle. At that time, the capacitor of the RC circuit must be quickly discharged to make the circuit ready for the next cycle.

The MOSFET 402 and the analog switch 451 are controlled by the <TCRST> output of the PEEL 90 at its pin 12. The signal from the pin 12 represents the negation of the Q3 D-type flip-flop output (tcrst=!q3). As can be seen from the state diagram, this occurs during both the 000 and 001 states. Since the fundamental state timing clock rate provided to the PEEL from the 4040 divide-by-n ripple counter 442 is 2.45 Mhz, and the state transition from 000 to 001 in this mode of operation is determined solely by the occurrence of the clock signal, the time constant reset period will be two clock cycles, that is 814 nanoseconds.

DEAD-TIME GENERATION: states 000,001,111,110

States 000 and 001 serve as the dead-time generation states at the beginning of each invertor cycle. In this PWM modulation scheme, the left-oriented high and low side bridge switches 132 and 134 will alternate conduction up and down for one half of a nominally 60 Hz cycle at the 19.2 Khz rate. Upon polarity change of the 60 Hz modulation reference, the right-oriented switches 133 and 135 will repeat the pattern for the negative half cycle. It must be guaranteed that the high side switches are completely turned off before the bottom side switches begin to conduct or a direct short will occur from the battery 47 to ground. An identical situation is true prior to high-side switch conduction.

The 814 nanoseconds of dead-time provided by states 000 and 001 can be thought of as the dead-time generation that occurs after bottom side switch conduction in either left-oriented or right-oriented switch pair operation. During this time, three of the four bridge elements are turned off while the fourth, which is always on the opposite side of the up/down conduction sequence, remains continuously on. The parameter that controls the opposite side, bottom switches in this mode of operation, is the <pol> (reference polarity) signal: if <pol>, then the bottom side switch 2B is held on; if <!pol>, then 1B is held on (see Boolean equations for 1B and 2B). Signals <pol> and <!pol> will alternate at a rate corresponding to the nominally 60 Hz cycle.

States 111 and 101 are the high-side switch, post-conduction dead-time counterpart of the 000 and 001 states.

PWM POWER PULSE: state 101

The transition from dead-time state, 001, to power-pulse state, 101, is dependent only on arrival of the next 2.457 megahertz clock pulse after state 001 had been entered. New state, 101, will remain active until either the PWM or Conduction Limit comparator(s) signal, <1pulsend>, is driven to a low state, or the <!pwmfreq> signal arrives. The <!PWMFREQ> signal indicates the end of the inverter cycle period, while logic low signals provided by the PWM and Conduction Limit comparators are logically ORed together to form the <1pulsend> signal.

Upon arrival of either of these signals, upper side switch conduction will be terminated and either (1) the first of the high-side, post conduction, dead-time states, 111, will be entered—which means termination was due to PWM or Conduction Limit, or (2) the beginning-of-cycle dead-time state, 000, will be entered—which means the inverter is in a condition of maximum pulse width modulation: therefore, the pulse and pulse width state, 101, is terminated by the beginning of the next inverter cycle, signaled by <!pwmfreq>.

Note that any time the next inverter cycle is initiated by the <!pwmfreq> signal a state transition is made from the current state—any one of 101, 111 or 100 —to the 000 state, at which time the PWM RC circuit is reset in preparation for the next power pulse, and the cycle repeats.

BOTTOM SWITCH ON: state 100

If the inverter is not in a condition of maximum PWM, state 100 will be entered after the second dead-time generation states, 111 and 110, have been traversed. States 111 and 110 provide 814 nanoseconds of dead-time between high-side switch conduction (1A or 2A) and the corresponding low side switch that is about to be turned on for the duration of the inverter cycle.

Upon entering state 100, the appropriate low side switoh will be enabled; the opposite low side switch is already ON, being controlled by <pol>/<!pol>, as previously discussed. State 100 will remain active, and both bottom side switches will remain on until <!pwmfreq> initiates the beginning of the next inverter cycle.

Note that the Inverter Run system mode could be terminated anywhere in the inverter cycle when a different system mode of operation is requested. If this occurs, the states will either continue through the normal inverter sequence if the mode chosen is the line interactive mode, or drop directly into state 000, which serves as either the static switch initial pulse state or the System Off state (according to <sson> and <invon>). For example, any of the six states that are legal states in the Inverter Run mode are also legal states in the Line-interactive mode. Therefore, if the mode changed to Line-interactive mode and a line fault exists, the inverter will simply continue on through its sequence. If no line fault exists, the PEEL will immediately drop into state 000, enable the static switch and continue line-interactive operation, discussed below.

Line Interactive Mode

The following focuses upon the critical transitions between static switch and inverter operation.

The inverter behaves much the same in Line-interactive mode as it does in Inverter Run mode, except that transitions between static switch enabling and inverter enabling are controlled by circuitry that analyzes the condition of the utility line. This information is passed on to the PEEL in a "go/no-go" signal called <1-fault>. The signal assumes a low state when the system's line condition detection circuitry determines line voltage has made an excursion outside of a permissible voltage envelope.

Line-interactive mode also includes two additional states, 010 and 011, which are line-interactive static switch ON state, named LISSON, and power-pulse/-static-switch-commutation state, named PWRPULS, respectively.

To understand the transitions between static switch enabling and inverter enabling, assume line condition is acceptable and the LISSON static switch 19.2 Khz pulse drive state is active. Then a line fault is detected near the peak of the line voltage, so the <!lfault> signal appears at the input to the PEEL. The condition causes the state machine to drop into state 011 —it cannot move from that state until <!pwmfreq> occurs, which signals the end of the inverter period. During this state the appropriate bridge switches are turned on, subject to control by the <pol>/<!pol> signal, and they will remain on until the state is terminated due to the occurrence of <!pwmfreq>. The <pol>/<!pol> signal ensures that energy is being provided to the load. PWM modulation will have no control over the duration of the power pulse while in state 011: its duration is dependent solely upon when the line fault condition occurred asynchronously relative to the synchronous <!pwmfreq> signal. The difference in time between the occurrence of these two signals will be the duration of the power pulse. This process aids in providing smooth transition of energy from line to inverter.

Upon arrival of <!pwmfreq> the 011 power pulse state will be vacated in favor of state 000. At this time the inverter operation will continue as described under Inverter Run mode, and re-synchronization from the initial power pulse to a nominally 60 Hz modulation sequence is achieved. In the short term, the inverter will continue to run in the Line-interactive mode until the line fault is cleared, as is signaled by <1fault> securing a logic high state.

However, if the line fault is of significant duration—for many 60 Hz cycles—the microprocessor automatically changes the system mode of operation from Line-interactive mode to Inverter Run mode until the microprocessor can determine, through the system's monitoring circuitry, that line returns to a value within an acceptable rms voltage envelope. The rms voltage envelope is an evaluation over many cycles—different from the instantaneous voltage level envelope utilized for static switch to inverter transitions while in Line-interactive mode, where the evaluations occur virtually instant by instant.

This completes the description of the four modes of operation—system off, inverter run, line only and line interactive—and how the PEEL 90 coordinates the inverter and static switch subsystems.

To help clarify the correlation between system mode of operation, microstates, system condition and device enabling, the Boolean equations are again presented in FIG. 19 but with groups of factors partitioned to illustrate how system modes, microstates and specific device actions are implemented in the expressions.

Auto-Load Sensing

Auto-load sensing is a convenience feature that allows the user to have one on/off switch of a load which is connected to the UPS 30 to automatically switch on and off three other loads connected to the user's UPS. With this feature, loads whose on/off switches are inaccessible, such as a computer under a desk, can be controlled remotely. For this to work, the three "slave" loads are left permanently on and the "master" load, such as the video display terminal directly in front of the user, becomes the master on/off switch for all UPS loads.

Figure 20:
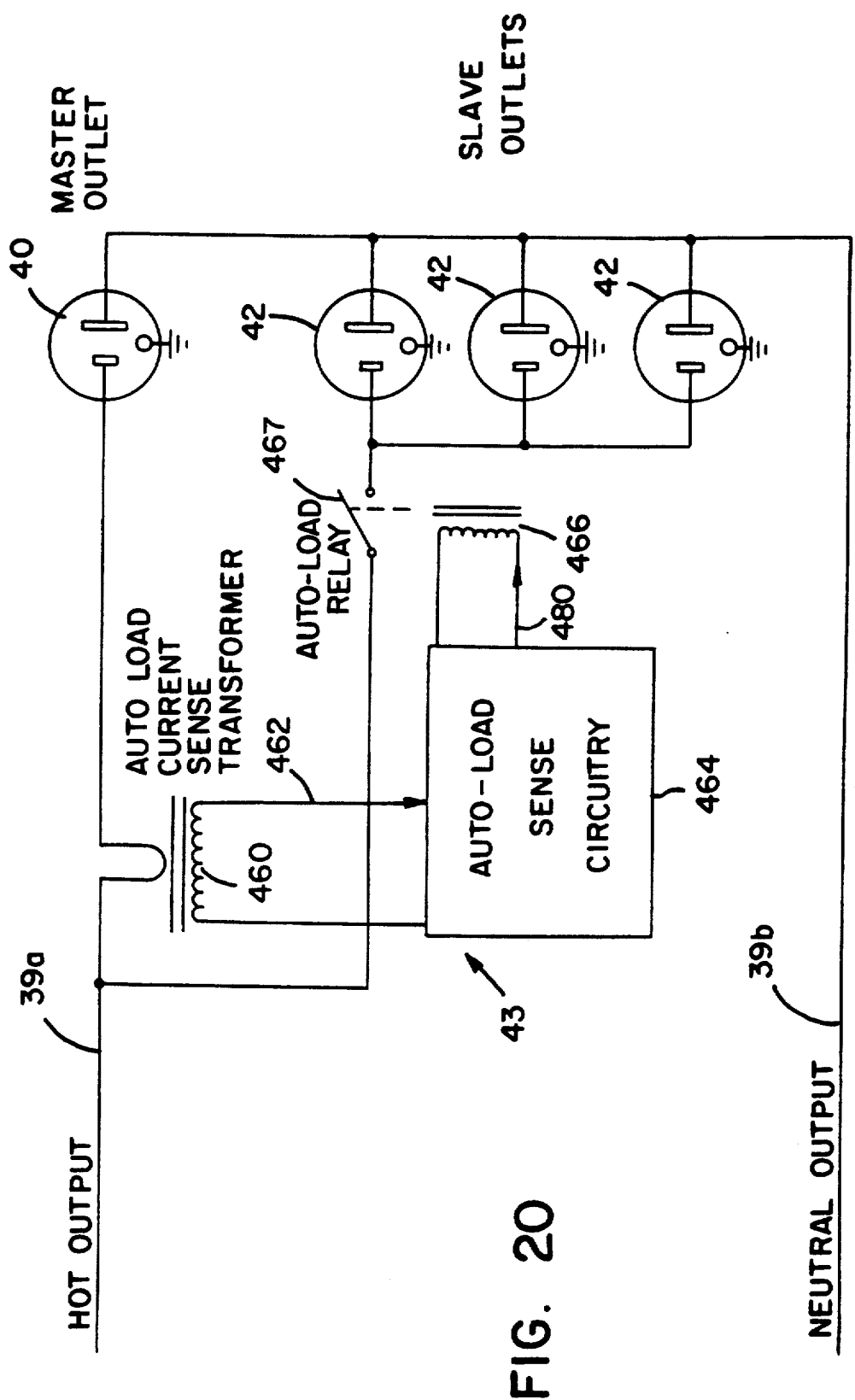
FIG. 20 is a schematic circuit diagram of the autoload sensing circuit which may be utilized in the back-up power system of the present invention.

Referring to FIG. 20, when the load connected to the master outlet 40 is switched on, an auto-load current transformer 460 senses the load current and sends a signal on a line 462 to the auto-load senses circuitry 464. The auto-load sense circuitry 464 detects the presence of this signal and activates the auto-load relay 466 which closes a relay contact 467 to apply power to the slave outlets. In a likewise manner, in the absence of a signal from the auto-load current sense transformer 460, the auto-load sense circuitry 464 turns off the auto-load relay 466, removing power from the slave outlets.

Figure 21:
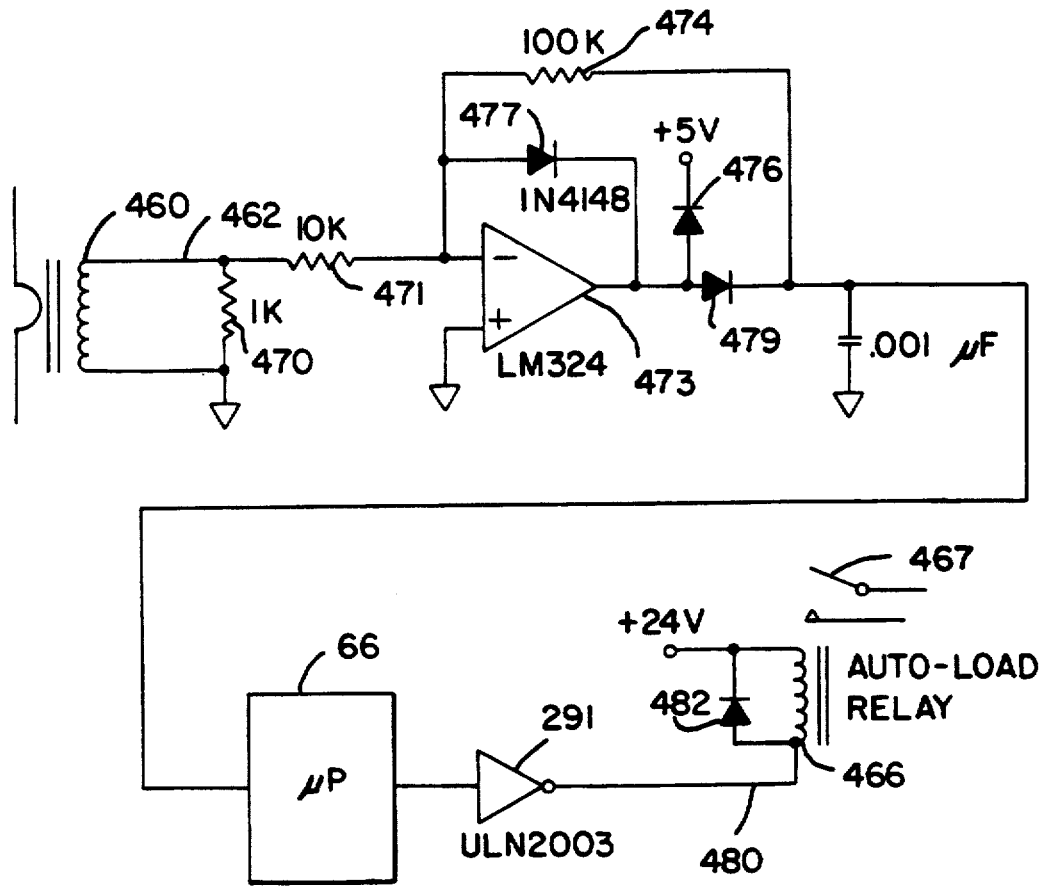
FIG. 21 is a schematic circuit diagram showing the autoload sense circuitry which controls the autoload circuit of FIG. 20.

The auto-load sense circuitry 464 is shown in FIG. 21. The signal sensed from the auto-load curren sense transformer 460 develops a voltage across a resistor 470 when the load on the master outlet 40 is switched on. This voltage is applied through a resistor 471 to the inverting input of an amplifier 473 having a feedback resistor 474 selected to set the gain of the amplifier circuit. Negative half-cycles are amplified by the amplifier 473 and sent to the microprocessor 66. Should the amplified signal become greater than 5 volts, a diode 476 will turn on and clamp the output so as to not overload the microprocessor input.

Positive half cycles of the sensed signals are clamped negative by a diode 477 instead of being amplified. The negative clamped signal is blocked from the microprocessor by a diode 479.

The half-wave rectified signals amplified by the amplifier 473 are averaged in the microprocessor 66. Should the averaged result be above a software setable threshold the microprocessor will output a signal which feeds the driver. The present invention allows the average current level through the master outlet which triggers turn on of the slave outlets to be selected in the software of the microprocessor. For example, the main consuming device may draw a low current in a "sleep" mode, and a higher current when active which can trigger turn-on of the auto-load relay and supply power to the slave outlets. The driver 291 provides a power signal on a line 480 which in turn will turn on the auto-load relay 466. The diode 482 clamps the flyback current from the relay coil when it is turned off.

Battery Charger Operation

By using the main transformer 44 and the "H" bridge from the inverter 46, the UPS of the present invention provides a simple, yet very complete and efficient scheme of charging its batteries.

The battery charger, herein described, uses a constant voltage method with a temperature-compensated setpoint to charge the batteries in a relatively short period of time. It is also protected against input overvoltage, and limits the maximum current supplied.

Figure 22A:
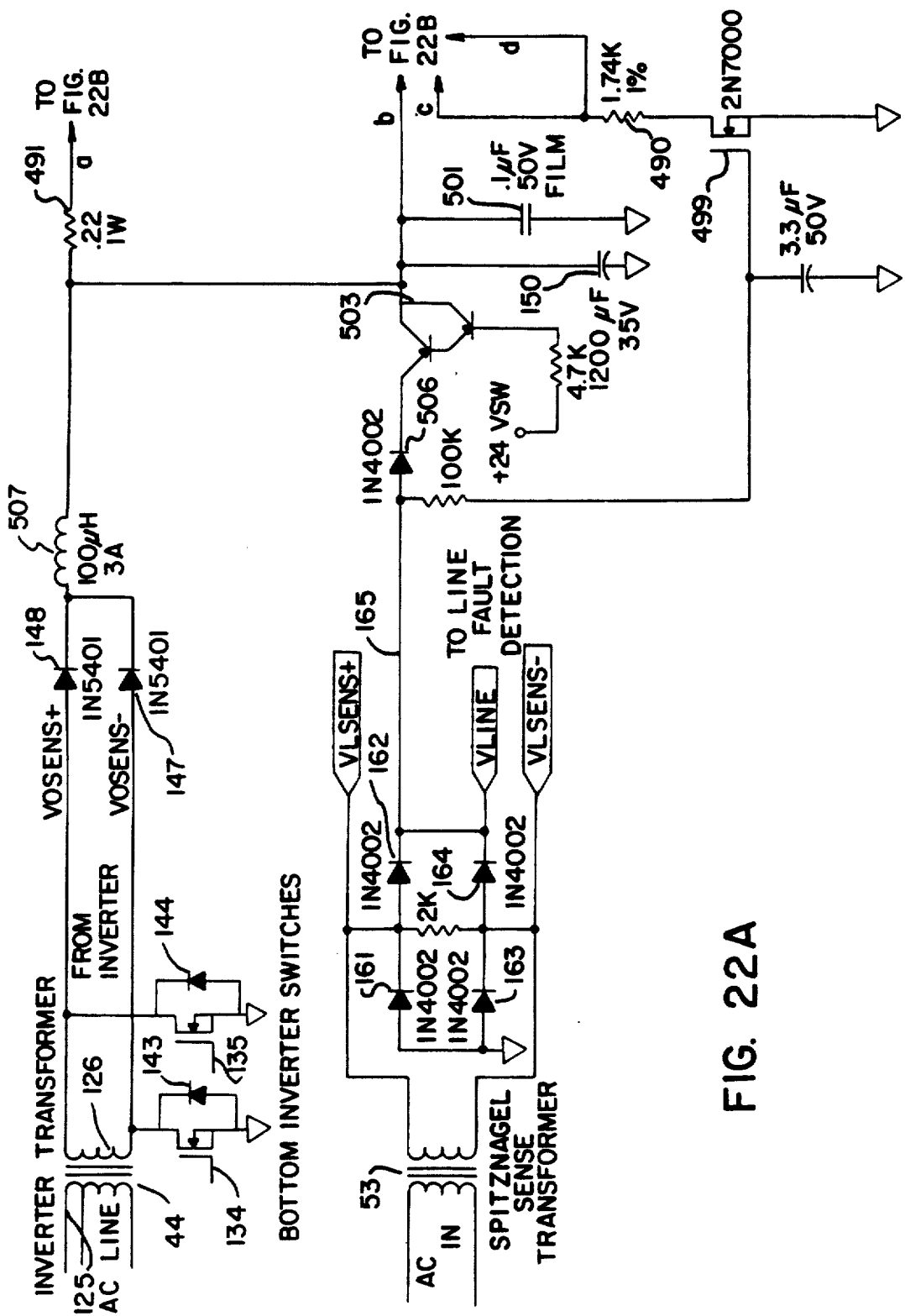
FIG. 22, composed of FIGS. 22A and 22B, is a schematic circuit diagram of a main battery charger circuit which may be utilized in the back-up power system of the present invention.
Figure 22B:
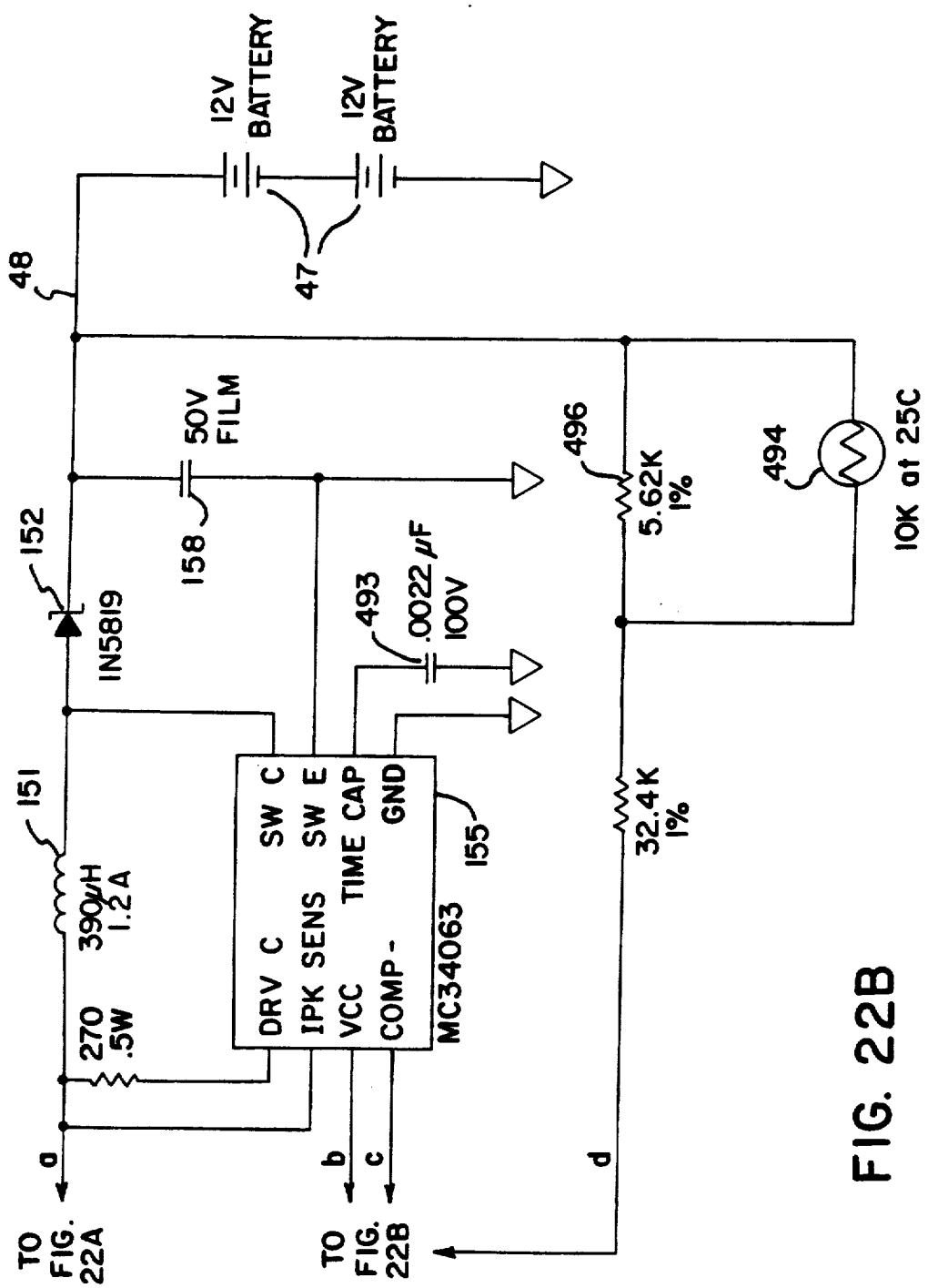

FIGS. 22A-22B show a schematic of the charger circuit. The main transformer 44 steps down the 120 VRMS from the AC line to 12 VRMS. This voltage is rectified by using the intrinsic diodes 143 and 144 of the bottom side switches (1B, 2B) of the "H" bridge and the two additional rectifiers 147 and 148. Furthermore, the intrinsic diodes 141 and 142 of the upper side switches (1A, 2A) will clamp to the battery voltage for any sudden line voltage increase, providing overvoltage protection for the battery charger.

Because the average rectified voltage of the capacitor 150 is about 16 V, a voltage converter is needed to provide the required voltage (26.9 v@31° C.) to charge the batteries 47 with the constant voltage method. A high frequency switchmode booster converter is used to achieve high efficiency.

An integrated circuit 155 (e.g., an MC34063AP from MOTOROLA) is the main controller of the charger. It has NPN transistor (illustrated at 156 in FIG. 2B) capable of switching up to 1.5 A, a 2% reference voltage for output voltage regulation, timing circuitry, and a current sense circuit to limit the maximum switch current.

A sample of the output voltage is supplied to the controller via a resistor 490. If the sample voltage is less than 1.25 V the internal switch 156 is closed, consequently, the current in the inductor 151 increases linearly until the voltage drop across the limiting resistor 491 reaches 0.33 V, that is, a maximum current of 1.5 A.

When the internal switch is open, the stored energy in the inductor is delivered to the battery through the schottky diode 157. The time that the switch remains open is controlled by a capacitor 493. The operating frequency of the switch is preferably about 50 KHz.

This operation will continue as long as the sample voltage is less than 1.25 V. Note that a +5 V signal from the microprocessor disables the charger.

Temperature compensation of −3 mV/cell/C is possible by adding a NTC thermistor 494 in the voltage feedback network. A resistor 496 is used to linearize the overall temperature characteristic in the range of OC to 50 C. degrees.

An FET 499 will open the voltage feedback network when there is no AC line present, cutting a useless battery discharge path. Capacitors 501 and 150 filter out the high frequency for a better EMI performance.

When the UPS is off but the AC line is present, the batteries still can be charged by drawing power from the voltage sense transformer 53. When the UPS is off the +24 VSW power supply is not available, therefore, the open line relay disconnects the main transformer 44, and the forward biased darlington transistor 503 allows the charger to draw power out of the voltage sense transformer 53 through a full bridge of diodes 161-164 and a blocking diode 506. When the UPS is on, the darlington transistor 503 is reverse biased, thereby preventing loading of the signal from the voltage sense transformer.

When a line fault is detected, the inverter is turned on immediately. This produces a step voltage in the "H" bridge from the transformed AC line voltage to the battery voltage. A sudden voltage change like this would produce very high inrush current flowing through the upper side switches, rectifiers 147 and 148, and the capacitor 150. This inrush current would trigger the current limiting circuit of the inverter, degrading the UPS transfer response from line to inverter. To prevent this condition an inductor 507 is included in series with rectifiers 147 and 148.

In summary, the battery charging system of the present invention has several advantageous features:

By using the main transformer and "H" bridge from the inverter and the monitor transformer from the input voltage sense circuit, this system will charge the battery as long as AC line is present.

Because of the high efficiency of the boost converter, the system does not generate heat, and therefore no cooling or heatsinking is required.

The temperature compensation of the charger extends the expected life of the batteries.

Despite its simplicity, the charger system has intrinsic input overvoltage protection, and limits the maximum supplied current.

The current capacity of the charger system can be easily doubled by using an upgraded version of the controller (e.g., an MC34163).

It is understood that the invention is not confined to the particular embodiments set forth herein as illustrative, but embraces all such modified forms thereof as come within the scope of the following claims.

What is claimed is:

1. AC line fault detection apparatus comprising:
   (a) means for sampling an AC power line input voltage at periodic times and providing digital output data corresponding to the sampled input voltage;
   (b) means receiving the digital data corresponding to the sampled AC power line voltage and for producing a reference waveform at selected sample times during the period of the AC line voltage, wherein each reference value at each sample time comprises a selectively weighted average of sample values of the cycle of the AC waveform presently being sampled and prior cycles of the AC power voltage signal;
   (c) means for providing digital data corresponding to the reference waveform data synchronized in frequency and phase to the AC power voltage signal;
   (d) digital to analog conversion means receiving the digital reference waveform data for providing an analog reference waveform signal corresponding thereto;
   (e) means for providing a selected relative scaling of the magnitudes of the AC power line voltage and the analog reference waveform signal to provide a selected magnitude tolerance band between the reference signal and the AC power line voltage;
   (f) a comparator receiving the scaled AC power line voltage and the analog reference waveform signal at its inputs and providing an output signal indicating a line fault if the difference in magnitude between the two input signals is greater than the selected tolerance band.

2. The apparatus of claim 1 including means for providing a guard pulse signal to one of the inputs to the comparator for a selected period of time around the anticipated zero crossings of the reference voltage and the AC input voltage to prevent the comparator from changing its output state at times adjacent to such zero crossings.

3. The apparatus of claim 1 wherein the AC power line input voltage is rectified to provide only unidirectional voltage to the comparator and the reference voltage waveform is provided to the comparator as a unidirectional voltage.

4. The apparatus of claim 1 wherein the means for providing a selected scaling provides a biasing voltage to one input of the comparator to provide a selected voltage tolerance band between the AC input signal and the reference signal.

5. The apparatus of claim 4 wherein the comparator further includes a feedback path from the output of the comparator to one of the inputs of the comparator through a resistance to increase the allowable tolerance band between the AC input signal and the reference signal during normal operation where no line fault has occurred, and to decrease the tolerance band during occurrence of a line fault wherein the AC line voltage compared to the reference voltage was outside of the tolerance band, whereby the line fault output signal from the comparator will be cleared only if the AC input signal returns to a level which is within the narrower tolerance band about the reference waveform signal.

6. An uninterruptible power system connectible to AC power system lines at its input terminals and to a load at its output terminals, comprising:

(a) an auxiliary power supply battery;

(b) a power supply path from the input terminals to the output terminals to normally supply power from an AC power system connected to the input terminals to a load connected to the output terminals;

(c) means responsive to control signals for interrupting the supply of power through the power supply path from the AC power system lines to the load and for selectively providing AC power from the battery to the power supply path and thence to the load;

(d) control means for providing control signals, upon occurrence of a line fault on the AC power system lines, to the means responsive to control signals to cause the supply of power to the load to be transferred from the AC power system to the battery, the control means including:

(i) means for sampling the voltage on the AC power lines at the input terminals at periodic times and providing digital output data corresponding to the sampled input signal;

(ii) means receiving the digital data corresponding to the sampled AC power line signal and for producing a reference waveform at selected sample times during the period of the AC line signal, wherein each reference value at each sample time comprises a selectively weighted average of sample values of the cycle of the AC waveform presently being sampled and prior cycles of the AC power line voltage;

(iii) means for providing digital data corresponding to the reference waveform data synchronized in frequency and phase to the AC power line voltage;

(iv) a digital to analog conversion means receiving the digital reference waveform data for providing an analog reference waveform signal corresponding thereto;

(v) means for providing a selected relative scaling of the magnitudes of the AC power line voltage and the analog reference waveform signal to provide a selected magnitude tolerance band between the reference signal and the AC power line signal;

(vi) a comparator receiving the scaled AC input signal and the reference waveform signal and providing an output signal indicating a line fault if the difference in its inputs is greater than the selected tolerance input band.

7. The uninterruptible power system of claim 6, including means for providing a guard pulse signal to one of the inputs of the comparator for a selected period of time around the anticipated zero crossings of the reference voltage and the AC line voltage to prevent the comparator from changing its input state at times adjacent to such zero crossings.

8. The uninterruptible power system of claim 6, wherein the AC power line voltage is rectified to provide only unidirectional voltage to the comparator and the reference voltage waveform is provided to the comparator as a unidirectional voltage.

9. The uninterruptible power system of claim 6, wherein the means for providing a selected scaling provides a biasing voltage to one input of the comparator to provide a selected voltage tolerance band between the AC power line voltage and the reference signal.

10. The uninterruptible power system of claim 9, wherein the comparator further includes a feedback path from the output of the comparator to one of the inputs of the comparator through a resistance to increase the allowable tolerance band between the AC power line voltage and the reference signal during normal operation where no line fault has occurred, and to decrease the tolerance band during occurrence of a line fault wherein the AC line voltage compared to the reference voltage was outside of the tolerance band whereby the line fault output signal from the comparator will be cleared only if the AC line voltage returns to a level which is within the narrower tolerance band about the reference waveform signal.

11. The uninterruptible power system of claim 6, wherein the means responsive to control signals includes an inverter comprising gate controlled switching devices connected in an H-bridge configuration to receive DC power across one side of the bridge from the battery and to provide AC power across the other side of the bridge to the power supply path and including filter means in the power supply path between the inverter and the output terminal for low pass filtering and the output voltage from the inverter and wherein the control means controls the switching devices of the inverter in a pulse-width modulated manner to provide a substantially sinusoidal output voltage waveform at the output terminals with the width of the pulses provided from the inverter selected to provide a desired output waveform, the waveform selected to match the waveform of the AC line power at the time of line power fault detection so that a substantially continuous output voltage waveform is provided at the output terminals during switch-over from AC line power to power from the inverter.

12. The uninterruptible power system of claim 11 wherein the means responsive to control signals includes a transformer having its secondary connected in the power supply path and its primary connected to the inverter bridge to receive AC power from the inverter bridge.

13. The uninterruptible power system of claim 11 further including means for sensing the output current supplied from the output terminals to the load, and wherein the desired output waveform provided by the control means is the reference waveform compensated by the measured current being drawn by the load.

14. The uninterruptible power system of claim 13 wherein the desired waveform VREF* is determined in accordance with the following expressions:

$$VREF^* = VREF + R(IO+) - R(IO-)$$

when the reference voltage corresponds to the positive halfcycle, and $$VREF^* = VREF - R(IO+) + R(IO-)$$

when the reference voltage corresponds to the negative half cycle and wherein IO+ is the sensed output current in a positive direction, IO− is the sensed output current in a negative direction, and R is a resistive scaling factor.

15. The uninterruptible power system of claim 11 wherein the inverter H-bridge has four arms with switching devices in upper and lower arms of the bridge and with the DC input to the bridge being provided across the upper and lower arms, and with the output of the bridge being taken between the junctions between the switching devices in the upper and lower arms on each side of the bridge, and wherein each of the gate controlled switching devices comprises a plurality of FETs with the number of FETs in the switching devices in each arm of the upper arms of the bridge being less than the number of FETs in the switching devices in each of the lower arms of the bridge, and wherein the control means controls the switching of the FETs such that between pulses of output power provided from the inverter to the power supply path, the control means turns off the FETs in the upper arms of the bridge and turns on FETs in the lower arms of the bridge so as to allow current flowing to the load to freewheel through the switching devices in the lower arms of the bridge, whereby the overall duty cycle for individual FETs in the upper and lower arms of the bridge over a full cycle of the inverter tends to be equalized.

16. The uninterruptible power system of claim 15 including means for comparing the voltage across the switching devices in the upper arms of the H-bridge inverter to a reference voltage indicative of a maximum current flow through the switching devices and therefore a maximum voltage drop across the switching devices, and providing an output signal if the voltage across the switching devices exceeds the reference, the control means terminating the pulse of the pulse width modulation by turning off the switching devices when the current limit signal occurs.

17. An uninterruptible power system connectible to AC power system lines at input terminals and to a load at its output terminals comprising:
 (a) an auxiliary power supply battery;
 (b) a power supply path from the input terminals to the output terminals to normally supply power from AC power system lines connected to the input terminals to a load connected to the output terminals;
 (c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;
 (d) means connected to receive DC power from the auxiliary battery, and for selectively providing AC power to the power supply path between the static switch means and the load, including an inverter comprising gate controlled switching devices connected in an H-bridge configuration to receive DC power across one side of the bridge from the auxiliary battery and provide AC power across the other side of the bridge to the power supply path;
 (e) control means, connected to provide control signals to the SCRs of the static switch means and to the gates of the gate controlled switching devices of the inverter, and including means for sensing the voltage at the input terminals to determine when a power line fault occurs, and upon occurrence of a fault for providing control signals to the gate drivers of the SCRs to inhibit trigering the the SCRs and providing control signals to the gates of the switching devices of the inverter bridge to provide a pulse of voltage to the power supply path to reverse bias an SCR of the static switch that may be conducting at that time, and thereafter providing control signals to the gates of the switching devices of the inverter bridge in a pulse-width-modulated fashion to generate an AC output waveform at the output terminals of the power supply system; and
 (f) a relay having mechanical relay contacts connected in the power supply path between the input terminals and the static switch means wherein the relay contacts are opened or closed in response to a control signal provided to the relay, and wherein the control means provides a control signal to the relay to open the relay contacts when a line fault is detected after the control means has controlled the static switch means to turn off the SCRs in the static switch means, and wherein the control means provides control signals to the relay to close the mechanical contacts of the relay before the control means provides control signals to the SCRs of the static switch means to turn them on to resupply power from the AC power system lines to the load after there is no longer a line fault on the AC power system.

18. The uninterruptible power system of claim 17 wherein the control means controls the switching devices of the inverter in a pulse-width modulated manner to provide voltage at the output terminals with the width of the pulses provided from the inverter selected to provide a desired output waveform selected to match the waveform of the AC input power at the time a line power fault is detected, so that a substantially continuous voltage output waveform is provided at the output terminals during switch-over from AC line power to power from the inverter, and wherein if the line fault is detected during a selected period of time around the zero crossing of the AC input waveform, the control means provides a control signal to the inverter to reverse the polarity of the normal power pulse that would be provided by the inverter to force commutate off the SCR in the static switch which is conducting.

19. An uninterruptible power system connectible to AC power system lines at input terminals and to a load at its output terminals comprising:
 (a) an auxiliary power supply battery;
 (b) a power supply path from the input terminals to the output terminals to normally supply power from AC power system lines connected to the input terminals to a load connected to the output terminals;
 (c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;
 (d) means connected to receive DC power from the auxiliary battery, and for selectively providing AC power to the power supply path between the static switch means and the load, including an inverter comprising gate controlled switching devices connected in an H-bridge configuration to receive DC power across one side of the bridge from the auxiliary battery and provide AC power across the other side of the bridge to the power supply path;
 (e) control means, connected to provide control signals to the SCRs of the static switch means and to the gates of the gate controlled switching devices of the inverter, and including means for sensing the voltage at the input terminals to determine when a power line fault occurs, and upon occurrence of a fault for providing control signals to the gate drivers of the SCRs to inhibit triggering of the SCRs and providing control signals to the gates of the switching devices of the inverter bridge to provide a pulse of voltage to the power supply path to reverse bias an SCR of the static switch that may be conducting at that time, and thereafter providing control signals to the gates of the switching devices of the inverter bridge in a pulse-width-modulated fashion to generate an AC output waveform at the output terminals of the power supply system, wherein the control means further comprises:

(i) means for sampling the AC power line signal at the input terminals at periodic times and providing digital output data corresponding to the sampled input signal;

(ii) means receiving the digital data corresponding to the sampled AC power line signal and for producing a reference waveform at selected sample times during the period of the AC line voltage wherein each reference value at each sample time comprises a selectively weighted average of the sample value of the cycle of the AC waveform presently being sampled and prior cycles of the AC power line voltage;

(iii) means for providing digital data corresponding to the reference waveform data synchronized in frequency and phase to the AC power line voltage;

(iv) digital to analog conversion means receiving the digital reference waveform data for providing an analog reference waveform signal corresponding thereto;

(v) means for providing a selected relative scaling to the magnitudes of the AC power line voltage and the analog reference waveform signal to provide a selected magnitude tolerance band between the reference signal and the AC power line voltage;

(vi) a comparator receiving the scaled AC ower line voltage and the reference waveform signal and providing an output signal indicating a line fault if the difference in magnitude between the two signals is greater than the selected tolerance band.

20. The uninterruptible power system of claim 19 including means for providing a guard pulse signal to one of the inputs to the comparator for a selected period of time around the anticipated zero crossings of the reference voltage and the AC power line voltage to prevent the comparator from changing its state at times adjacent to such zero crossings.

21. The uninterruptible power system of claim 19 wherein the AC power line voltage is rectified to provide only unidirectional voltage to the comparator and the reference voltage waveform is provided to the comparator as a unidirectional voltage.

22. The uninterruptible power system of claim 19 wherein the means for providing a selected scaling provides a biasing voltage to one input of the comparator to provide a selected voltage tolerance band between the AC power line voltage and the reference signal.

23. The uninterruptible power system of claim 22 wherein the comparator further includes a feedback path from the output of the comparator through a resistance to increase the allowable tolerance band between the AC power line voltage and the reference signal during normal operation where no line fault has occurred, and to decrease the tolerance band during occurrence of a line fault wherein the AC line voltage compared to the reference voltage was outside of the tolerance band whereby the line fault output signal from the comparator will be cleared only if the AC line voltage returns to a level which is within the narrower tolerance band about the reference waveform signal.

24. An uninterruptible power system connectible to AC power system lines at input terminals and to a load at its output terminals comprising:

(a) an auxiliary power supply battery;

(b) a power supply path from the input terminals to the output terminals to normally supply power from AC power system lines connected to the input terminals to a load connected to the output terminals;

(c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;

(d) means connected to receive DC power from the auxiliary battery, and for selectively providing AC power to the power supply path between the static switch means and the load, including an inverter comprising gate controlled switching devices connected in an H-bridge configuration to receive DC power across one side of the bridge from the auxiliary battery and provide AC power across the other side of the bridge to the power supply path, wherein the means connected to receive power from the auxiliary battery includes a transformer having its secondary connected in the power supply path between the static switch means and the output terminals and its primary connected to the inverter bridge to receive AC power from the inverter bridge;

(e) control means, connected to provide control signals to the SCRs of the static switch means and to the gates of the gate controlled switching devices of the inverter, and including means for sensing the voltage at the input terminals to determine when a power line fault occurs, and upon occurrence of a fault for providing control signals to the gate drivers of the SCRs to inhibit triggering of the SCRs and providing control signals to the gates of the switching devices of the inverter bridge to provide a pulse of voltage to the power supply path to reverse bias an SCR of the static switch that may be conducting at that time, and thereafter providing control signals to the gates of the switching devices of the inverter bridge in a pulse-width-modulated fashion to generate an AC output waveform at the output terminals of the power supply system.

25. An uninterruptible power system connectible to AC power system lines at input terminals and to a load at its output terminals comprising:

(a) an auxiliary power supply battery;

(b) a power supply path from the input terminals to the output terminals to normally supply power from AC power system lines connected to the input terminals to a load connected to the output terminals;

(c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;

(d) means connected to receive DC power from the auxiliary battery, and for selectively providing AC power to the power supply path between the static switch means and the load, including an inverter comprising gate controlled switching devices connected in an H-bridge configuration to receive DC power across one side of the bridge from the auxiliary battery and provide AC power across the other side of the bridge to the power supply path;

(e) control means, connected to provide control signals to the SCRs of the static switch means and to the gates of the gate controlled switching devices of the inverter, and including means for sensing the voltage at the input terminals to determine when a power line fault occurs, and upon occurrence of a fault for providing control signals to the gate drivers of the SCRs to inhibit triggering of the SCRs and providing control signals to the gates of the switching devices of the inverter bridge to provide a pulse of voltage to the power supply path to reverse bias an SCR of the statis switch that may be conducting at that time, and thereafter providing control signals to the gates of the switching devices of the inverter bridge in a pulse-width-modulated fashion to generate an AC output waveform at the output terminals of the power supply system, wherein the control means controls the switching devices of the inverter in a pulse-width modulated manner to provide voltage at the output terminals with the width of the pulses provided from the inverter selected to provide a desired output waveform selected to match the waveform of the AC input power at the time a line power fault is detected, so that a substantially continuous voltage output waveform is provided at the output terminals during switch-over from AC line power to power from the inverter, wherein if the line fault is detected during a selected period of time around the zero crossing of the AC input waveform, the control means provides a control signal to the inverter to reverse the polarity of the normal power pulse that would be provided by the inverter to force commutate off the SCR in the static switch which is conducting, and wherein the control means includes means for sampling the AC power line voltage at the input terminals at periodic times and providing digital data corresponding to the sampled input, means receiving the digital data corresponding to the sampled power line signal and for producing a reference waveform at selected sample times during the period of the AC line voltage wherein each reference value at each sample time comprises a selectively weighted average of sample values of the cycle of the AC waveform presently being sampled and prior cycles of the AC power line voltage, means for providing digital data corresponding to the reference waveform data synchronized in frequency and phase to the AC power line voltage, and a digital to analog conversion means receiving the digital reference waveform data for providing an analog reference waveform signal corresponding thereto, and wherein upon detection of a power line faul the switching devices of the inverter are controlled in a pulse-width-modulated manner to provide an AC output waveform from the inverter which tracks a desired waveform comprising the reference waveform signal, and thereafter, the means receiving the digital data calculates reference waveform values at each sample time as a selectively weighted average of a pure sinusoidal waveform stored in a memory and the prior reference waveform and recalculates the reference waveform in this manner for each cycle of the output waveform from the inverter.

26. The uninterruptible power system of claim 25 further including means for sensing the output current supplied from the output terminals to the load, and wherein the desired output waveform provided by the control means is the reference waveform compensated by the measured current being drawn by the load.

27. The uninterruptible power system of claim 26 wherein the desired waveform VREF* is determined in accordance with the following expressions:

$$VREF^* = VREF + R(IO+) - R(IO-)$$

when the reference voltage is in the positive half-cycle, and $$VREF^* = VREF - R(IO+) + R(IO-)$$

when the reference voltage is in the negative half-cycle and wherein IO+ is the sensed output current in a positive direction, IO− is the sensed output current in a negative direction, and R is a resistive scaling factor.

28. An uninterruptible power system connectible to AC power system lines at input terminals and to a load at its output terminals comprising:

(a) an auxiliary power supply battery;

(b) a power supply path from the input terminals to the output terminals to normally supply power from AC power system lines connected to the input terminals to a load connected to the output terminals;

(c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;

(d) means connected to receive DC power from the auxiliary battery, and for selectively providing AC power to the power supply path between the static switch means and the load, including an inverter comprising gate controlled switching devices connected in an H-bridge configuration to receive DC power across one side of the bridge from the auxiliary battery and provide AC power across the other side of the bridge to the power supply path;

(e) control means, connected to provide control signals to the SCRs of the static switch means and to the gates of the gate controlled switching devices of the inverter, and including means for sensing the voltage at the input terminals to determine when a power line fault occurs, and upon occurrence of a fault for providing control signals to the gate drivers of the SCRs to inhibit triggering of the SCRs and providing control signals to the gates of the switching devices of the inverter bridge to provide a pulse of voltage to the power supply path to reverse bias an SCR of the static switch that may be conducting at that time, and thereafter providing control signals to the gates of the switching devices of the inverter bridge in a pulse-width-modulated fashion to generate an AC output waveform at the output terminals of the power supply system, wherein the control means controls the switching devices of the inverter in a pulse-width modulated manner to provide voltage at the output terminals with the width of the pulses provided from the inverter selected to provide a desired output waveform selected to match the waveform of the AC input power at the time a line power fault is detected, so that a substantially continuous voltage output waveform is provided at the output terminals during switch-over from AC line power to power from the inverter, and wherein if the line fault is detected during a selected period of time around the zero crossing of the AC input waveform, the control means provides a control signal to the inverter to reverse the polarity of the normal power pulse that would be provided by the inverter to force commutate off the SCR in the static switch which is conducting, and wherein the inverter H-bridge has four arms with switching devices in upper and lower arms of the bridge, and with the DC input to the bridge from the battery being provided across the upper and lower arms, and with the output of the bridge being taken between the junctions between the switching devices in the upper and lower arms on each side of the bridge, and wherein at least the lower arms of the bridge include parallel connected plural gate controlled switching devices with the number of switching devices in each arm of the upper arms of the bridge being less than the number of switching devices in each of the lower arms of the bridge, and wherein the control means controls the switching of the switching devices such that between pulses of output power provided from the inverter to the power supply path, the control means turns off the switching devices in the upper arms of the bridge and turns on the switching devices in the lower arms of the bridge to allow current flowing from the inverter to the load to freewheel through the switching devices in the lower arms of the bridge, whereby the overall duty cycle for individual switching devices in the upper and lower arms of the bridge over a full cycle of the inverter tends to be equalized.

29. The uninterruptible power system of claim 28 wherein the switching devices in the H-bridge inverter comprise power FETs.

30. An uninterruptible power system connectable to AC power system lines at its input terminals and to a load at its output terminals comprising:

(a) an auxiliary power supply battery;

(b) a power supply path from the input terminals to the output terminals to normally supply power from AC power system lines connected to the input terminals to a load connected to the output terminals;

(c) switch means connected in the power supply path and responding to control signals for interrupting the supply of power through the power supply path from the AC power system lines to the load;

(d) a main transformer having a primary winding and a secondary winding, the secondary winding connected at its terminals to the power supply path between the switch means and the output terminals so that power can be provided from the secondary of the transformer to the load when the switch means has interrupted the supply of power from the AC powersystem lines to the load;

(e) an inverter connected to receive DC power from the battery and connected to selectively provide AC power to the primary of the transformer when backup power is to be supplied to the load and the switch means interrupts the connection between the input terminals and the output terminals;

(f) rectifying means for rectifying the voltage appearing at the primary of the transformer as a result of the AC voltage across the secondary of the transformer when AC power is supplied through the power supply path from the input terminals to the output terminals and the inverter is not providing AC power to the primary, the rectifying means providing unidirectional voltage at a level nominally below the voltage level of the battery when fully charged;

(g) boost converter means, connected to receive the rectified voltage from the rectifying means, for providing charging current to the battery, the boost converter means including an inductor connected in a conduction path between the rectifying means and the battery and a controllable switch connected between the inductor and a battery common return line and including means for sensing the voltage across the battery and the current flowing through the inductor, the boost converter means determining when the voltage across the battery drops below a selected level and then closing the switch to draw current through the inductor and switch until the current in the inductor reaches a selected level, then opening the switch to cause the current in the inductor to flow through a forward biased diode to the battery to charge the battery for a selected period of time, and thereafter again closing the switch to draw a current through the inductor and repeating the closing and opening of the switch in a cyclic fashion until the voltage sensed across the battery reaches a selected level and then maintaining the switch open.

31. The uninterruptible power system of claim 30 wherein the rectifying means includes rectifying diodes connected to each terminal of the primary of the transformer to unidirectionally pass current from one terminal or the other of the transformer to the boost converter means, wherein the inverter comprises gate controlled switching devices having parallel intrinsic diodes connected in an H-bridge configuration, with the DC power from the battery connected on a DC bus across one side of the battery and returned to the battery through a common connection, and the other side of the bridge connected to the two terminals of the primary of the transformer, and wherein the rectifying means includes the intrinsic diodes of the H-bridge switching devices as connected between common and the terminals of the transformer.

32. The uninterruptible power system of claim 30 wherein the intrinsic diodes of the switching devices of the H-bridge inverter connected between the DC bus line from the battery and the terminals of the primary of the transformer serve to limit the voltage applied by the rectifying means to the boost converter means to the voltage level of the battery.

33. The uninterruptible power system of claim 30 wherein the means for sensing the voltage across the battery and the boost converter means comprises a feedback path feeding back the output voltage across the battery through a resistance to the boost converter means for comparison with a desired voltage level and wherein the feedback path also includes a temperature sensitive resistor which changes resistance with temperature to provide compensation of the boost converter charging cycle for temperature.

34. The uninterruptible power system of claim 30 further including a voltage sense transformer having a primary connected to the power supply path between the input terminals and the switching means and a secondary which provides AC power at a reduced voltage from that appearing at the input terminals of the system, a rectifier connected to the terminals of the secondary of the voltage sense transformer which provides a unidirectional DC output voltage, the output voltage of the rectifier being connected to the inductor of the boost converter means in parallel with the voltage provided from the rectifying means connected to the main transformer, and a switch connected between the rectifier connected to the voltage sense transformer and the inductor of the boost converter means which is open so that no current flows therethrough when the uninterruptible power system is providing power to the load either through the main power supply path or from the inverter, and is closed to supply current therethrough when AC power is available from the AC power system at the input terminals and power is not being supplied to the load through the uninterruptible power system.

35. An uninterruptible power system connectable to AC power system lines at input terminals and to a load at its output terminals comprising:
(a) an auxiliary power supply battery;
(b) a power supply path from the input terminals to the output terminals to normally supply power from AC power system lines connected to the input terminals to a load connected to the output terminals;
(c) static switch means connected in the power supply path for responding to control signals to interrupt the supply of power through the power supply path from the AC power system lines to the load, the static switch means including parallel connected SCRs connected with opposite polarity in the power supply path and gate drivers connected to the gates of the SCRs;
(d) a relay having a mechanical relay contact connected in the power supply path between the input terminals and the static switch means, wherein the relay contact is opened or closed in response to a control signal provided to the relay;
(e) means connected to receive DC power from the auxiliary battery and for selectively providing AC power to the power supply path between the static switch means and the load;
(f) control means, connected to provide control signals to the SCRs of the static switch means, to the relay, and to the means connected to receive DC power from the auxiliary battery and provide AC power to the power supply path, and including means for sensing the voltage at the input terminals of the power supply system to determine when an AC power line fault occurs, and upon occurrence of a fault for providing control signals to inhibit the triggering of the SCRs and controlling the means connected to receive DC power to reverse bias an SCR of the static switch that may be conducting at that time and thereafter providing AC power from the battery to the load, and after the SCRs of the static switch means are non-conducting, providing a control signal to the relay to open the relay contact whereby the relay isolates the power supply path from the input, terminals of the uninterruptible power system.

36. The uninterruptible power system of claim 35 wherein the control means senses when there is no longer a line fault on the AC power system lines and provides a control signal to the relay to close the mechanical contact of the relay, and then discontinues the supply of AC power from the battery to the load and thereafter provides control signals to the SCRs of the static switch to turn them on to resupply power from the AC power system lines to the load.

37. The uninterruptible power system of claim 35 wherein the means connected to receive DC power from the battery and for providing AC power to the power supply path includes a transformer having its secondary connected in the power supply path between the static switch means and the output terminals and also having a primary, and an inverter bridge formed of gate controlled switching devices connected together in a bridge configuration connected to receive DC power from the battery and to provide AC power to the primary of the transformer.

38. An uninterruptible power system connectable to the AC power system lines at input terminals and to a load at its output terminals comprising:
(a) an auxiliary power supply battery;
(b) a power supply path from the input terminals to the output terminals to normally supply power from an AC power system lines connected to the input terminals to a load connected to the output terminals;
(c) switch means connected in the power supply path for responding to control signals to interrupt the supply of power through the power supply path from the AC power system lines to the load;
(d) means connected to receive DC power from the auxiliary battery and for selectively providing AC power to the power supply path between the switch means and the load, including an inverter comprising gate controlled switching devices connected in an H-bridge configuration to receive DC power across one side of the bridge from the auxiliary battery and provide AC power across the other side of the bridge to the power supply path, wherein the H-bridge has four arms with switching devices in upper and lower arms of the bridge, with the DC input to the bridge from the battery being provided across the upper and lower arms, and with the output of the bridge being taken between the junctions between the switching devices in the upper and lower arms on each side of the bridge, and wherein at least the lower arms of the bridge include parallel connected plural gate controlled switching devices with the number of switching devices in each arm of the upper arms of the bridge being less than the number of switching devices in each of the lower arms of the bridge;

(e) control means, connected to provide control signals to the switch means and to the gates of the gate controlled switches of the inverter means, and including means for sensing the voltage at the input terminals of the power supply system to determine when a power line fault occurs, and upon occurrence of a fault for providing control signals to the switch means to interrupt the connection of power from the AC power system lines to the load and providing control signals to the gates of the switching devices of the inverter bridge in a pulse-width-modulated fashion to generate an AC output waveform at the output terminals of the power supply system, and wherein the control means controls the switching of the switching devices such that between pulses of output power provided from the inverter to the power supply path, the control means turns off the switching devices in the upper arms of the bridge and turns on the switching devices in the lower arms of the bridge to allow current flowing from the inverter to the load to freewheel through the switching devices in the lower arms of the bridge, whereby the overall duty cycle for individual switching devices in the upper and lower arms of the bridge over a full cycle of the invertor tends to be equalized.

39. The uninterruptible power system of claim 38 wherein the switching devices in the H-bridge inverter compriseise power FETs.

40. The uninterruptible power system of claim 38 wherein the means connected to receive power from the auxiliary battery includes a transformer having its secondary connected in the power supply path between the switch means and the output terminals and its primary connected to the inverter bridge to receive AC power from the invertor bridge.

41. The uninterruptible power system of claim 38 wherein the control means controls the switching devices of the inverter in a pulse-width-modulated manner to provide a substantially sinusoidal output voltage wave at the output terminals with the width of the pulses provided from the invertor selected to provide the desired sinusoidal output waveform with the waveform selected to match the waveform of the AC power system line voltage at the time a line power fault is detected so that a substantially continuous output voltage waveform is provided at the output terminals during switch over from AC line power to power from the inverter.

42. The uninterruptible power system of claim 41 wherein the control means includes means for sampling the AC power line voltage at the input terminals at periodic times and providing digital data corresponding to the sampled input voltage, means receiving the digital data corresponding to the sampled power line voltage and for producing a reference waveform at selected sample times during the period of the AC voltage signal wherein each reference value at each sample time comprises a selectively weighted average of sample values of the cycle of the AC waveform presently being sampled and prior cycles of the AC power line voltage, means for providing digital data corresponding to the reference waveform data synchronized in frequency and phase to the AC power line voltage, and a digital-to-analog conversion means receiving the digital reference waveform data for providing an analog reference waveform signal corresponding thereto, and wherein upon detection of a power line fault the switching devices of the inverter are controlled in a pulse-width-modulated manner to provide an AC output waveform from the inverter which tracks a desired waveform comprising the reference waveform signal and thereafter the means receiving the digital data calculates the reference waveform values at each sample time as a selectively weighted average of a pure sinusoidal waveform stored in a memory and recalculates the reference waveform in this manner for each cycle of the output waveform from the inverter.

43. The uninterruptible power system of claim 42 further including means for sensing the output current supplied from the output terminals to the load, and wherein the desired output waveform provided by the control means is the reference waveform compensated by the measured current being drawn by the load.

44. The uninterruptible power system of claim 43 wherein the desired waveform VREF* is determined in accordance with the following expressions:

$$VREF^* = VREF + R(IO+) - R(IO-)$$

when the reference voltage is in the positive half-cycle, and $$VREF^* = VREF - R(IO+) + R(IO-)$$

when the reference voltage is in the negative half-cycle, and where IO+ is the sensed output current in a positive direction, IO− is the sensed output current in a negative direction, and R is a resistive scaling factor.

45. An uninterruptible power system connectable to AC power system lines at its input terminals and to a load at its output terminals comprising:

(a) an auxiliary power supply battery;
(b) a power supply path from the input terminals to the output terminals to normally supply power from AC power system lines conncted to the input terminals to a load connected to the output terminals;
(c) switch means connected in the power supply path for responding to control signals to interrupt the supply of power through the power supply path from the AC power system lines to the load;
(d) means connected to receive DC power from the auxiliary battery and controllable for selectively providing AC power to the power supply path between the switch means and the load;
(e) control means connected to provide control signals to the switch means and to the means for selectively providing AC power to the power supply path, and including means for sensing the voltage at the input terminals to determine when an AC power line fault occurs, and upon occurrence of a fault, for providing control signals to the switch means to interrupt the supply of power from the AC power system lines to the load and to provide control signals to the means for selectively providing AC power to the power supply path to provide an output voltage waveform at the output terminals selected to match substantially the waveform of the AC input power at the time a line power fault is detected so that a substantially continuous output voltage waveform is provided at the output terminals during switch over from AC line power to power obtained from the battery, wherein the control means includes means for sampling the AC power line signal at the input terminals at periodic times and providing digital output data corresponding to the sampled power line voltage, means receiving the digital data corresponding to the sampled power line voltage signal and for producing a reference waveform at selected sample times during the period of the AC power line voltage wherein each reference value at each sample time comprises a selectively weighted average of sample values of the cycle of the AC waveform presently being sampled and prior cycles of the AC power line voltage, means for providing digital data corresponding to the reference waveform data synchronized in frequency and phase to the AC power line voltage, and digital-to-analog conversion means for receiving the digital reference waveform data and providing an analog reference waveform signal corresponding thereto, and wherein upon detection of a power line fault, the means for selectively providing AC power to the power supply path provides an AC output waveform which tracks the reference waveform signal.

46. The uninterruptible power system of claim 45 wherein after detection of a line fault, the means receiving the digital data calculates reference waveform values at each sample time as a selectively weighted average of a pure sinusoidal waveform stored in a memory and the prior reference waveform and recalculates the reference waveform in this manner for each cycle of the output waveform.

47. The uninterruptible power system of claim 41 including means for comparing the voltage across the switching devices in upper arms of the H-bridge inverter to a reference voltage indicative of a maximum current flowing through the switching devices and therefore a maximum voltage drop across the switching devices, and providing an output signal if the voltage across the switching devices exceeds the reference, the control means terminating the pulse of the pulse width modulation by turning off the switching devices when the current limit signal occurs.

48. The uninterruptible power system of claim 45 wherein the means for selectively providing AC power to the power supply path includes an inverter comprising gate controlled switching devices connected in an H-bridge configuration with upper and lower arms to receive DC power across one side of the bridge from the auxiliary battery and provide AC power across the other side of the bridge to the power supply path, and wherein the control means provides control signals to the gates of the switching devices of the inverter bridge in a pulse-width-modulated fashion with the width of the pulses provided from the inverter selected to provide the desired output waveform.

* * * * *

UNITED STATES PATENT AND TRADEMARK OFFICE
CERTIFICATE OF CORRECTION

PATENT NO. : 5,315,533
DATED : May 24, 1994
INVENTOR(S) : Frederick A. Stich, et al.

It is certified that error appears in the above-indentified patent and that said Letters Patent is hereby corrected as shown below:

In Column 1, Line 34 of the Patent, "A output" should be --AC output--

In Column 6, Line 39 of the Patent, --condition-- should be inserted after "overload"

In Column 6, Line 55 of the Patent, --constant-- should be inserted after "time"

In Column 8, Lines 3 and 4 of the Patent, "conneoted" should be --connected--

In Column 9, Line 44 of the Patent, "turn thru" should be --turn-off-- as per Amendment dated March 18, 1993.

In Column 13, Line 65 of the Patent, "linc" should be --line--

In Column 15, Line 15 of the Patent, "RFPOL" should be --REFPOL--

UNITED STATES PATENT AND TRADEMARK OFFICE
CERTIFICATE OF CORRECTION

PATENT NO. : 5,315,533
DATED : May 24, 1994
INVENTOR(S) : Frederick A. Stich, et al.

It is certified that error appears in the above-indentified patent and that said Letters Patent is hereby corrected as shown below:

In Column 16, Line 12 of the Patent, "inverte" should be --inverter--

In Column 16, Line 15 of the Patent, "curren." should be --current.--

In Column 18, Line 38 of the Patent, "circu" should be --circuit--

In Column 18, Line 42 of the Patent, "319" should be --321--

In Column 19, Line 11 of the Patent, "openinq" should be --opening--

In Column 19, Line 27 of the Patent, "poWer" should be --power--

In Column 21, Line 10 of the Patent, "(e. 2N4403)" should be --(e.g., 2N4403)--

UNITED STATES PATENT AND TRADEMARK OFFICE
CERTIFICATE OF CORRECTION

PATENT NO. : 5,315,533
DATED : May 24, 1994
INVENTOR(S) : Frederick A. Stich, et al.

It is certified that error appears in the above-indentified patent and that said Letters Patent is hereby corrected as shown below:

In Column 21, Line 66 of the Patent, "RESET" should be --/RESET--

In Column 22, Line 5 of the Patent, "hih," should be --high,--

In Column 22, Line 41 of the Patent, "capacitor" should be --comparator--

In Column 23, Line 3 of the Patent, "contro" should be --control--

In Column 25, Line 27 of the Patent, "latc" should be --latch--

In Column 25, Line 44 of the Patent, "circuiss" should be --circuits--

In Column 33, Line 42 of the Patent, "$V_{PC}$" should be --$V_{FC}$--

UNITED STATES PATENT AND TRADEMARK OFFICE
CERTIFICATE OF CORRECTION

PATENT NO. : 5,315,533
DATED : May 24, 1994
INVENTOR(S) : Frederick A. Stich, et al.

It is certified that error appears in the above-indentified patent and that said Letters Patent is hereby corrected as shown below:

In Column 39, Line 14 of the patent, "Q3" should be --Q3>--

In Column 39, Line 24 of the Patent, "ccapitalized" should be --capitalized--

In Column 41, Line 55 of the Patent, "101" should be --110--

In Column 44, Line 8 of the Patent, "curren" should be --current--

In Column 44, Line 67 of the Patent, --a-- should be inserted after "has"

In Column 47, Line 53 of the Patent, "inputs of" should be --inputs to--

In Column 51, Line 44 of the Patent, "ower" should be --power--

UNITED STATES PATENT AND TRADEMARK OFFICE
CERTIFICATE OF CORRECTION

PATENT NO. : 5,315,533
DATED : May 24, 1994
INVENTOR(S) : Frederick A. Stich, et al.

It is certified that error appears in the above-indentified patent and that said Letters Patent is hereby corrected as shown below:

In Column 53, Line 34 of the Patent, "statis" should be --static--

In Column 54, Line 9 of the Patent, "faul" should be --fault--

In Column 56, Line 17 of the Patent, "powersystem" should be --power system--

In Column 58, Line 20 of the Patent, "input," should be --input--

In Column 59, Line 37 of the Patent, "compriseise" should be --comprise--

Signed and Sealed this

Sixteenth Day of May, 1995

Attest:

BRUCE LEHMAN

Attesting Officer      Commissioner of Patents and Trademarks